（12）United States Patent
Chung et al.

(10) Patent No.: US 12,505,716 B2
(45) Date of Patent: Dec. 23, 2025

(54) CONTACTLESS PRODUCT DISPENSING SYSTEMS AND METHODS

(71) Applicant: PepsiCo, Inc., Purchase, NY (US)

(72) Inventors: Terry Tae-Il Chung, New Fairfield, CT (US); Xuejun Li, Pleasantville, NY (US); William W. Segiet, Bethel, CT (US); Leanne Yip Heung Win, Cambridge (GB); Martyn Thomas Mitchell, Royston (GB)

(73) Assignee: PepsiCo, Inc., Purchase, NY (US)

( * ) Notice: Subject to any disclaimer, the term of this patent is extended or adjusted under 35 U.S.C. 154(b) by 325 days.

(21) Appl. No.: 17/521,519

(22) Filed: Nov. 8, 2021

(65) Prior Publication Data

US 2022/0172549 A1 Jun. 2, 2022

Related U.S. Application Data

(60) Provisional application No. 63/119,220, filed on Nov. 30, 2020.

(51) Int. Cl.
*G07F 11/72* (2006.01)
*G07F 9/00* (2006.01)
(Continued)

(52) U.S. Cl.
CPC .............. *G07F 9/001* (2020.05); *G07F 9/006* (2013.01); *G07F 9/009* (2020.05); *G07F 9/023* (2013.01); *G07F 11/165* (2013.01); *G07F 11/72* (2013.01)

(58) Field of Classification Search
CPC ...................................................... G07F 9/009
See application file for complete search history.

(56) References Cited

U.S. PATENT DOCUMENTS 5,960,988 A * 10/1999 Freixas ..................... A47F 1/04
                                                              221/13
6,513,677 B1 * 2/2003 Sorensen ................ G07F 11/42
                                                             221/242
(Continued)

FOREIGN PATENT DOCUMENTS

CN 210955343 U 7/2020
EP 1783705 B1 4/2015
(Continued)

OTHER PUBLICATIONS

International Search Report and Written Opinion of the International Searching Authority in International Application No. PCT/US2021/058414, mailed Mar. 24, 2022 (14 pages).

(Continued)

*Primary Examiner* — Gene O Crawford
*Assistant Examiner* — Ayodeji T Ojofeitimi
(74) *Attorney, Agent, or Firm* — Sterne, Kessler, Goldstein & Fox P.L.L.C.

(57) ABSTRACT

A vending machine includes a housing defining a product storage compartment for storing products. The housing of the vending machine includes a delivery portal and a front portion having a transparent panel configured to allow a consumer to view the products within the product storage compartment. A row of products is arranged within the product storage compartment. A proximity sensor is arranged within the product storage compartment and corresponds to the row of products. The proximity sensor is configured to detect a hand of a consumer within a predetermined detection distance of the proximity sensor, and a product in the row of products is selected when the hand of the consumer is detected within the predetermined detection distance of the proximity sensor. The vending machine (Continued)

includes a dispensing mechanism configured to convey the selected product to the delivery portal.

19 Claims, 46 Drawing Sheets

(51) Int. Cl.
  *G07F 9/02* (2006.01)
  *G07F 11/16* (2006.01)

(56) References Cited

U.S. PATENT DOCUMENTS

| | | | |
|---|---|---|---|
| 6,584,309 B1 | 6/2003 | Whigham | |
| 8,712,586 B2* | 4/2014 | Allinson | G07F 17/0092 |
| | | | 221/133 |
| 8,893,922 B2* | 11/2014 | Azzano | A47J 31/4403 |
| | | | 221/96 |
| 9,898,884 B1* | 2/2018 | Arora | G06Q 30/0226 |
| 10,304,057 B1* | 5/2019 | Powell | G06Q 20/322 |
| 10,726,658 B1 | 7/2020 | Kim | |
| 2009/0166375 A1* | 7/2009 | Butler | G06Q 20/123 |
| | | | 221/282 |
| 2010/0100236 A1 | 4/2010 | Segal et al. | |
| 2012/0203376 A1* | 8/2012 | Savage | G06Q 10/087 |
| | | | 700/214 |
| 2012/0286038 A1 | 11/2012 | Wu | |
| 2013/0211583 A1 | 8/2013 | Borra | |
| 2013/0274917 A1 | 10/2013 | Shimmerlik | |
| 2014/0001199 A1* | 1/2014 | Bruck | G07F 9/009 |
| | | | 221/131 |
| 2014/0367403 A1* | 12/2014 | Carpentier | G07F 11/163 |
| | | | 221/12 |
| 2015/0225224 A1 | 8/2015 | Tilton et al. | |
| 2016/0207656 A1* | 7/2016 | Kramme | G07F 11/04 |
| 2019/0251776 A1 | 8/2019 | Adelberg et al. | |
| 2019/0378104 A1 | 12/2019 | Winsor et al. | |
| 2020/0090444 A1 | 3/2020 | Jafa et al. | |
| 2020/0097936 A1 | 3/2020 | Eddy | |
| 2020/0143620 A1 | 5/2020 | Jafa et al. | |

FOREIGN PATENT DOCUMENTS

| | | |
|---|---|---|
| JP | H0512548 A | 1/1993 |
| JP | H10177679 A | 6/1998 |
| JP | 2011053872 A | 3/2011 |

OTHER PUBLICATIONS

Extended European Search Report issued in European Application No. 21898907.7, mailed Sep. 16, 2024 (9 pages).

* cited by examiner

CONTACTLESS PRODUCT DISPENSING SYSTEMS AND METHODS

CROSS-REFERENCE TO RELATED APPLICATIONS

This application claims the benefit of U.S. Provisional Application No. 63/119,220, filed Nov. 30, 2020, which is incorporated herein by reference in its entirety.

FIELD

Embodiments described herein relate to contactless product dispensing systems and methods. Specifically, embodiments described herein relate to vending machines and beverage dispensers that allow for selection and dispensing of a product, such as a beverage or snack, without requiring the consumer to physically contact the vending machine or beverage dispenser.

BACKGROUND

Various devices may be used to dispense a product to a consumer. Consumers may purchase products from vending machines, dispense beverages from fountain beverage dispensers, or may retrieve products from product storage cabinets or coolers. In each of these various methods of selecting a product, the consumer physically touches the device. The consumer may be required to manually operate a touchscreen or keypad of a vending machine. The consumer may have to manually press a physical button or touch screen to dispense a fountain beverage. Further, the consumer may have to grasp a storage cabinet door to open the door and retrieve a product. Consumers may prefer to dispense products in a contactless manner so that the consumers need not physically touch the devices to select and purchase a desired product.

SUMMARY OF THE INVENTION

Some embodiments described herein relate to a vending machine that includes a housing defining a product storage compartment for storing products, wherein the housing includes a front portion comprising a transparent panel configured to allow a consumer to view the products within the product storage compartment, and a delivery portal. The vending machine further includes a row of products within the product storage compartment, a proximity sensor with the product storage compartment and corresponding to the row of products, wherein the proximity sensor is configured to detect a hand of a consumer within a predetermined detection distance of the proximity sensor, and wherein a product in the row of products is selected when the hand of the consumer is detected within the predetermined detection distance of the proximity sensor. The vending machine further includes a dispensing mechanism configured to convey the selected product to the delivery portal.

In any of the various embodiments described herein, the proximity sensor may be arranged at a front of the row of products.

In any of the various embodiments described herein, the row of products may be arranged on a shelf within the product storage compartment.

In any of the various embodiments described herein, the vending machine may further include a digital display configured to display the selected product. In some embodiments, the digital display may include an antimicrobial coating.

In any of the various embodiments described herein, the vending machine may further include an indicator light corresponding to the proximity sensor, wherein the indicator light is configured to illuminate when the hand of the consumer is within the predetermined detection distance in order to indicate to the consumer that the row of products is selected.

In any of the various embodiments described herein, the delivery portal may include an ultraviolet light source configured to produce UV-C radiation to sanitize a product in the delivery portal.

In any of the various embodiments described herein, the delivery portal may include a door movable from a closed configuration to an open configuration, and wherein the door is configured to remain in the closed configuration while the ultraviolet light source is in operation.

Some embodiments described herein relate to a vending machine that includes a housing defining a product storage compartment for storing products, wherein the housing includes a front portion comprising a transparent panel configured to allow a consumer to view the products within the product storage compartment. The vending machine may further include a shelf arranged within the product storage compartment, wherein the products are arranged in rows on the shelf, and a plurality of indicator lights arranged on a front of the shelf, wherein each of the plurality of indicator lights corresponds to one of the rows of products. The vending machine may further include a control pad that includes a directional control, wherein the directional control includes a proximity sensor configured to detect a hand of a consumer within a predetermined detection distance of the proximity sensor, and wherein a first indicator light of the plurality of indicator lights illuminates and a second light of the plurality of indicator lights darkens when the proximity sensor of the directional control is activated.

In any of the various embodiments described herein, the plurality of indicator lights may illuminate in a sequence when the directional control is activated.

In any of the various embodiments described herein, the control pad may further include a second directional control, a third directional control, and a fourth directional control, and wherein the directional control, the second directional control, the third directional control, and the fourth directional control correspond to movement of the illuminated indicator light in different directions.

Some embodiments described herein relate to method of dispensing a product from a vending machine, wherein the method includes detecting a hand of a consumer within a predetermined detection distance of a proximity sensor of a plurality of proximity sensors, wherein each proximity sensor of the plurality of proximity sensors corresponds to a product within the vending machine, providing an indication of the selected product when the hand is detected within the predetermined detection distance of the proximity sensor, and dispensing the selected product from a product storage compartment of the vending machine to a delivery portal of the vending machine via a dispensing mechanism.

In any of the various embodiments described herein, providing the indication of the selected product may include illuminating an indicator light upon detection of the hand of the consumer within the predetermined detection distance.

In any of the various embodiments described herein, providing the indication of the selected product may include displaying the selected product on a digital display of the vending machine.

In any of the various embodiments described herein, the method may further include detecting the hand within a predetermined detection distance of a second proximity sensor of the plurality of proximity sensors, and providing an indication of a second selected product.

In any of the various embodiments described herein, the method may further include detecting the hand within the predetermined detection distance of the proximity sensor a second time, and providing an indication that the product corresponding to the proximity sensor is deselected.

In any of the various embodiments described herein, the method may further include sanitizing the product in the delivery portal via an ultraviolet light.

In any of the various embodiments described herein, the delivery portal may include a door movable between a closed configuration and an open configuration, wherein the door is in the closed configuration during sanitizing the product and the door moves to the open position upon completion of sanitizing the product.

In any of the various embodiments described herein, the method may further include receiving an input prior to dispensing the selected product to confirm the selected product. In some embodiments, receiving the input comprises receiving a payment via a payment processing unit of the vending machine.

Some embodiments described herein relate to a vending machine that includes a housing defining a product storage area and a control unit configured to receive a product selection and an identity of a consumer via a mobile electronic device of the consumer. The vending machine further includes a camera module arranged on the housing and configured to confirm the identity of the consumer, an indicator light arranged within the product storage area configured to illuminate to indicate the product selection as indicated by the mobile electronic device, and a dispensing mechanism configured to convey the selected product to a product dispensing area.

In any of the various embodiments described herein, the product storage area may include a plurality of product compartments each containing a product. In some embodiments, the indicator light may be arranged along a perimeter of a product compartment of the plurality of product compartments.

In any of the various embodiments described herein, the vending machine may further include a microphone configured to detect audible information from the consumer, wherein the identity of the consumer may be confirmed based on the audible information.

In any of the various embodiments described herein, the control unit may be further configured to receive a payment from the consumer via the mobile electronic device.

In any of the various embodiments described herein, the dispensing mechanism may include an articulating arm.

In any of the various embodiments described herein, the vending machine may further include a digital display configured to display the selected product.

Some embodiments described herein relate to a vending machine that includes a housing defining a product storage area, a control unit configured to receive a product selection and an identity of a consumer via a mobile electronic device of the consumer, and a camera module arranged on the housing and configured to confirm the identity of the consumer. The vending machine further includes an indicator light arranged within the product storage area configured to indicate the selected product, a dispensing mechanism configured to convey the selected product to a product dispensing area, and a bag dispenser configured to dispense a bag into the product dispensing area such that the selected product is dispensed into the bag.

In any of the various embodiments described herein, the vending machine may further include a second camera configured to detect a presence of the bag in the product dispensing area, wherein information from the second camera guides the dispensing mechanism to dispense the product into the bag.

In any of the various embodiments described herein, the bag dispenser may include a bag storage area configured to store a plurality of bags in a collapsed configuration, and a bag extending arm configured to engage an upper end of a bag and move the bag into an expanded configuration and into the product dispensing area.

In any of the various embodiments described herein, the dispensing mechanism may include an articulating arm configured to retrieve the selected product from the product storage area and place the selected product in the bag.

In any of the various embodiments described herein, the vending machine may further include a payment processing unit configured to receive a contactless payment.

In any of the various embodiments described herein, the vending machine may further include a digital display arranged on the housing, wherein the digital display is configured to display product information.

Some embodiments described herein relate to a method of vending a product from a vending machine, the method including displaying a list of products available on a mobile electronic device of a consumer, and receiving, from the mobile electronic device, a product selection and an identity of a consumer. The method further includes confirming the identity of the consumer by the vending machine, indicating a selected product within a product storage area of the vending machine, and conveying the selected product from the product storage area to a product dispensing area for retrieval by the consumer.

In any of the various embodiments described herein, wherein confirming the identity of the consumer may include performing facial recognition by a camera module of the vending machine.

In any of the various embodiments described herein, wherein confirming the identity of the consumer may include performing voice recognition by an audio unit of the vending machine.

In any of the various embodiments described herein, the method further including receiving a payment from the mobile electronic device of the consumer.

In any of the various embodiments described herein, wherein indicating the selected product may include illuminating an indicator light that surrounds a product compartment in the product storage area that contains the selected product.

In any of the various embodiments described herein, the method may further include positioning a bag in the product dispensing area, such that the selected product is conveyed into the bag.

In any of the various embodiments described herein, the method may further include detecting a hand of the consumer in the product dispensing area and conveying the selected product to the hand of the consumer.

BRIEF DESCRIPTION OF THE FIGURES/DRAWINGS

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION

Figure 1:
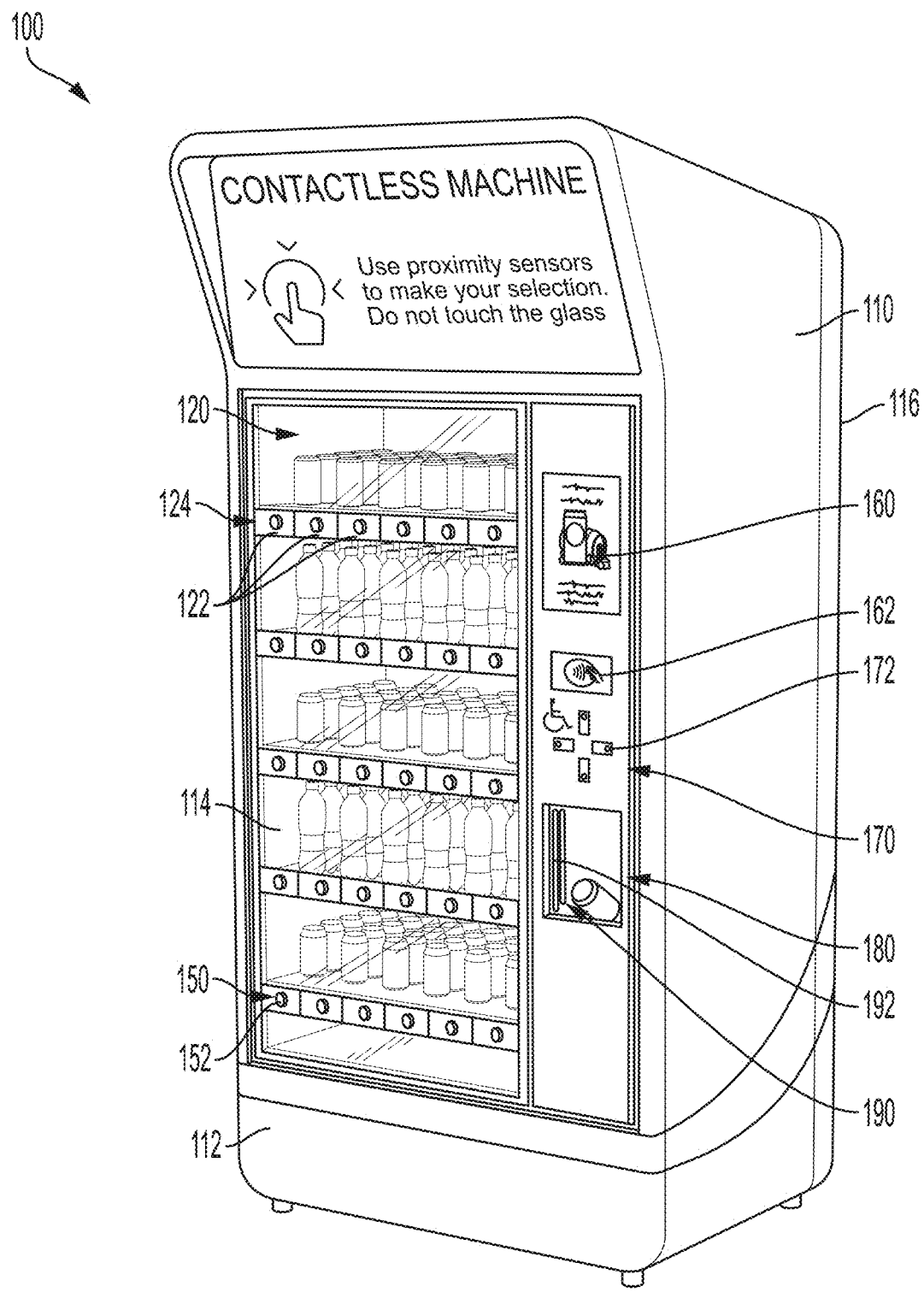
FIG. 1 shows a perspective view of a vending machine for dispensing a product in a contactless manner according to an embodiment.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

Consumers may select and purchase products via a variety of devices. Vending machines, fountain beverage dispensers, and coolers, among others. In order to operate these devices, the consumer generally must physically contact the device in order to select or retrieve a product. However, these devices may carry germs as the result of multiple consumers contacting the devices. Consumers may choose not to use such devices if they do not feel that the devices are clean and sanitary and if they feel that they may encounter germs and become ill. Accordingly, contactless systems and methods for providing products to consumers are desired so that consumers need not physically contact the devices which may result in spread of germs.

For example, vending machines may allow a consumer to select a product and dispense the selected product in an unattended manner. In order to operate the vending machine, the consumer must generally operate a keypad or touch screen to make product selections, confirm selections. The consumer may also have to contact the vending machine to enter payment, such as when swiping a credit card or inserting paper currency.

Beverage dispensers similarly require the consumer to physically touch the beverage dispenser to operate a dispensing button or to make beverage selections on a touch screen or the like. The beverage dispensing station may include cups and straws that are open to all consumers who use the beverage dispenser. As a result, the beverage dispenser may accumulate germs from various consumers contacting the beverage dispenser. Further, consumers may be concerned that the straws and cups are not clean and sanitary due to the ability for any consumer to handle the straws and cups.

Storage cabinets and coolers may include a storage compartment accessible by opening a door. In order to access the products, the consumer may have to grasp the door and manually open the door. Further, as consumers may access products, consumers may touch and handle products within cooler so that each product may also carry germs.

Therefore, systems and methods for providing consumers with products in a contactless manner are desired.

As used herein, the term "contactless" may refer to the ability to select, retrieve, pay for, and initiate dispensing of a product without the consumer physically contacting a system, such as by touching a keypad, touch screen, door or handle with the consumer's hands or fingers. However, it is understood that the consumer may touch the product itself to retrieve the product. Further, it is understood that in some embodiments as noted herein, a consumer may choose to perform one or more of selecting, retrieving, paying for, and initiating dispensing of a product by physically contacting or touching the system if desired.

As used herein, the term "product" may refer to any of various food and beverage items, and particularly packaged food and beverages, such as bags or sleeves of chips, cookies, crackers, and the like, granola bars, power bars, energy bars, and packaged beverages, such as bottled beverages, canned beverages, beverages in pouches, including carbonated beverages, such as sparkling water, soda, and energy drinks, water, milk or dairy-based beverages, coffee or tea-based beverages, among others.

Figure 2:
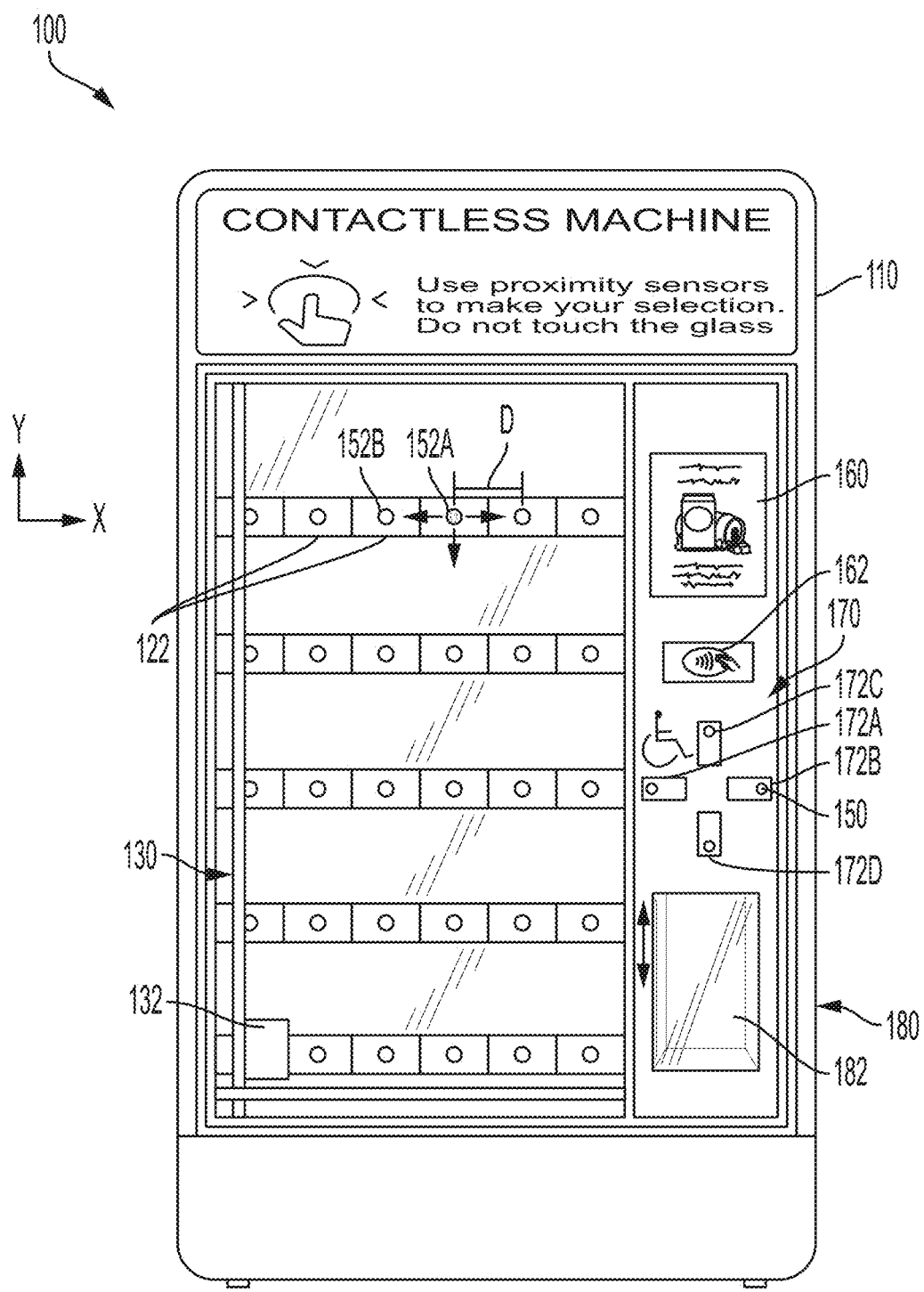
FIG. 2 shows a front view of the vending machine of FIG. 1.

Some embodiments described herein relate to a vending machine for selecting and dispensing a product in a contactless manner. A vending machine 100 according to an embodiment is shown in FIGS. 1-2. Vending machine 100 is configured to allow a consumer to select a product by activating a proximity sensor 150 corresponding to a product so that the consumer may make a product selection in a contactless manner. Vending machine 100 may include a payment processing unit 162 for receiving payment in a contactless manner. Vending machine 100 may further include a sanitizer 190 configured to sanitize delivery portal 180 and a dispensed product therein to minimize the spread of germs and to promote the health and safety of consumers.

Vending machine 100 may include a housing 110 defining a product storage compartment 120. Housing 110 may enclose components of vending machine 100 for operation of vending machine 100. Housing 110 may include a front portion 112 that includes a transparent panel 114. Transparent panel 114 may be formed from glass or a transparent plastic. Transparent panel 114 may allow a consumer to view products stored within product storage compartment 120. Products within product storage compartment 120 are not directly accessible by the consumer, and thus the consumer cannot handle the products unless the consumer purchases and dispenses the products.

Products may be arranged within product storage compartment 120 in one or more rows 122. Rows 122 of products may extend from front portion 112 toward an opposing rear portion 116 of housing 110 within product storage compartment 120. In some embodiments, product storage compartment 120 may include a shelf 124 on which products are arranged in rows 122. However, products need not be arranged on a shelf 124 and in some embodiments, products may instead be arranged on a screw-drive or products may be suspended on or by a rail. For example, a bottled beverage may be suspended by a rail at an upper end of the bottled beverage, such as at a neck of the bottled beverage.

A proximity sensor 150 may be arranged at a front of each row 122 of products.

Proximity sensor 150 may face toward consumer. Proximity sensor 150 may be configured to detect a presence of a hand of a consumer within a predetermined detection distance of proximity sensor 150. Proximity sensor 150 may be arranged within product storage compartment 120 behind transparent panel 114 such that a consumer is unable to physically contact proximity sensor 150 due to placement of transparent panel 114. In this way, the consumer may select a product by activating a proximity sensor 150 for the row 122 having the desired product by holding his or her hand within the predetermined detection distance of the proximity sensor 150 without physically touching the vending machine 100 or proximity sensor 150.

While the present application refers to the consumer's hand as a primary method for a consumer to activate proximity sensor 150 to select a product, it is understood that the consumer may use other body parts, such as an elbow or foot, or the consumer may use an object, such as a purse or bag, among other objects, so long as the object is located within the predetermined detection distance of proximity sensor 150.

The predetermined detection distance allows the consumer to make a product selection without contacting transparent panel 114 or proximity sensor 150. The detection distance is sufficiently small distance to avoid accidental or erroneous activation of adjacent proximity sensors 150. In some embodiments, the detection distance may be, for example, 0.5 inch to 2 inches. Further, proximity sensors 150 may be spaced from one another by a separation distance D (see, e.g., FIG. 2) that is greater than the detection distance. In some embodiments, the separation distance D may be at least about 3.5 inches. This may help to improve accuracy of product selection by preventing a consumer's hand from accidentally triggering an adjacent proximity sensor.

In some embodiments, proximity sensor 150 may not activate unless the proximity sensor 150 detects the presence of a consumer's hand for a predetermined detection time, for example, 3 seconds. Thus, the consumer may hold his or her hand within the detection distance of a proximity sensor 150 for a predetermined detection time in order to activate proximity sensor 150. This may help to prevent accidental activation of proximity sensors 150 if a consumer's hand briefly passes by proximity sensors 150.

Once the consumer has selected a product by activating a proximity sensor 150, vending machine 100 may provide an indication to the consumer that a product has been selected. This may help the consumer to confirm that the correct product has been selected. In some embodiments, each row 122 of products may further include an indicator light 152. Indicator light 152 may be formed as part of proximity sensor 150 or may be a separate component. Indicator light 152 may remain in a darkened or non-illuminated state until proximity sensor 150 detects a consumer's hand within the detection distance of proximity sensor 150 and upon detection of the consumer's hand, indicator light 152 may illuminate to indicate that proximity sensor 150 has been activated and that the product in that row has been selected.

In some embodiments, once a proximity sensor 150 is activated, a consumer may deactivate the proximity sensor 150 to deselect the product by placing his or her hand within the predetermined detection distance of proximity sensor 150 a second time. When proximity sensor 150 detects the consumer's hand for the second time, indicator light 152 may darken to indicate that the product has been deselected. As discussed, consumer may be required to hold his or her hand within the predetermined detection distance for a predetermined detection time in order to deselect the proximity sensor 150 in order to avoid accidental deselections. Alternatively, an indicator light 152 may illuminate in a first color when the corresponding proximity sensor is selected to indicate that the product corresponding to the indicator light and proximity sensor is selected, and the indicator light 152 may illuminate in a second, different color to indicate that the product is deselected. Alternatively, a digital display may display the selected product in a shopping cart when the product is selected and may remove the selected product from the shopping cart when the product is deselected.

In some embodiments, the consumer may select multiple products in a single transaction by placing his or her hand within the predetermined detection distance of an additional proximity sensor 150 of a different row 122 of products in order to select additional products. An indicator light 152 for each row 122 may illuminate as proximity sensor 150 for each row is activated.

In addition to, or as an alternative to indicator lights 152, a digital display 160 of vending machine 100 may display the selected products. Thus, when a consumer activates a proximity sensor 150 corresponding to a product, digital display 160 may display an image or video of the selected product. Further, digital display 160 may display product information about the selected product to help the consumer decide whether to purchase the product, such as the name of the product, an image of the product, a price, and nutrition information, such as the ingredients and number of calories, among other information. In some embodiments, digital display 160 may be a liquid crystal display (LCD), electroluminescent display (ELD), plasma display (PDP), light emitting diode (LED) display, an organic LED (OLED) display, quantum dot (QLED) display, or an e-ink display, among others. In some embodiments, digital display 160 may be a touch screen display capable of receiving user input. Digital display 160 may include a coating, such as an anti-microbial coating in order to inhibit or minimize accumulation of bacteria and other germs on digital display 160.

In some embodiments, vending machine 100 may further include a payment processing unit 162. Payment processing unit 162 may be configured to receive payments in a contactless manner. Payment processing unit 162 may include a reader, such as a camera, for reading a quick response (QR) code or other readable code presented by a consumer, wherein the QR code corresponds to a payment source, such as a mobile payment. Payment processing unit 162 may include a near field communication (NFC) antenna configured to communicate with a contactless payment card for touch-and-go payments. However, in some embodiments, payment processing unit 162 may additionally include a money slot for receiving paper or coin currency or tokens, or a payment card reader for reading a payment card, such as a credit card, debit card, gift card, or the like by swiping the card or inserting the card into the reader, or both.

In some embodiments, vending machine 100 may include a control pad 170 configured to be operated by a consumer to select a product in a contactless manner. Control pad 170 may help children or handicapped consumers who may be unable to reach the top row or rows of products to operate vending machine 100 by activating proximity sensors 150. Further, control pad 170 may provide an alternate mode of operation of vending machine 100 to provide convenience to consumers.

Control pad 170 may include one or more directional controls 172 configured to cause a first indicator light to darken and a second indicator light to illuminate when directional control 172 is activated. The indicator light 152 that illuminates may be an indicator light 152 immediately adjacent first indicator light 152 that is illuminated in the direction corresponding to the activated directional control 172. For example, if a first indicator light 152A is illuminated, and a left directional control 172 is activated, first indicator light 152A may darken and a second indicator light 152B that illuminates may be the indicator light 152B in the row immediately to the left of the first indicator light 152A. Each directional control 172 may include a proximity sensor 150 configured to detect a presence of a hand of a consumer within a predetermined detection distance of proximity sensor 150. In this way, consumer may activate a directional control 172 to cause the illuminated light to move from a first indicator light 152 to a second indicator light 152 in the direction indicated by the directional control 172.

Prior to beginning a transaction, one indicator light 152 of the plurality of indicator lights 152 of vending machine 100 may be illuminated as a default product selection. In order to select a product, consumer may activate a directional control 172 to cause the indicator light 152 that is illuminated to "move" to an adjacent indicator light 152, such as an indicator light spaced in an X or Y direction.

In some embodiments, a single directional control 172 may be provided, wherein directional control 172 may cause the illuminated light to move to an immediately adjacent indicator light 152 on the same shelf or level. For example, illuminated indicator light may move along indicator lights 152 one by one from a left to a right side of a first shelf, and upon reaching the right side of the first shelf, the illuminated indicator light may move to a second shelf and proceed one by one across indicator lights 152 of the second shelf, such as in a raster scan or snaking pattern. However, in order to improve the speed of moving the illuminated light to a desired product, additional directional controls 172 may be included.

In some embodiments, as shown in FIG. 2, control pad 170 may be configured to allow for movement of illuminated light in X and Y directions, wherein X and Y are perpendicular. A first directional control 172A may correspond to movement in a first direction along an X axis (left), a second directional control 172B may correspond to movement in an opposing, second direction along the X axis (right), a third directional control 172C may correspond to movement in a first direction along a Y axis (up), and a fourth directional control 172D may correspond to movement in an opposing, second direction along the Y axis (down). Directional controls 172 may be labeled or otherwise arranged so as to indicate the direction in which the illuminated light will move when a particular directional control 172 is activated. The use of four directional controls 172 may help to allow the consumer to reach a desired product in fewer steps than embodiments having a single directional control 172.

Once the consumer has selected desired products, such as by activating a proximity sensor 150 at the front of a row of products, or by operation of control pad 170, consumer may proceed to confirm the selected products for dispensing. In some embodiments, consumer may confirm the selected products by providing an input. Input may be in the form of a payment. For example, once products have been selected, consumer may provide payment at payment processing unit 162 to confirm the product selection.

Upon receipt of payment, vending machine 100 may cause the selected products to be dispensed to a delivery portal 180 of housing 110 so that the products may be accessed by the consumer. Vending machine 100 may include a dispensing mechanism 130 to convey the selected products to delivery portal 180, as shown in FIG. 2. Dispensing mechanism 130 may be, for example, an X-Y mechanism having a basket 132. X-Y mechanism may be configured to move basket 132 to the location of the selected product and receive the selected product from the row of products in the basket 132 and move the basket 132 to delivery portal 180. Other dispensing mechanisms 130 for conveying a product to delivery portal 180 may be used, as are known by those skilled in the art. For example, a row of products may include a pusher tab at area rear of the row that pushes the products forward so that a frontmost product falls to delivery portal 180 under the force of gravity, products may be arranged in a screw drive that rotates to cause a frontmost product to fall to delivery portal 180 under the force of gravity, or an articulating arm may retrieve a selected product and move the selected product to delivery portal 180.

Figure 3:
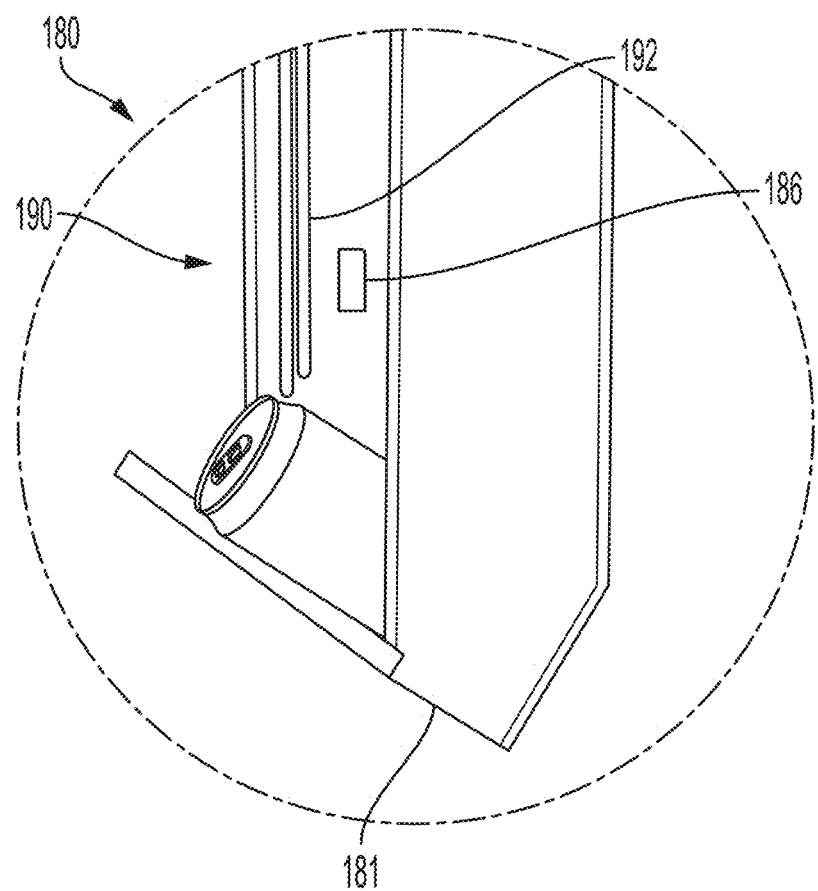
FIG. 3 shows a perspective view of a delivery portal of the vending machine of FIG. 1.

In some embodiments, delivery portal 180 may include a lower end 181 on which the dispensed product rests. Lower end 181 may be arranged at an inclined angle. In this way, a dispensed product may be tilted outwardly to facilitate grasping of the product by the consumer, as shown in FIG. 3. This may help to allow the consumer to easily retrieve the product within contacting delivery portal 180.

In some embodiments, delivery portal 180 may include a sanitizer 190 for sanitizing a dispensed product. Sanitizer 190 may include an ultraviolet light source 192 configured to sanitize the product. Sanitizer 190 may produce a burst of ultraviolet light for a first predetermined period of time, such as 1 second to 20 seconds, among other time periods sufficient to sanitize the product. In some embodiments, ultraviolet light source 192 may be configured to produce UV-C light.

Delivery portal 180 may include a door 182 movable form a closed configuration (see, e.g., FIG. 2) to an open configuration (see, e.g., FIG. 1). Door 182 may be automatically movable via a motor so that consumer need not contact door 182 in order to open door 182 and retrieve a product. Door 182 may remain in a closed position to prevent access to delivery portal 180. This may help to minimize accumulation of germs in delivery portal 180 and may help to prevent consumers from attempting to tamper with vending machine 100. Door 182 may be configured to move to an open configuration when a product is dispensed into delivery portal 180. Delivery portal 180 may include a product sensor 186 as best shown in FIG. 3 to detect the presence of product in delivery portal 180. In embodiments having a sanitizer 190, door 182 may remain closed until sanitizer 190 sanitizes the dispensed product.

Upon retrieval of the dispensed product, door 182 of delivery portal 180 may automatically return to the closed configuration. In such embodiments, product sensor 186 may detect the presence or absence of the product in delivery portal 180. In some embodiments, product sensor 186 may be a weight sensor or an optical sensor, among others. When product sensor 186 determines the dispensed product has been removed from delivery portal 180, door 182 may return to the closed configuration. After door 182 returns to the closed configuration, sanitizer 190 may activate so as to sanitize delivery portal 180. Sanitizer 190 may activate for a second predetermined period of time. Second predetermined period of time may be longer than the first predetermined period of time so as to remove any germs left by the consumer who retrieved the product. For example, second predetermined period of time may be 30 seconds to 60 seconds.

Figure 4:
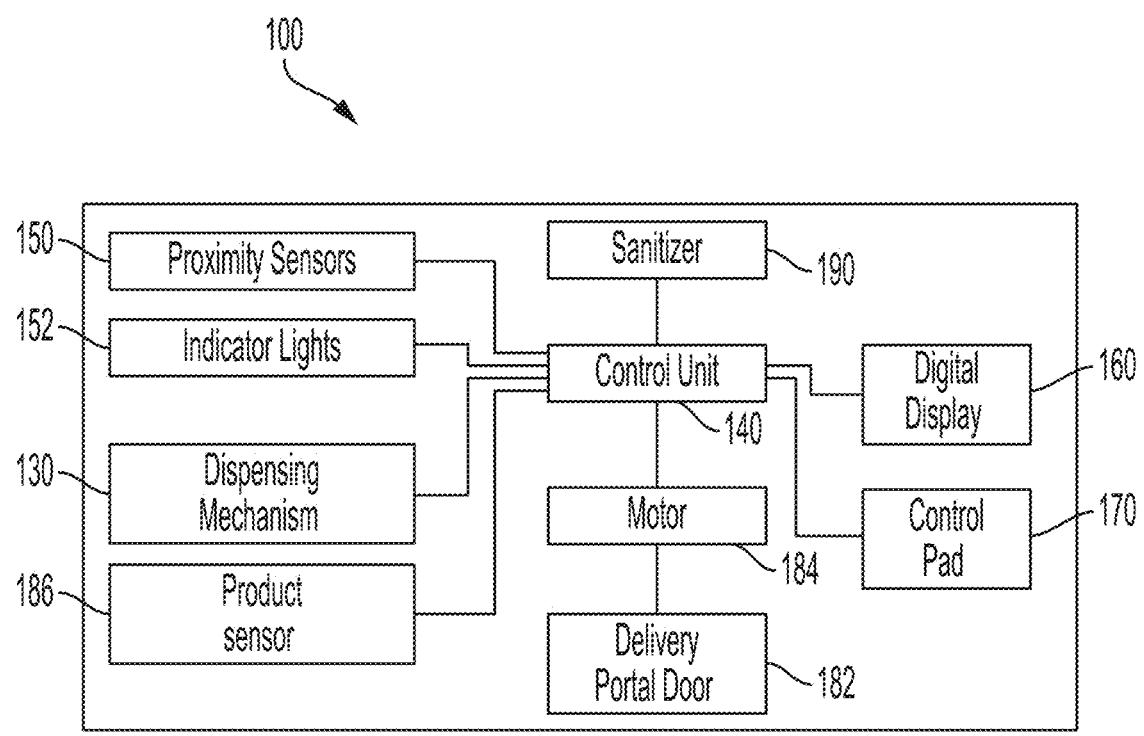
FIG. 4 shows a schematic diagram of components of a vending machine for dispensing a product in a contactless manner according to an embodiment.

Vending machine 100 may include a control unit 140 configured to control operation of vending machine 100, as shown in FIG. 4. Control unit 140 may be in communication with proximity sensors 150 and control pad 170 to determine that a product has been selected, control unit 140 indicate the selected product via indicator lights 152 or digital display 160, and may actuate dispensing mechanism 130 to convey the selected product to delivery portal 180. Control unit 140 may activate sanitizer 190 upon detection of product in delivery portal 180 by product sensor 186, and may operate motor 184 to open move door 182 of delivery portal 180 to the open configuration upon completion of sanitization. Control unit 140 may move door 182 to the closed configuration upon removal of product from delivery portal 180 as determined by product sensor 186.

Figure 5:
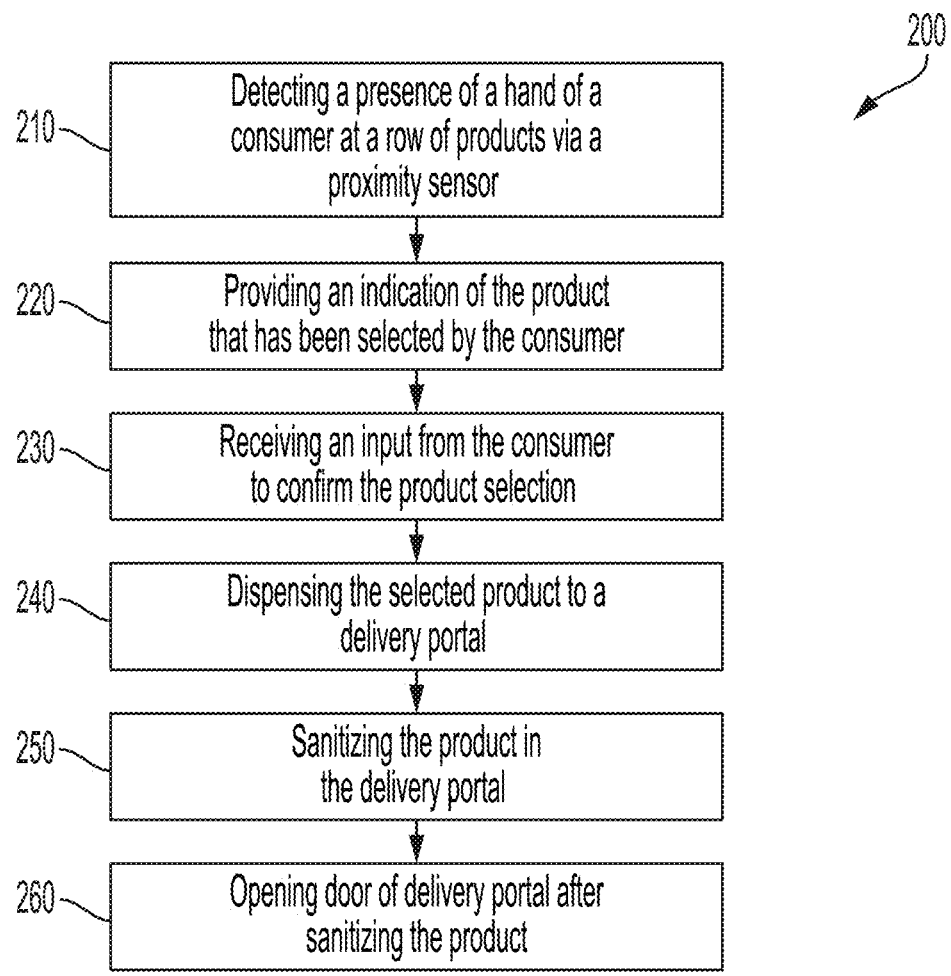
FIG. 5 shows an exemplary method of dispensing a product from a vending machine in a contactless manner according to an embodiment.

An exemplary method of operating a vending machine in a contactless manner 200 is shown in FIG. 5. Vending machine may detect a presence of a consumer's hand within a predetermined detection distance of a proximity sensor at a front of a row of products 210. Vending machine may provide an indication that a product in the row of products has been selected 220. For example, vending machine may illuminate an indicator light at the front of the row of products, the selected product may be displayed on a digital display of vending machine, or both. Vending machine may receive an input from the consumer to confirm selection of the products 230. In some embodiments, consumer may provide payment to confirm the product selection. After product selection is confirmed, vending machine may dispense the selected products to a delivery portal 240. In some embodiments, sanitizer may sanitize the products in the delivery portal 250. Once sanitized, vending machine may automatically open door of delivery portal to provide the consumer with access to the sanitized product 260.

Figure 6:
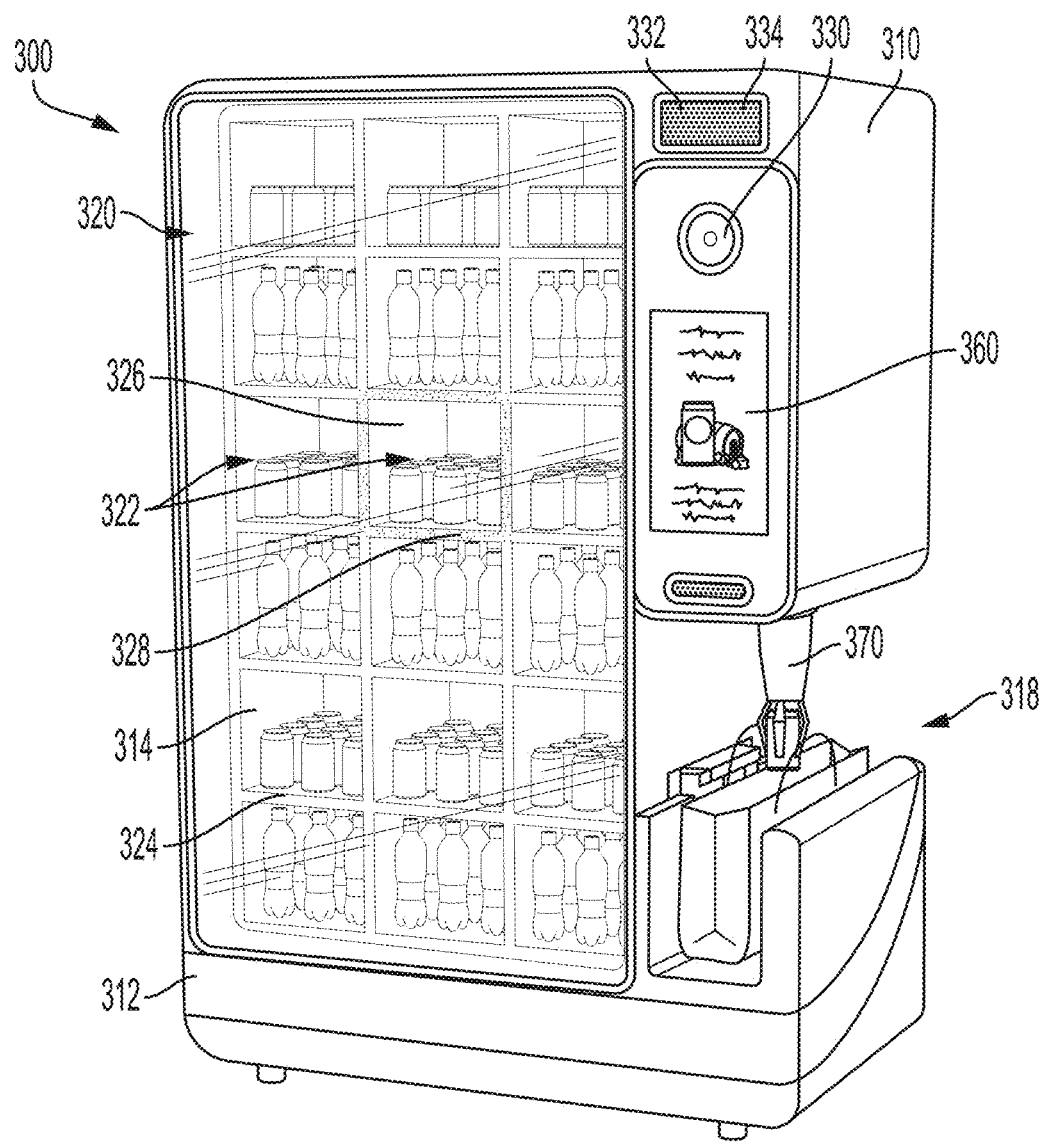
FIG. 6 shows a vending machine for dispensing a product in a contactless manner according to an embodiment.

Some embodiments relate to a vending machine 300 for contactless dispensing of a product, as shown in FIG. 6.

Vending machine 300 may include a housing 310 defining a product storage area 320 for storing products. Housing 310 may include a front portion 312 having a transparent panel 314. Transparent panel 314 may allow a consumer to view product storage area 320 and products therein.

Product storage area 320 may include a plurality of product compartments 322.

Product storage area 320 may include a plurality of square or rectangular product compartments 322. Product compartments 322 may be formed by a plurality of shelves 324 and a plurality of vertical dividers 326 forming a grid-like pattern. Each product compartment 322 corresponds to a particular product. For example, a first product compartment may store bottles of a carbonated beverage, whereas a second product compartment may store bags of chips.

In some embodiments, a plurality of indicator lights 328 may be arranged within product storage area 320. Indicator lights 328 may be arranged on shelves 324 and vertical dividers 326 at perimeter of product compartments 322. When a product is selected, the indicator lights 328 around a perimeter of a product compartment 322 may illuminate to indicate the selected product.

Vending machine 300 may include a digital display 360. Digital display 360 may be arranged on housing 310. Digital display 360 may be configured to display instructions for operating vending machine 300, product information, and advertisements and other visuals, among other information. Digital display 360 may display selected products to confirm the consumer's product selection. Digital display 360 may be a display having features and functionality as described above with respect to digital display 160.

Vending machine 300 may communicate wirelessly with a mobile electronic device 400 (see, e.g., FIG. 9) of a consumer to receive a product selection, and an identity of the consumer, and optionally payment for the selected products. In this way, the consumer can utilize their own personal mobile electronic device 400 to select and pay for a product without having to contact vending machine 300 to select a product or provide payment. Mobile electronic device 400 may include, for example, a smartphone, a tablet computer, a laptop, a personal digital assistant, or a smartwatch, among other devices. Vending machine 300 may include a communication assembly 342 for communicating with mobile electronic device 400. Communication assembly 342 may communicate with mobile electronic device 400 via a wide area network (WAN), a local area network (LAN), among others.

Figure 7:
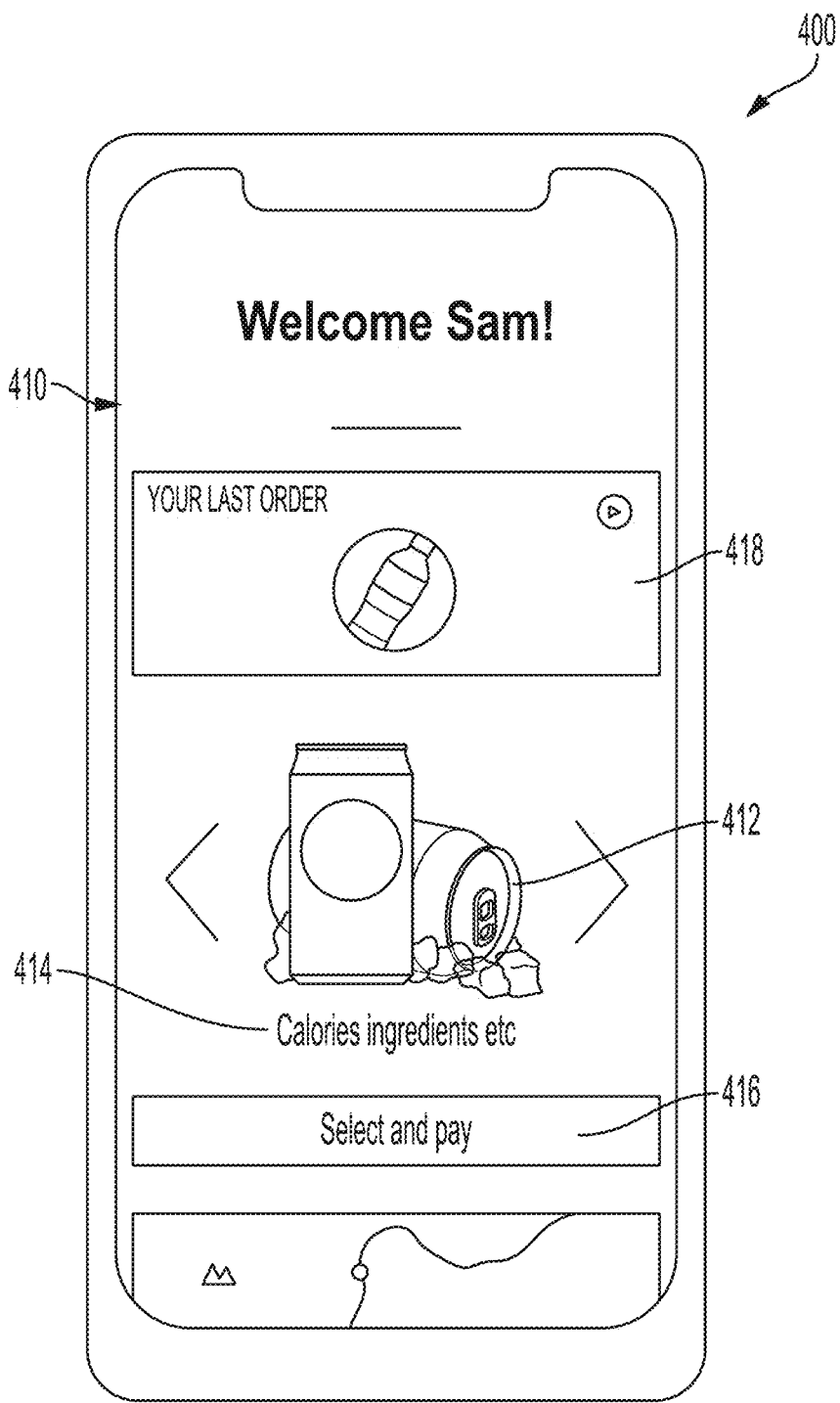
FIG. 7 shows a graphical user interface for selecting a product from the vending machine of FIG. 6 according to an embodiment.

Mobile electronic device 400 may execute a software application for selecting and purchasing a product for dispensing by vending machine 300. Software application may include a graphical user interface (GUI) 410 for selecting and paying for a product, as shown for example in FIG. 7. GUI 410 may display a list of available products 412 at a vending machine 300. Vending machine 300 may communicate with mobile electronic device 400 to provide updated information, such as an updated list of products and prices as product inventory and pricing may change over time. GUI 410 may display product information 414 for each product 412, such as nutrition information, price, weight or volume, among other information. GUI 410 may include a selectable option, such as a "payment" icon 416 for completing the transaction and providing payment. In some embodiments, a consumer may create a user account in order to store user information. GUI 410 may receive and store the user information in the user account, such as identity information including the user's name, an image of the user or user's face, a recording of a voice of the user, and payment information, such as payment card information, banking information, and the like. GUI 410 may also display user information to confirm the user's identity. The software application may track the consumer's purchase history and preferences and provide product recommendations based on the consumer's information. GUI 410 may also display information relating to the weather, local attractions and events, among other information.

In some embodiments, GUI 410 may include a purchase history 418 or a list of favorite products. This may help a consumer to quickly select a product that the consumer frequently purchases. In some embodiments, GUI 410 may be configured to provide a product recommendation. The recommendation may be based on the consumer's information, such as the consumer's purchase history or favorite products. For example, if the consumer frequently purchases Pepsi products, the recommendation may include a new Pepsi product. Product recommendations may encourage consumers to try new or seasonal products. The product recommendation may also be based on products commonly selected by other consumers. In some embodiments, product recommendation may further be based on environmental information, such as the local time, temperature, weather, or season, and the consumer's biometric or demographic information, such as information relating to the consumer's age, gender, health (e.g., blood sugar level, hydration level, and sleep information) as may be retrieved from the user's account or by manual entry by the consumer. Software application may employ artificial intelligence and deep learning to provide the product recommendation based on any of the information described herein.

Once the consumer has selected and paid for a product, vending machine 300 may confirm the identity of the consumer prior to dispensing the selected products. In some embodiments, vending machine 300 may include a camera 330 configured to identify the consumer by facial recognition, as shown in FIG. 6. In some embodiments, vending machine 300 may confirm the identity of the consumer by voice recognition. Vending machine 300 may include a speaker 332 and microphone 334. When a consumer is detected by vending machine 300, such as by camera 330 of vending machine 300, vending machine 300 may play a recorded message via speaker 332 to prompt the consumer to confirm their identity by voice recognition. Microphone 334 may detect the consumer's speech in order to confirm the consumer's identity. In some embodiments, vending machine 300 may confirm the identity of the consumer by both facial recognition and voice recognition to ensure the consumer is accurately identified.

Once the identity of the consumer is confirmed, vending machine 300 may highlight the selected product using indicator lights 328 in product storage area 320. Additionally or alternatively, digital display 360 may display an image or video of the selected products.

In some embodiments, consumer may make a product selection via voice command. In such embodiments, consumer may view products available for purchase in product storage area 320. Microphone 334 of vending machine 300 may receive audio information from consumer. Vending machine 300 may conduct speech recognition to determine the consumer's speech. Vending machine 300 may be configured to respond to inquiries from the consumer regarding products available for purchase. Consumers may ask for a product having a specific characteristic, such as carbonated beverages, non-carbonated beverages, a specific flavor of beverage, coffee-based beverages, among others. For example, a consumer may ask for a carbonated beverage, and vending machine 300 may respond by displaying a list of available carbonated beverages, reading a list of carbonated beverages, or both, and may indicate that no carbonated beverages are available.

Vending machine 300 may also detect commands from the consumer, such as to add a particular product or remove a particular product from the consumer's shopping cart. Consumer may ask for additional information about a product, such as to show information about a product. Digital display 360 may display product information to help the consumer determine if he or she wishes to purchase the selected product. Vending machine 300 may play audible responses via speaker 332. Speaker 332 may play a response to confirm the consumer's request. For example, in response to a consumer request to add a product to the cart, the speaker 332 may play a response that indicates that the product has been added to the cart. Vending machine 300 may store pre-recorded responses that may be played based on the consumer's speech.

After selecting the desired products by voice command, consumer may then pay for the selected products in a contactless manner. Camera 330 may be configured to read a QR code presented by the consumer, such as a QR code display on mobile electronic device 400. In some embodiments, vending machine 300 may include a payment processing unit having a NFC antenna for receiving contactless payments from a payment card having an NFC antenna.

A dispensing mechanism 370 may convey the selected products to a product dispensing area 318 of housing 310. In some embodiments, product dispensing area 318 may be arranged below digital display 360 and adjacent to product storage area 320. Dispensing mechanism 370 may be a pick-and-place dispenser and may include an articulating arm. The articulating arm may retrieve the selected product and carry the selected product to product dispensing area 318 so that the consumer may collect the selected products. In some embodiments, the articulating arm may be telescopic so as to retract into housing 310 or extent to reach outside of housing 310 and into product dispensing area 318. In some embodiments, articulating arm may include a vacuum-based picker that creates a vacuum to grasp a product in product storage area 320 and move the product to product dispensing area 318. At product dispensing area 318. In some embodiments, articulating arm may include an actuatable claw that may close to grasp a product and open to release the product.

Figure 8:
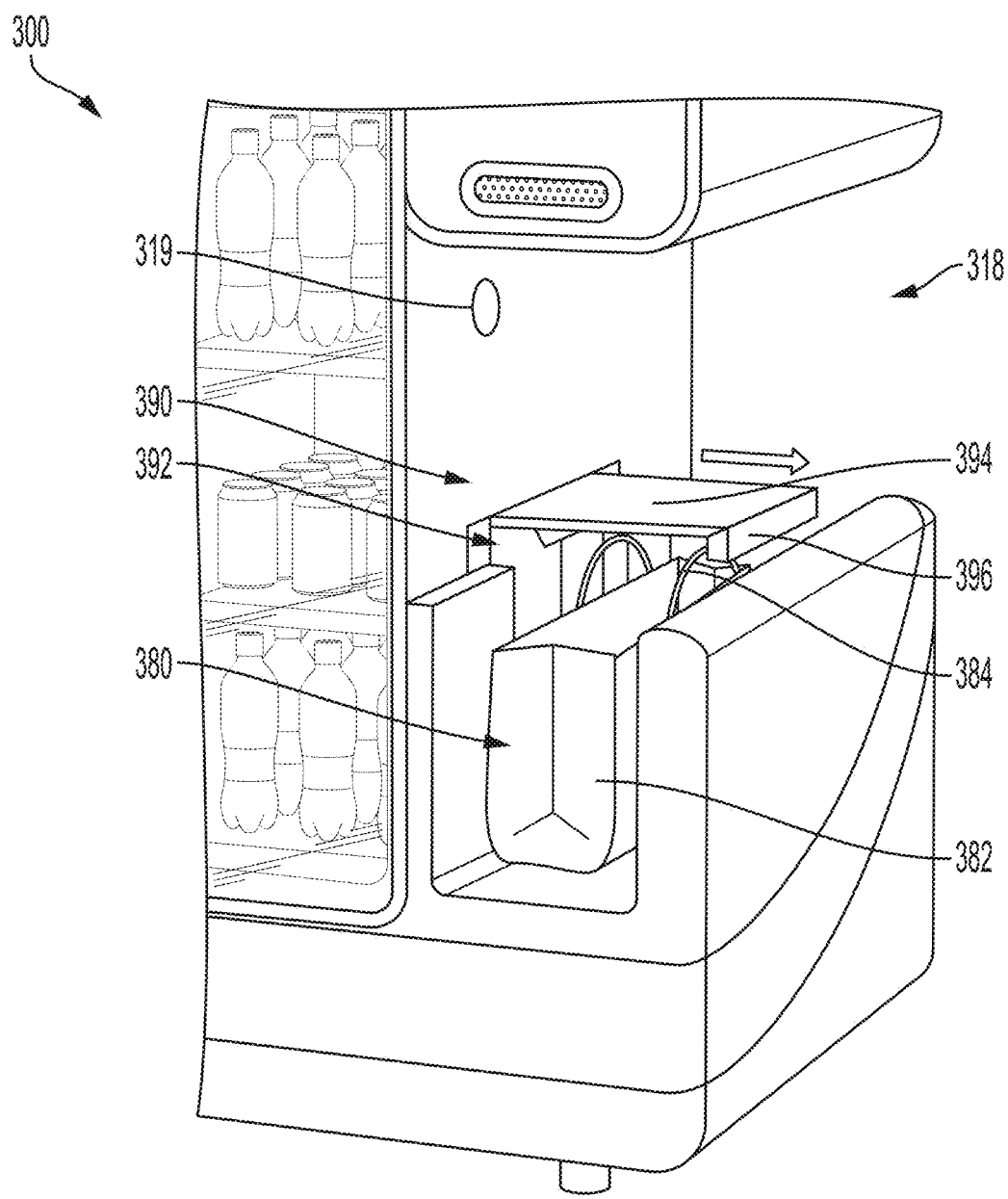
FIG. 8 shows a close-up view of a bag dispensing of the vending machine of FIG. 6.

In some embodiments, product dispensing area 318 may include a camera 319 as shown in FIG. 8. Camera 319 may allow vending machine 300 to perform image recognition to identify a location of the consumer's hand. Dispensing mechanism 370 may be configured to bring the product directly to the location of the consumer's hand.

In some embodiments, product dispensing area 318 may be configured to receive a bag 380. Camera 319 may determine the location of the bag 380 and an opening of bag 380. Based on the information from camera 319, dispensing mechanism 370 may place the selected products directly into bag 380. In this way, the dispensed product does not contact external objects and consumer need not directly contact the dispensed product.

In some embodiments, a bag dispenser 390 may be arranged at product dispensing area 318, as shown in FIG. 8. Bag dispenser 390 may include a bag storage area 392 configured to store a plurality of bags 380 in a collapsed configuration. Each bag 380 may include a body 382 and a handle 384 at an upper end of body 382. In some embodiments, bags 380 may be paper bags. A bag extending arm 394 may engage a first handle 384 of a bag 380 and may extend so as to cause the bag 380 to move into an expanded configuration so that dispensing mechanism 370 may place an item into bag 380. Bag extending arm 394 may include a hook 396 for grasping handle 384 of bag 380. Bag extending arm 394 may move linearly so as to move bag 380 into the expanded configuration.

Figure 9:
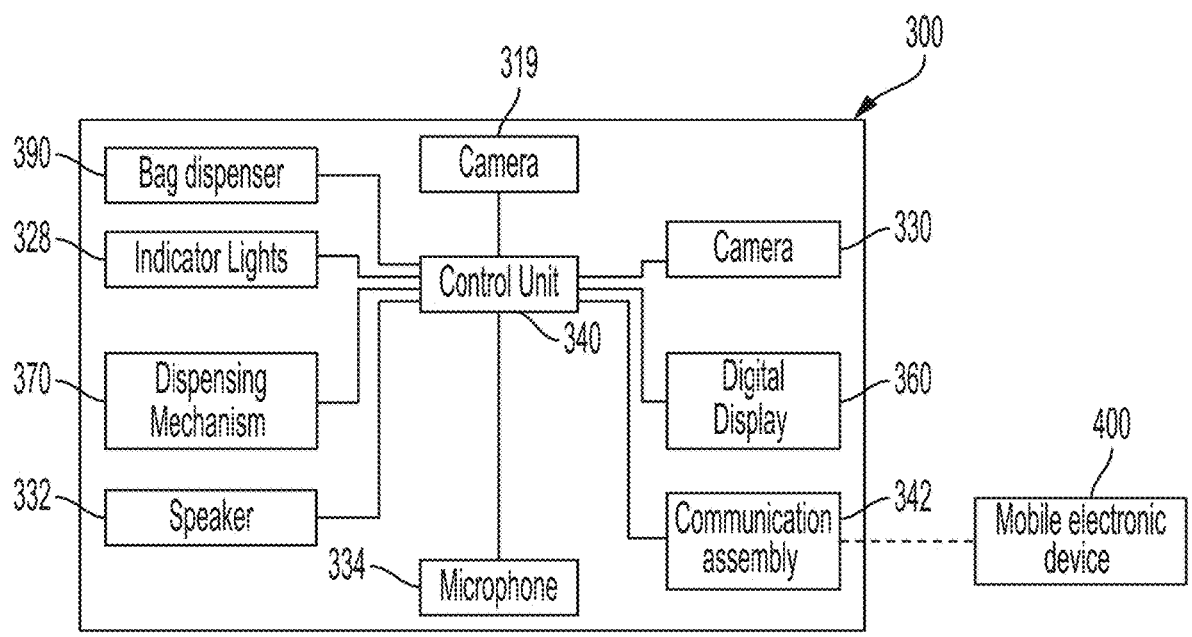
FIG. 9 shows a schematic diagram of components of the vending machine of FIG. 6 according to an embodiment.

Vending machine 300 may include a control unit 340 for controlling operation of vending machine 300, as shown in FIG. 9. Vending machine 300 may include a communication assembly 342 for receiving a product selection and payment from a mobile electronic device 400 of a consumer. Control unit 340 may be in communication with a camera 330 for identifying a consumer via facial recognition, and a microphone 334 and speaker 332 for confirming an identity of a consumer via voice recognition. Control unit 340 may illuminate indicator lights 328 to highlight the selected products, and may cause digital display 360 to show the selected products. Control unit 340 may control dispensing mechanism 370 to dispense the selected products, and may use information from camera 319 to place the selected product in a bag or in a hand of the consumer. In some embodiments, control unit 340 may operate bag dispenser 390 to open a bag and place the selected products into the bag.

Figure 10:
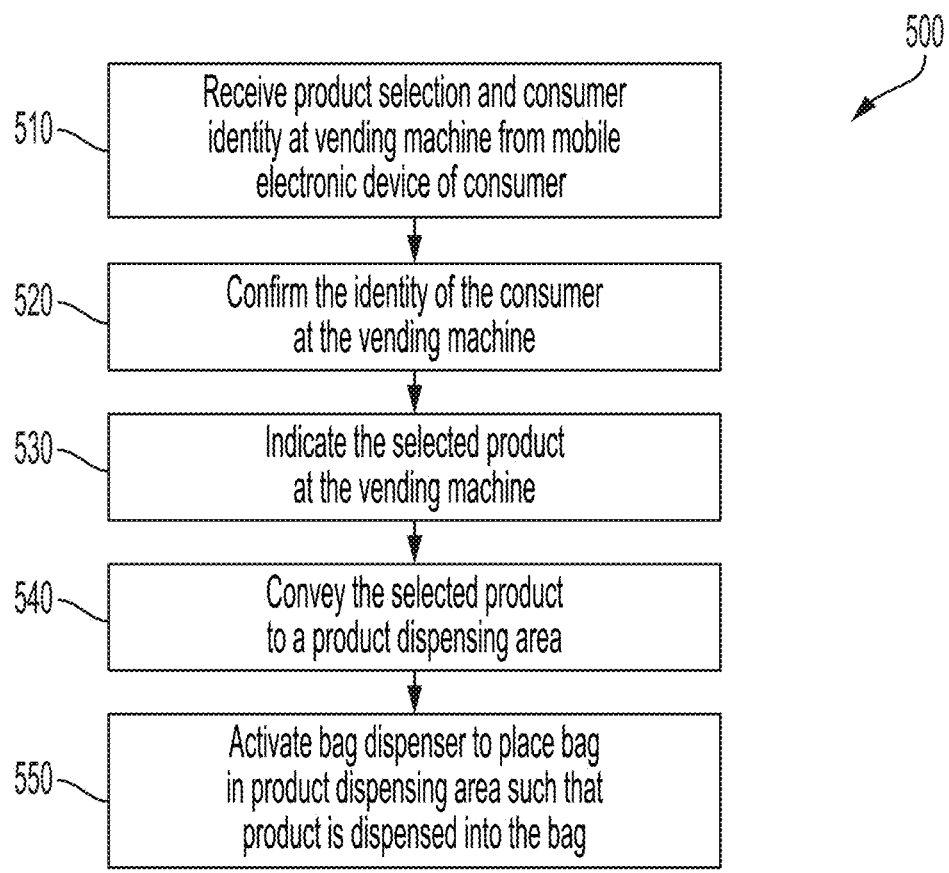
FIG. 10 shows an exemplary method of dispensing a product from the vending machine of FIG. 6.

An exemplary method of providing a product in a contactless manner 500 is shown for example in FIG. 10. A vending machine may receive a product selection and an identity of a consumer from a mobile electronic device of the consumer 510. Vending machine may also receive a payment from the mobile electronic device. Vending machine may confirm the identity of the consumer at the vending machine 520. Vending machine may confirm the identity such as by facial recognition, voice recognition, or both. Vending machine may indicate the selected products 530, such as by illuminating an indicator light or lights within a product storage compartment, by displaying the selected products on a digital display, or both. Vending machine may convey the selected products to a product dispensing area 540, such as via an articulating arm. In some embodiments, vending machine may further activate a bag dispenser to place and open a bag in product dispensing area, such that the product is dispensed into the bag 550.

Figure 11:
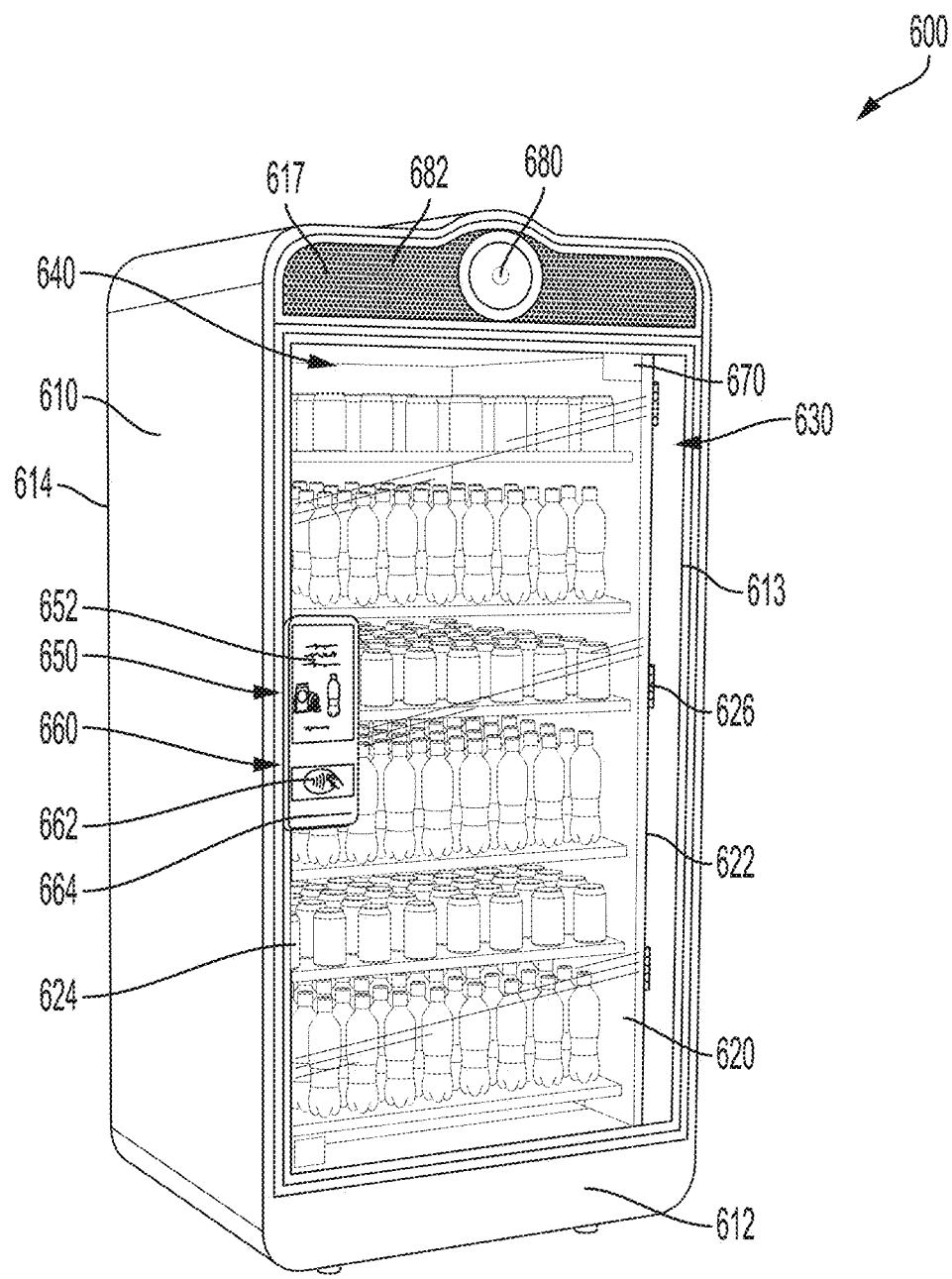
FIG. 11 shows a perspective view of a vending machine for dispensing a product in a contactless manner according to an embodiment.

Some embodiments described herein relate to a vending machine 600 as shown in FIG. 11. Vending machine 600 may include a housing 610 and one or more doors 620 defining a storage compartment 640 for storing products. Vending machine 600 may include a user interface 650 for authenticating an identity of a consumer or for receiving a payment. Upon authenticating the consumer's identity or receiving payment, user interface 650 may unlock and automatically open door 620 to provide access to storage compartment 640. When door 620 opens, door 620 may automatically move into a sanitizing compartment 630 of housing 610 that sanitizes door 620 while consumer selects products. Consumer may manually select products for purchase, and product sensors 670 may determine the identity of the products removed and automatically charge the consumer for the removed products. User interface 650 may display product information and a list of the selected products, and may complete the transaction once door 620 returns to a closed position.

Figure 13:
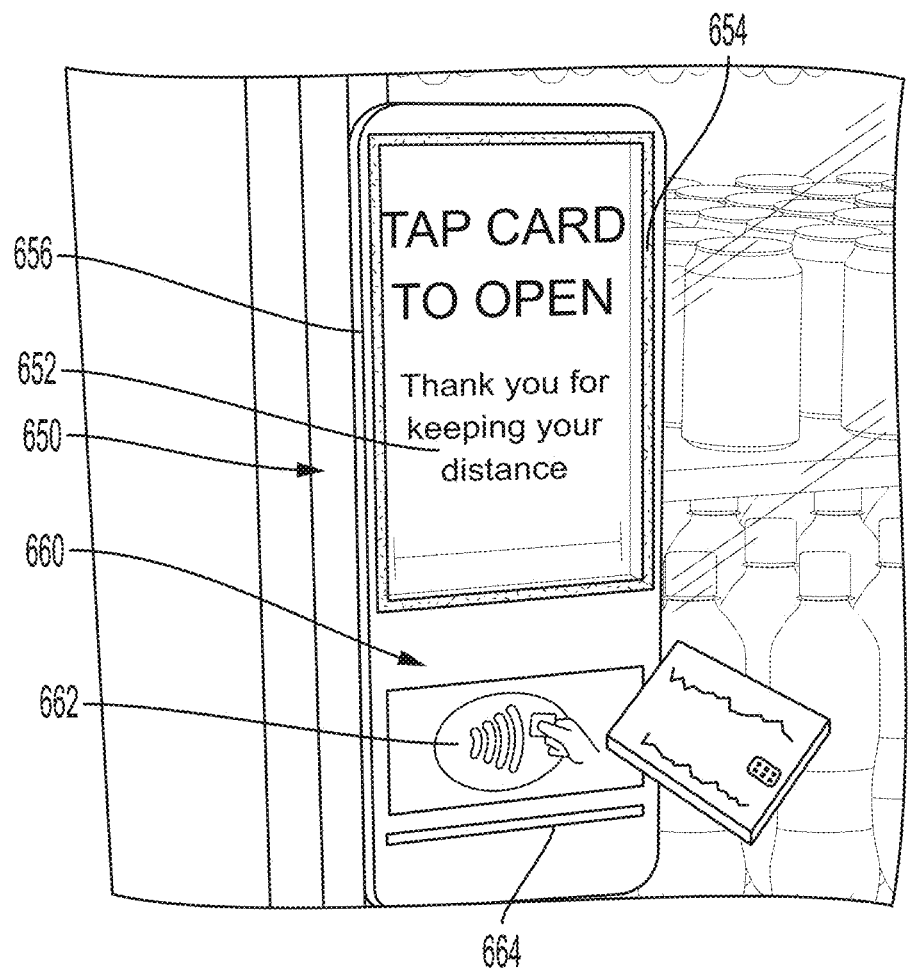
FIG. 13 shows a close-up view of a user interface of the vending machine of FIG. 11.

Vending machine 600 may include a user interface 650 as shown in FIG. 13. User interface 650 may be arranged on door 620, and may be arranged on a second end 624 of door 620, opposite a first end 622 of door 620 having hinge 626. User interface 650 may include a digital display 652 configured to display instructions for operating vending machine 600, receive payment, and display product information and advertisements, among other information. In some embodiments, an ultraviolet light source 654 may be arranged at a perimeter 656 of digital display 652. Ultraviolet light source 654 may be configured to produce UV-C light to sanitize digital display 652 when vending machine 600 is not in use.

User interface 650 may further include a payment processing unit 660. Payment processing unit 660 may be configured to receive a contactless payment. Payment processing unit 660 may receive mobile payments and may include a reader 664 for reading a QR code, such as on a mobile electronic device. Payment processing unit 660 may include a contactless payment processing unit 660, and may include a near field communication (NFC) antenna or RFID reader configured to communicate with a payment card or smartphone having a wireless antenna or RFID chip to receive a contactless payment, such as a mobile payment (e.g., Apple Pay, Google Pay). In some embodiments, payment processing unit 660 may be configured to receive other types of payment and may include a card reader for receiving payments by swiping or inserting a payment card, such as a credit card, debit card, gift card, or the like.

In some embodiments, vending machine 600 may further include an optical sensor 680, as shown in FIG. 11. Optical sensor 680 may be an infrared camera, and may have depth detection. Optical sensor 680 may be arranged on an exterior of housing 610, such as at an upper end 617 of housing 610. Optical sensor 680 may be configured to detect a consumer and a location of the consumer relative to vending machine 600. When vending machine 600 authenticates consumer or receives payment, vending machine 600 may instruct the consumer to step back to allow door 620 to open. Digital display 652 of user interface 650 may display an instruction to step back to allow door 620 to open. In some embodiments, a speaker 682 of vending machine 600 may play a message that informs the consumer to stand back. In some embodiments, a projector may project a line onto the ground in front of vending machine 600 to show the consumer where to stand while the door 620 opens, as discussed herein with respect to beverage dispenser 900 of FIG. 18. Optical sensor 680 may detect location of consumer and wait to open door 620 until consumer steps back to the desired area.

In some embodiments, optical sensor 680 may determine a distance between consumers in proximity to vending machine 600. If consumers are within a predetermined distance, vending machine 600 may provide audible feedback to instruct the consumers to maintain the predetermined distance from one another, such as six feet. In some embodiments, a consumer may be unable to initiate a transaction until the distance between consumers is reached. In this way, vending machine 600 may promote public health by encouraging social distancing and safe use of vending machine 600.

Figure 12:
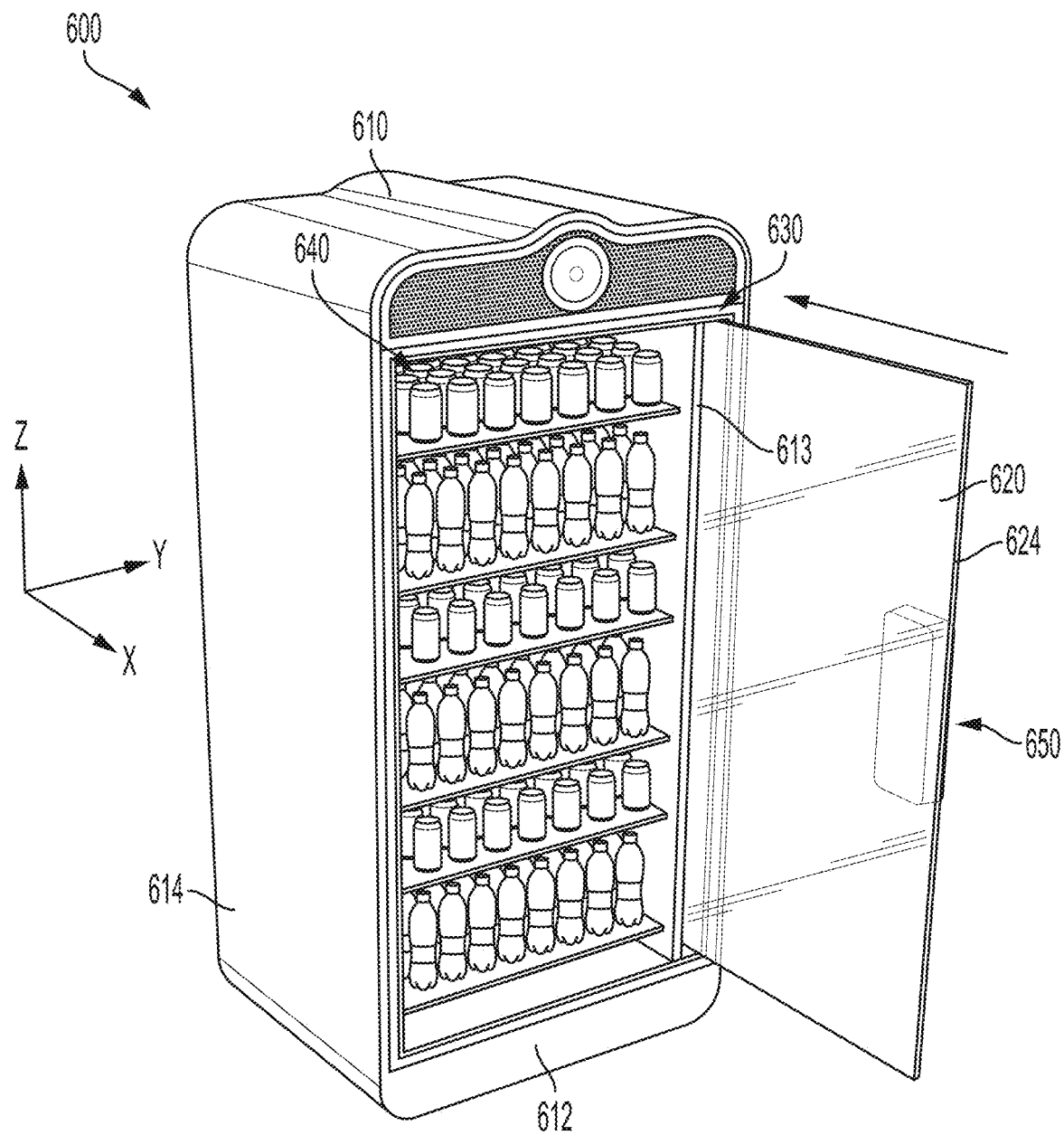
FIG. 12 shows a perspective view of the vending machine of FIG. 11 having a door in an open configuration according to an embodiment.

Vending machine 600 may further define a sanitizing compartment 630. Door 620 may be movable from a closed position in which storage compartment 640 is enclosed and products are not accessible as shown in FIG. 11, to an open position in which consumer may access storage compartment 640 as shown in FIG. 12, and to a cleaning position in which door 620 is arranged within sanitizing compartment 630. Sanitizing compartment 630 may extend from a front end 612 of housing 610 toward a rear end 614 of housing 610. Sanitizing compartment 630 may have an opening 613 at front end 612 for receiving door 620. In some embodiments, a sanitizing compartment door may cover opening 613 of sanitizing compartment 630 when vending machine 600 is not in use. Sanitizing compartment door may move to an open position to allow door 620 to move into sanitizing compartment 630 as discussed in further detail below. Sanitizing compartment door may be connected to housing 610 via a hinge or may slide on tracks mounted on housing.

When vending machine 600 is not in use, door 620 may be in a closed position in which door 620 encloses the open front wall of housing 610. In the closed position, door 620 may be arranged in a Y-Z plane. Door 620 may be rotated from the closed position to an open position via one or more hinges 626 on a first side 622 of door 620 so that door 620 is in a X-Z plane, perpendicular to Y-Z plane. Thus, door 620 may rotate about 90 degrees from the closed position to the open position. Once door 620 is moved to the open position, door 620 may then move into sanitizing compartment 630. Door 620 may move into sanitizing compartment 630 by moving linearly along the X-direction in the X-Z plane. Door 620 may slide along tracks or rails in sanitizing compartment 630 so that door 620 may be drawn into sanitizing compartment 630. An actuator may control movement of door from the open position, to the closed position, and to the sanitizing position. In this way, door 620 is sanitized while the consumer selects products from product storage compartment 640.

When consumer is finished selecting products, consumer may step back from vending machine 600. Optical sensor 680 may detect that the consumer has moved away from vending machine 600 and may automatically move door 620 to closed position when consumer steps back so that the consumer need not physically contact the door to close the door 620. Vending machine 600 may play a message to notify the consumer that door 620 is returning to a closed position. User interface 650 may display the selected products, such as the type of products selected, an image of the products, the name of the products, the number of each product selected, the cost of each product, and the total cost of the products, among other information.

In some embodiments, vending machine 600 may include two doors 620 and two sanitizing compartments 630. Doors 620 may both be arranged at a front end 612 of housing 610 and may cover a left side and a right side of front end 612 of housing 610, respectively. Each door 620 may move into its own sanitizing compartment 630 during operation of vending machine 600.

In operation, vending machine 600 may authenticate an identity of a consumer to access a user account or may receive a payment from the consumer at user interface 650. Upon authenticating the consumer or receiving a payment, door 620 may automatically unlock and move to an open position and into the sanitizing position so that door 620 is sanitized while the consumer selects products from product compartment 620. Consumer may remove products from storage compartment 640 and as the products are removed sensors 670 may determine the identity of the products removed. Consumer may also return a product that has been removed by placing the product back into the storage compartment 640. Sensors 670 may also detect return of the product. Once the consumer is finished removing products, the consumer may step back from vending machine 600 so that door 620 may automatically return to the closed position. Display of user interface 650 may list or display products removed by the consumer in a virtual shopping cart. User interface 650 may complete transaction automatically, or may receive an input from the consumer to complete the transaction. In some embodiments, vending machine 600 may communicate a receipt to a mobile electronic device of a consumer, such as by email, text message, or by a message in a user account. In some embodiments, a mobile electronic device 400 may display a user account having a graphic user interface. Mobile electronic device 400 may display the products selected by the consumer. Mobile electronic device 400 may display a receipt of the transaction to show the consumer the products purchased and the price of the products, among other information about the transaction.

Figure 14:
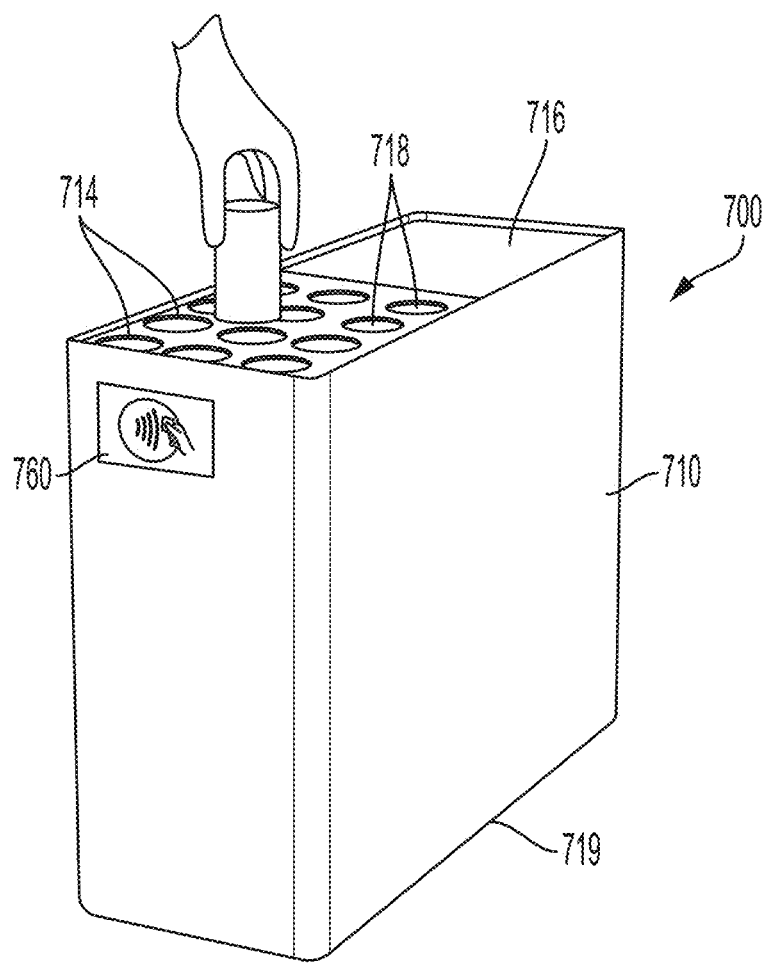
FIG. 14 shows a perspective view of a return module for use with a vending machine according to an embodiment.

Vending machines, such as vending machines 100, 300, 600 may further include a return module 700 as shown for example in FIG. 14. As vending machines are unattended, consumers are generally unable to return a product in the event that the consumer changes his or her mind, accidentally selects the wrong product, or a damaged or expired product is dispensed. As a result, the consumer may be unsatisfied with the vending experience and may not make further purchases. In order to provide the consumer with ability to return a product in an unattended manner, any vending machine described herein may include a return module 700.

Return module 700 may include a housing 710 having an upper end 716 opposite a base 719. Housing 710 may define an interior volume 712. Interior volume 712 may be enclosed by housing 710 so that products inserted into return module 700 are not readily retrieved by consumers. Housing 710 may include one or more return slots 714 for receiving unwanted products. Return slots 714 may be arranged on upper end 716 of housing 710 and may be shaped similarly to a transverse cross-sectional shape of a product. For example, return slot 714 may have a circular shape for receiving a bottled beverage, and a diameter of return slot 714 may be similar to that of a bottled beverage. Return slot 714 may have a rectangular shape for returns of bagged snacks, such as a bag of chips, and return slot 714 may have a maximum diameter similar to the width of the bagged snack. Return slots 714 may be sufficiently small in diameter to prevent a consumer's hand from entering interior volume 712 of housing 710 and withdrawing a product.

In some embodiments, return slots 714 may include doors 718 that cover slots 714. Doors 718 may be movable from a closed configuration in which doors 718 cover slots 714 to an open configuration. Doors 718 may be biased in the closed configuration so that when return module 700 is not in use, return slots 714 are covered by doors 718. In this way, doors 718 may help to prevent debris, precipitation, and insects, among other extraneous matter from entering interior volume 712 of return module 700. Further, doors 718 may also prevent consumers from withdrawing products from return module 700.

Figure 15:
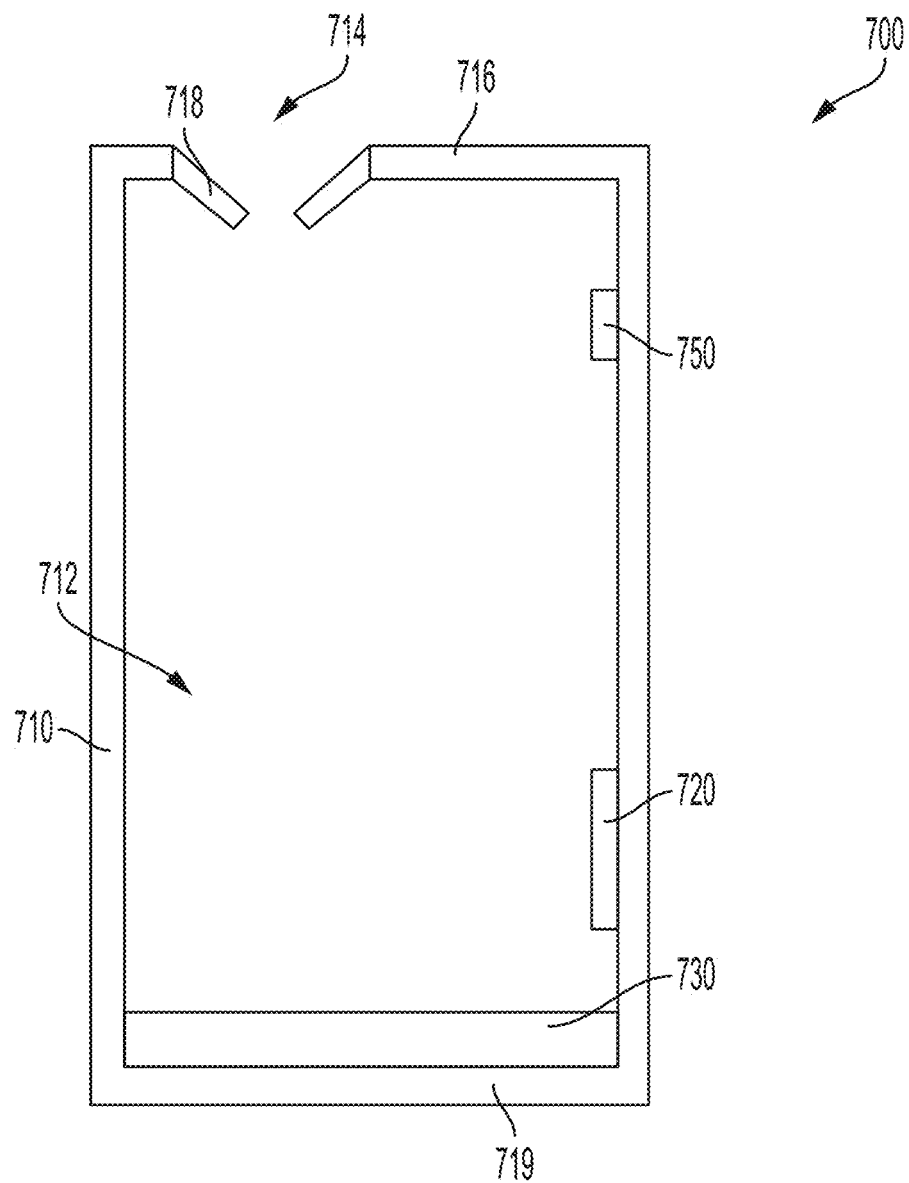
FIG. 15 shows a cross sectional view of a return module according to an embodiment.

Return module 700 may include a barcode reader 720 within interior volume 712 of housing 710, as shown in FIG. 15. Barcode reader 720 may be configured to read a barcode of a product placed in return module 700 via a return slot 714 to identify the returned product. In some embodiments, product may include a barcode on a lower end or bottom of the product, and barcode reader 720 may be configured to read the barcode as the product is moving through return slot 714 into the interior volume of return module 700.

Return module 700 may require periodic emptying by an operator of a vending machine associated with return module 700. In some embodiments, return module 700 may lock doors 718 in the closed configuration when return module 700 is full. Return module 700 may include an audio unit configured to play a message to alert a consumer that return module 700 is full. In some embodiments, a weight sensor 730 may detect a total weight of products within return module 700, and upon reaching a predetermined maximum weight, return module 700 may lock doors 718 to prevent further returns from being made until an operator empties return module 700. Further, upon reaching the maximum weight, communication assembly 744 of return module 700 may send a signal or message to a remote computer or server to notify an operator that return module 700 is full and requires emptying.

In some embodiments, a return module 700 may alternatively or additionally include a capacity sensor 750. Capacity sensor 750 may be arranged within interior volume 712 toward upper end 716 of housing 710. As products are returned, products may accumulate within interior volume 712, and capacity sensor 750 may detect that products within interior volume 712 have reached a certain height or level within return module 700, indicating that return module 700 is full.

In some embodiments, interior volume 712 of return module 700 may be divided into a plurality of compartments, and each compartment may correspond to a single return slot 714. Once a compartment is full, the door of the corresponding return slot 714 may close so that no further products may be returned via that return slot 714. For example, a first compartment of return module 700 may be configured to receive one product, and once a product is inserted through a first return slot into the first compartment, the door of the first return slot may close so that no other products may be returned via the first return slot.

Return module 700 may further include a weight sensor 730, as shown in FIG. 15. Weight sensor 730 may be arranged on or incorporated into a base 719 of housing 710. In this way, when a product is placed in return module 700, weight sensor 730 may determine a weight of the returned product. The weight of the returned product may be used to confirm the identity of the returned product. Further, weight sensor 730 may help to detect tampering with the product. For example, if barcode reader 720 determines the returned product is a bottle of Pepsi, weight sensor 730 may detect a weight of the bottle of Pepsi and return module 700 may compare the weight of the returned product as determined by weight sensor 730 with the known weight of a bottle of Pepsi to ensure that the consumer did not consume the bottle of Pepsi or otherwise tamper with the product prior to returning the product.

Figure 16:
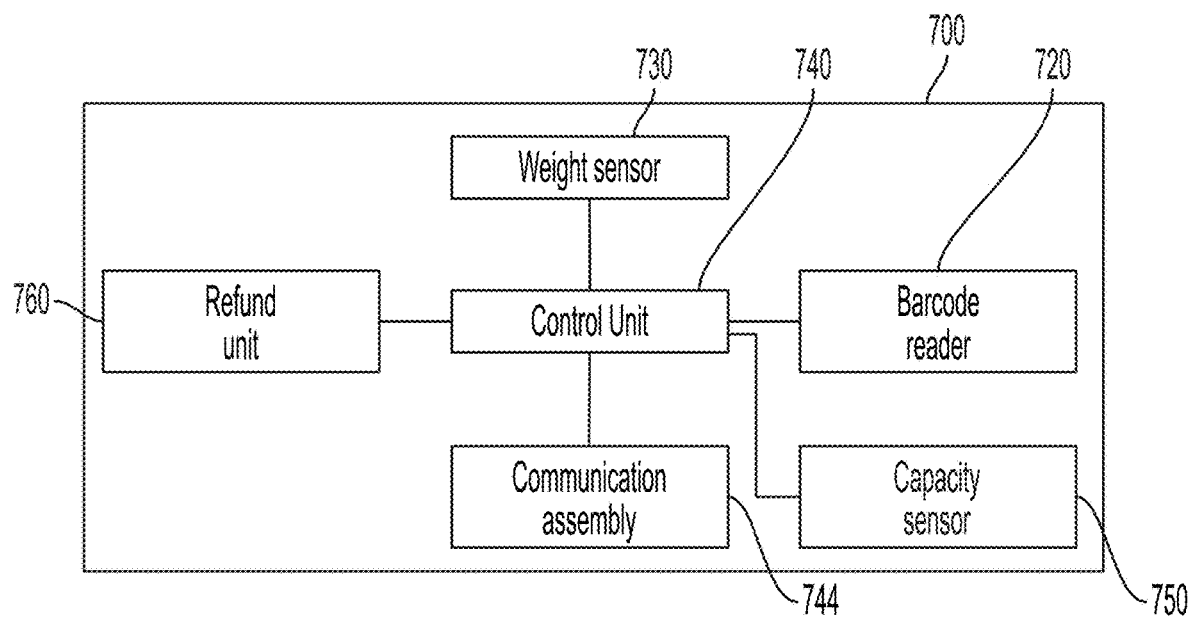
FIG. 16 shows a schematic diagram of components of a return module according to an embodiment.

Return module 700 may include a control unit 740 in communication with the barcode reader 720 and weight sensor 730, as shown in FIG. 16. Control unit 740 may include a memory for storing a database of product information. Return module 700 may include a communication assembly 744 in communication with a remote computer or server. When barcode reader 720 reads a barcode of a returned product, the information from the barcode may be communicated via communication assembly 744 to the remote computer or server to determine the identity of the returned product based on the information from the barcode. The product identity may be returned to return module 700 along with other product information, such as the weight of the product and the price of the product. In this way, product identification may occur remotely and the product identification may be communicated to return module 700.

Return module 700 may include a refund unit 760 configured to issue the consumer a refund for the returned product in a contactless manner. Return module 700 determines the identity of the returned product and the cost of the returned product as discussed herein. The consumer may receive a refund for the returned product as identified by the return module 700. Refund unit 760 may include a near field communication (NFC) antenna or RFID reader configured to communicate with a payment source of a consumer, such as a payment card or mobile electronic device. Refund unit 760 may provide a mobile payment to a mobile electronic device of a consumer. Refund unit 760 may transfer the cost of the returned product back to the consumer's payment source.

Figure 17:
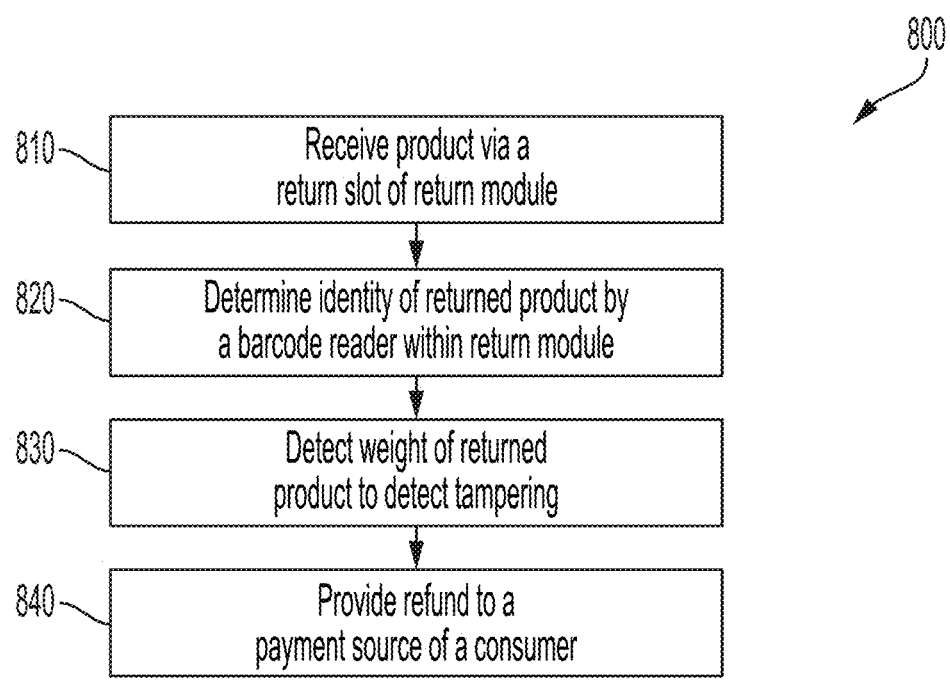
FIG. 17 shows an exemplary method of returning a product using a return module according to an embodiment.

An exemplary method for returning a product using a return module 800 according to an embodiment is shown for example in FIG. 17. Return module may receive a product via a return slot 810. A barcode reader within return module may determine an identity of the returned product 820. Barcode reader may read the barcode of a product and use information from the barcode to determine the product identity. Product identification may occur on-site, at the return module, or may occur remotely from the return module. A weight sensor may detect a weight of the returned product 830. This may help to ensure that the returned product has not been consumed or tampered with. Detecting weight of product 830 may also help to confirm the identity of the product. Once a product has been identified and no tampering is detected, return module may issue a refund to a payment source of the consumer 840. Refund may be issue via a contactless payment method, such as via a NFC antenna, RFID antenna, mobile payment, or other wireless payment method.

Figure 18:
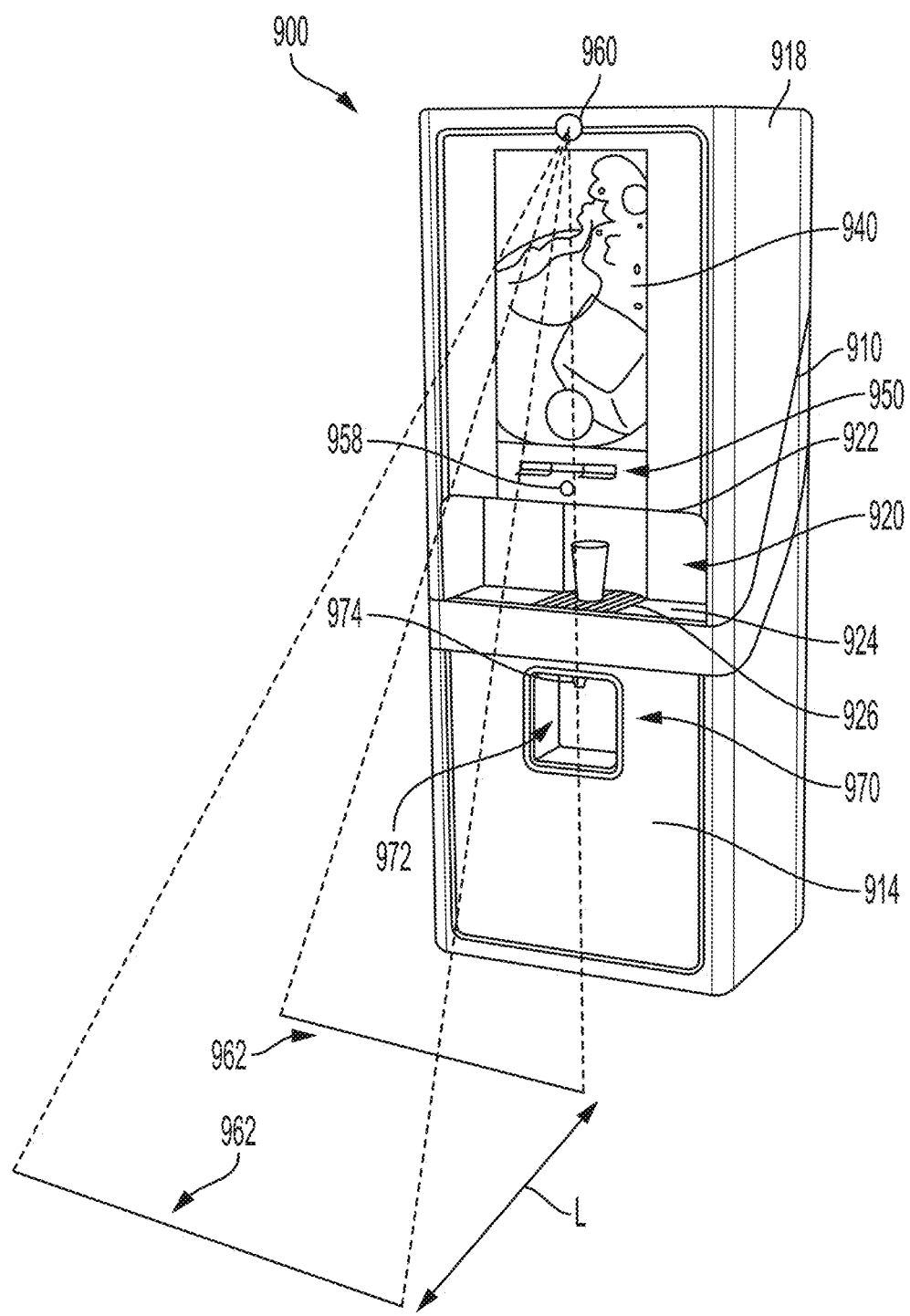
FIG. 18 shows a perspective view of a digital beverage dispenser for dispensing a beverage in a contactless manner according to an embodiment.

Some embodiments described herein relate to a beverage dispenser 900 for dispensing a beverage in a contactless manner, as shown in FIG. 18. Beverage dispenser 900 may include a housing 910 defining a beverage container receiving area 920. Beverage container receiving area 920 may be configured to receive a beverage container, such as a cup or bottle to be filled with a beverage. Beverage dispenser 900 may further include one or more dispensing nozzles 930 arranged on housing 910 for dispensing a beverage into the beverage container. Dispensing nozzle 930 may be arranged on housing 910, such as at an upper end 922 of beverage container receiving area 920 for dispensing a beverage into a beverage container arranged within beverage container receiving area 920. Dispensing nozzles 930 may be pre-mix nozzles or post-mix nozzles. In some embodiments, beverage dispenser 900 may include a bottom-filling dispensing nozzle configured to dispense a beverage into a lower end of a beverage container that is configured to engage with a bottom-filling dispensing nozzle. A drip tray 926 may be arranged at a lower end 924 of beverage container receiving area 920 to collect spills or excess liquid from dispensing nozzle 930.

Figure 19:
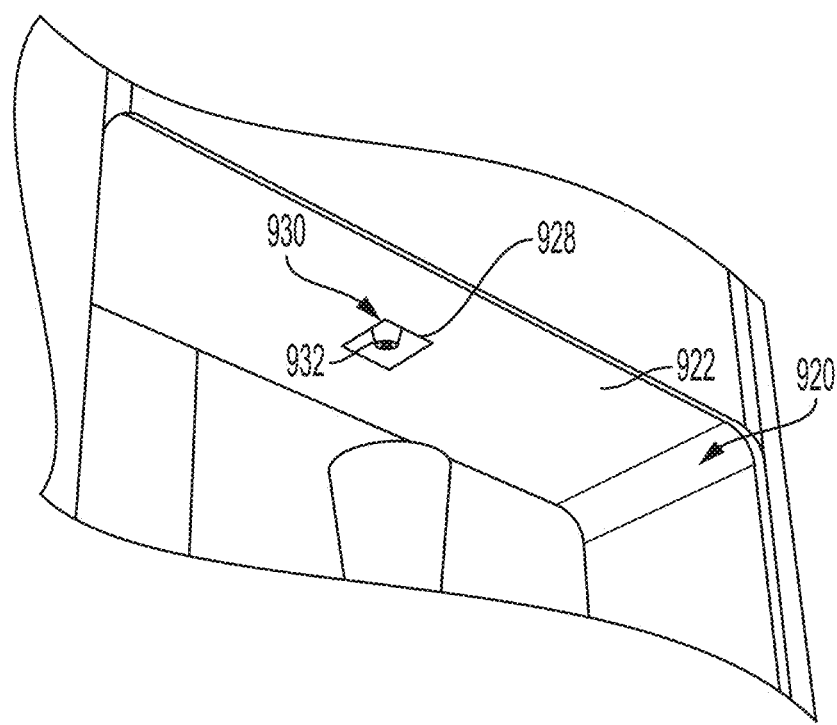
FIG. 19 shows a view of a dispensing nozzle of the digital beverage dispenser of FIG. 18.

In some embodiments, dispensing nozzle 930 may be arranged within a recess 928 of upper end 922 of beverage container receiving area 920, as shown in FIG. 19. In this way, dispensing nozzle 930 is hidden from consumers and is not readily contacted by consumers. In some embodiments, a lower end 932 of dispensing nozzle 930 may be arranged at or above upper end 922 of beverage container receiving area 920.

Beverage dispenser 900 may include a digital display 940, as shown in FIG. 18. Digital display 940 may include a touch screen display so as to receive input from a consumer, such as a capacitive touch screen or a resistive touch screen. In some embodiments, consumer may operate digital display 940 using a stylus. In this way, consumer need not physically touch digital display 940, such as with his or her hands or fingers. This may help to prevent the spread of germs that may occur from consumers contacting the digital display 940.

Digital display 940 may display beverage selection options for a consumer to select. In some embodiments, digital display 940 may display different types of beverages, and may display beverage ingredients such as flavorings and the like. In some embodiments, digital display 940 may display product information such as nutrition information and the like. Digital display 940 may receive a user selection of a beverage to be dispensed. Digital display 940 may further be used to initiate dispensing of the selected beverage.

Figure 20:
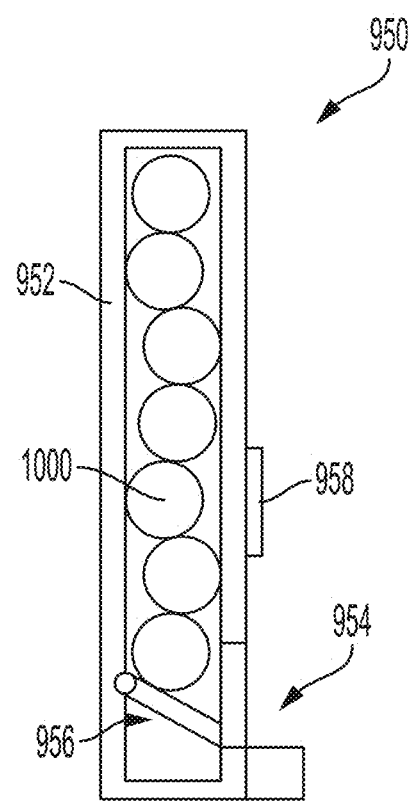
FIG. 20 shows a diagrammatic view of a straw dispenser of the digital beverage dispenser of FIG. 18 according to an embodiment.

In some embodiments, beverage dispenser 900 may further include a straw dispenser 950. Straw dispenser 950 may include a storage compartment 952 for storing a plurality of straws and a dispensing outlet 954 for providing a consumer with access to a straw, as best shown in FIG. 20. Straws may be arranged in a horizontal orientation and may be stacked on top of one another. Straws may move toward dispensing outlet 954 under the force of gravity. Storage compartment 952 may be arranged within housing 910 of beverage dispenser 900. Straw dispenser 950 may further include a dispensing mechanism 956 configured to cause a straw within storage compartment 952 to move to dispensing outlet 954 for access by the consumer. Dispensing mechanism 956 may include a movable gate configured to retain straws in storage compartment 952 and to move to release a single straw to dispensing outlet 954. However, one of ordinary skill in the art will understand that any of various dispensing mechanisms may be used for releasing a straw from a storage compartment, such as a rotatable mechanism.

Straw dispenser 950 may include a proximity sensor 958 arranged on housing 910 of beverage dispenser 900 that is configured to detect a consumer. In some embodiments, proximity sensor 958 may be configured to detect a consumer within a predetermined detection distance of beverage dispenser 900. In this way, when consumer approaches beverage dispenser 900, consumer's presence activates proximity sensor 958 causing a straw to be dispensed. Consumer may then use the straw to operate the digital display 940.

In some embodiments, proximity sensor 958 may be configured to detect a hand of a consumer within a predetermined detection distance of proximity sensor 958. When a hand is detected, straw dispenser 950 may actuate dispensing mechanism 956 to cause a straw to be dispensed from storage compartment 952 to dispensing outlet 954. In this way, the consumer can choose whether to dispense a straw and may place his or her hand within the predetermined detection distance of the proximity sensor 958 in order to dispense a straw in a contactless manner.

Figure 21:
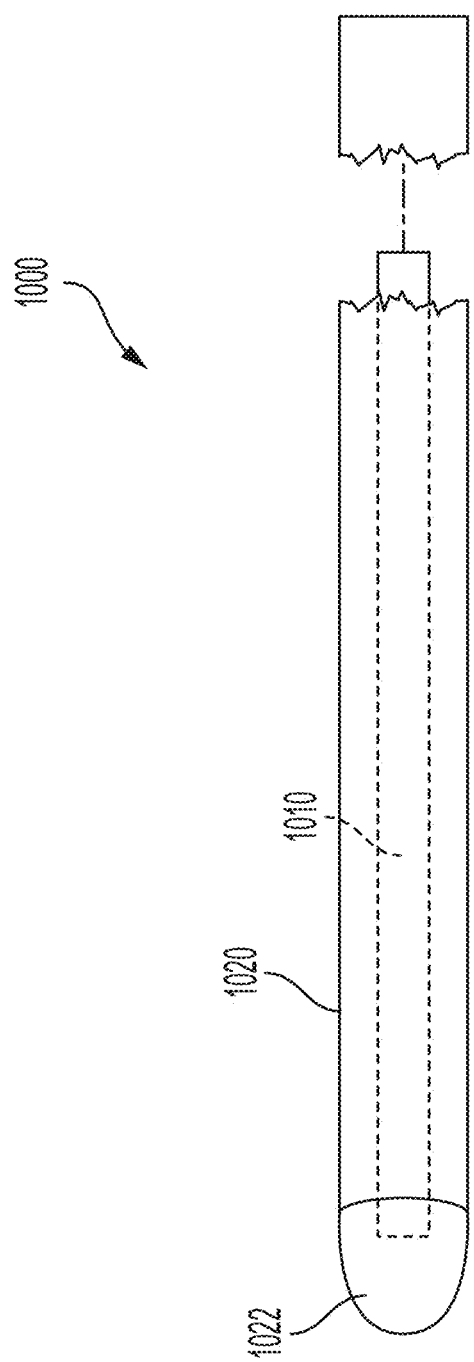
FIG. 21 shows a perspective view of a straw having a wrapper with a tip for use with the digital beverage dispenser of FIG. 18 according to an embodiment.

In some embodiments, the straw 1000 dispensed from beverage dispenser 900 may serve as a stylus for operating digital display 940 of beverage dispenser 900. In such embodiments, straw 1000 may include a tubular body 1010 enclosed within a wrapper 1020, as shown in FIG. 21. Wrapper 1020 may be easily torn to reveal tubular body 1010. In some embodiments, wrapper 1020 may be made of paper. Wrapper 1020 may include a tip 1022 configured to be used to contact digital display 940. In some embodiments, tip 1022 may be arranged at one or both ends of wrapper 1020. Tip 1022 may include a conductive material, such as rubber, so that straw 1000 may be used to operate a capacitive touch screen. Tip 1022 may include a rigid material, such as a hard plastic, to operate a resistive touch screen. Once consumer has used straw 1000 for operating digital display 940, consumer may discard wrapper 1020 and tip 1022 and may use the straw to consume the dispensed beverage.

In some embodiments, beverage dispenser 900 may include a projector 960 configured to project an image 962 on a surface adjacent beverage dispenser 900 as shown in FIG. 18. Projector 960 may project an image 962 onto the floor or ground in front of beverage dispenser 900. Projector 960 may be arranged on an upper end 918 of housing 910 of beverage dispenser 900 at a front 914 of housing 910. In some embodiments, projector 960 may include a light or laser. In some embodiments, projector 960 may project an image 962 of one or more lines in front of beverage dispenser 900. The lines may be separated by a fixed distance, L, such as 6 feet. In this way, beverage dispenser 900 may encourage social distancing of consumers who are waiting to use beverage dispenser 900.

Figure 22:
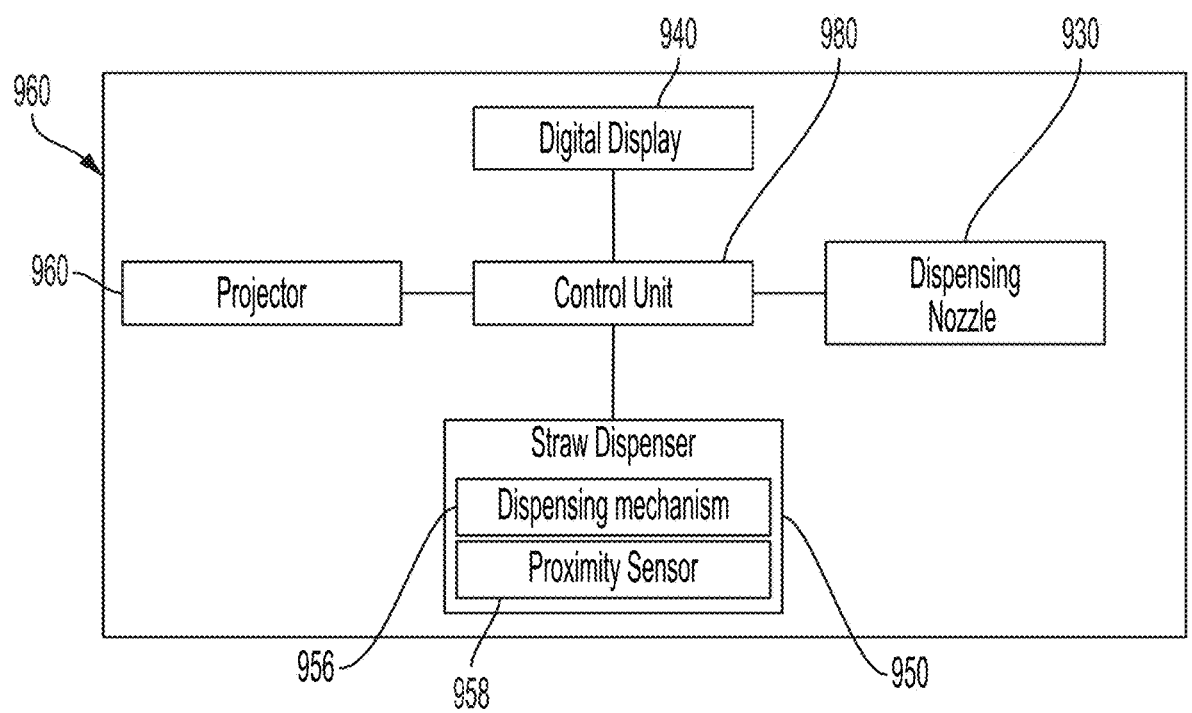
FIG. 22 shows a schematic diagram of components of the digital beverage dispenser of FIG. 18 according to an embodiment.

Beverage dispenser 900 may include a control unit 980 for controlling operation of beverage dispenser 900, as shown in FIG. 22. Control unit 980 may be in communication with straw dispenser 950 such that when proximity sensor 958 detects a consumer, control unit 980 activates dispensing mechanism 956 to dispense a straw. Control unit 980 may be in communication with digital display 940 to receive a beverage selection of the consumer and may cause beverage to be dispensed via dispensing nozzle 930. Control unit 980 may further be in communication with projector 960 for projecting a desired image onto a ground in front of dispenser.

In some embodiments, beverage dispenser 900 may include a sanitizer 970. In such embodiments, housing 910 may define a sanitizing area 972. Sanitizing area 972 may be located below beverage container receiving area 920. A dispensing nozzle 974 may be arranged within sanitizing area 972. Dispensing nozzle 974 may be configured to dispense a sanitizing solution, such as a hand sanitizer. Sanitizer 970 may include a storage vessel arranged within housing 910 and in communication with dispensing nozzle 974. Sanitizer 970 may include a sensor to detect a hand of a consumer in sanitizing area 972. Sensor may be a proximity sensor or a motion sensor, among others. Upon detection of a hand of a consumer, sanitizer 970 may automatically dispense a quantity of the sanitizing solution.

Figure 25:
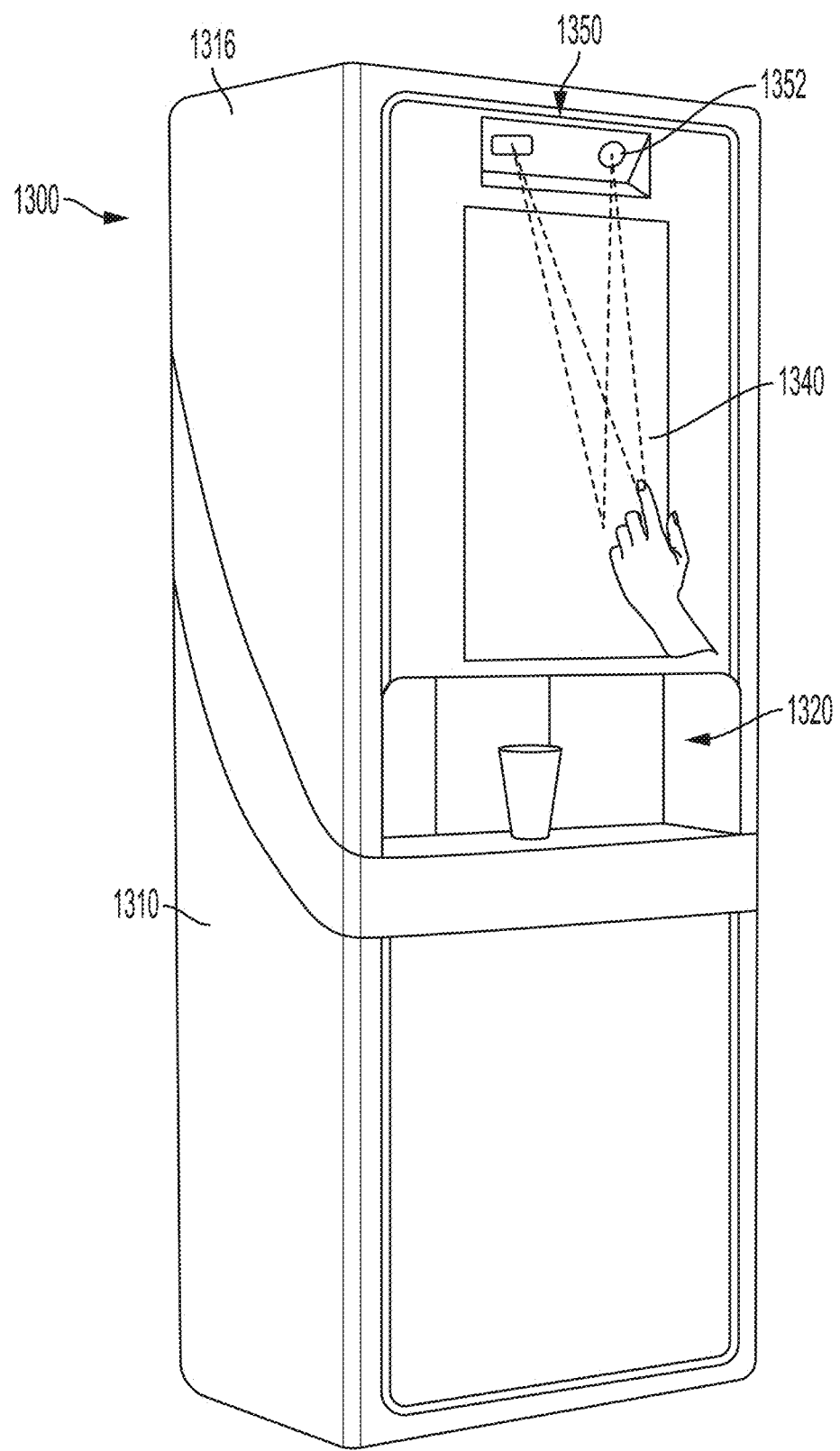
FIG. 25 shows a perspective view of a digital beverage dispenser according to an embodiment.

In some embodiments, a beverage dispenser 1300 may be operated via gesture control, as shown in FIG. 25. Beverage dispenser 1300 may include the same features as beverage dispenser 900. Beverage dispenser 1300 may include a housing 1310 defining a beverage container receiving area 1320 configured to receive a beverage container. A digital display 1340 may be arranged on housing 1310. Rather than operating digital display 1340 by touching with a stylus, a consumer may use hand gestures to make selection.

Beverage dispenser 1300 may include a camera module 1350 having one or more cameras 1352. Camera module 1350 may be arranged at an upper end 1316 of housing 1310. In some embodiments, camera module 1352 may include a first camera 1352 that is an RGB camera to detect a consumer's face, hands, and other objects, and a second camera that serves as a depth sensor to facilitate detection of specific movements. In some embodiments, camera module 1350 may be used to perform facial recognition of a consumer. Beverage dispenser 1300 may use information from camera module 1350 to determine an identity of the consumer. Once the identity is determined, a user account having stored payment information may be charged for the transaction. User account may be a pre-paid account or user account may be linked to a payment source such as a payment card or banking information, and the like. In some embodiments, beverage dispenser 1300 may be configured to communicate with a mobile electronic device of a consumer. Once beverage dispenser 1300 recognizes the consumer via facial recognition, consumer may receive an alert via mobile electronic device. User may use mobile electronic device to confirm payment.

In some embodiments, beverage dispenser 1300 may receive payment by camera module 1350 reading a QR code presented by the consumer. Consumer may present a QR code corresponding to a payment, such as a mobile payment. In some embodiments, a beverage container may include a QR code. Consumer may purchase the beverage container having the QR code, wherein the QR code indicates that the consumer has provided payment. In some embodiments, beverage dispenser 1300 may include a payment processing unit as described herein.

Figure 26:
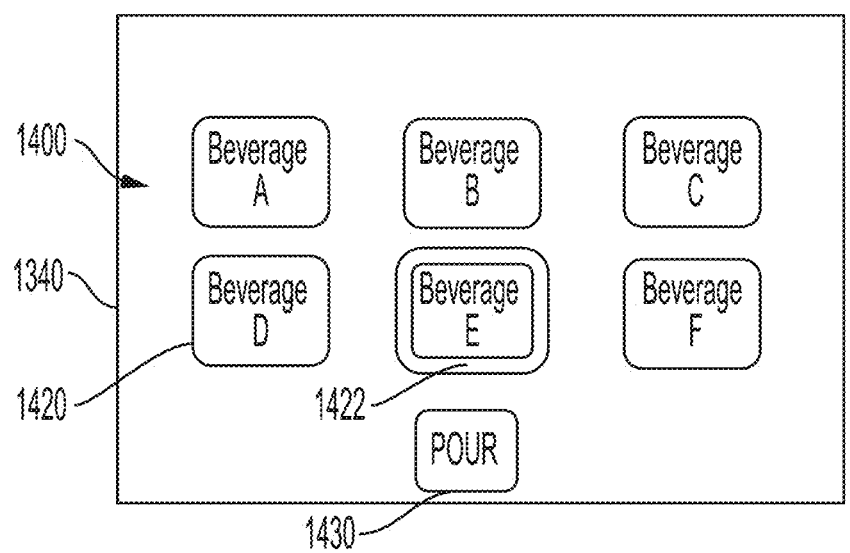
FIG. 26 shows a graphical user interface of the digital beverage dispenser of FIG. 25 according to an embodiment.

Digital display 1340 may display a graphic user interface (GUI) 1400 for selecting and dispensing a beverage, as shown for example in FIG. 26. GUI 1400 may display beverage selections 1420, and beverage modifications, such as flavoring additions and the like. Consumer may make a beverage selection by holding his or her hand near the desired beverage option on digital display 1340 and camera module may detect the movement and location of the consumer's hand. As consumer moves his or her hand in a particular direction, such as up, down, left, or right, the selected icon on GUI 1400 may move in the same direction. For example, a first icon may be selected and as a consumer moves his hand to the left, a second icon left of the first icon may then be selected in response to the movement of the consumer's hand. In some embodiments, GUI 1400 may display an indicator 1422 that moves based on movement of the consumers hand. Consumer may make a swiping motion in a particular direction to navigate through a series of selections. Once the desired item is selected, the consumer may make a pressing motion by moving his or her hand closer to digital display 1340 in order to confirm the selection. Consumer may select a dispense or pour icon 1430 to initiate dispensing of the selected beverage.

In some embodiments, beverage dispenser 1300 may detect a first gesture for selecting a beverage. The first gesture may be a swiping motion for navigating available beverage options. GUI 1400 may illuminate the selected beverage option in order to indicate to the consumer that a particular beverage option has been selected. A second gesture may be detected for dispensing the selected beverage. For example, second gesture may include a pressing motion in which the consumer's hand moves in a direction toward digital display 1340. Digital display 1340 may provide instructions as to which gestures to use to select and dispense a beverage.

Figure 23A:
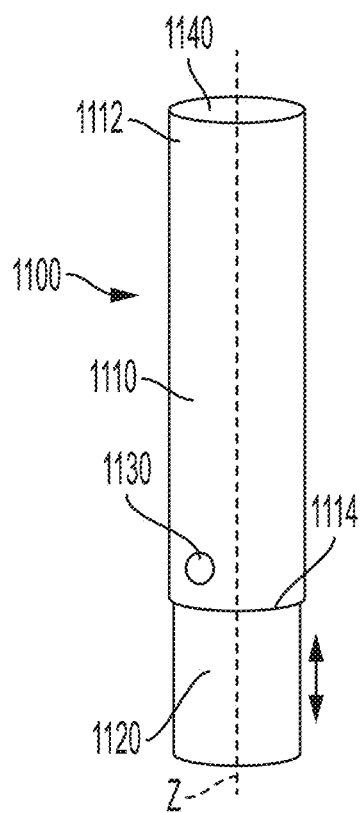
FIGS. 23A and 23B show views of a cup dispenser as used to dispense a cup according to an embodiment.
Figure 23B:
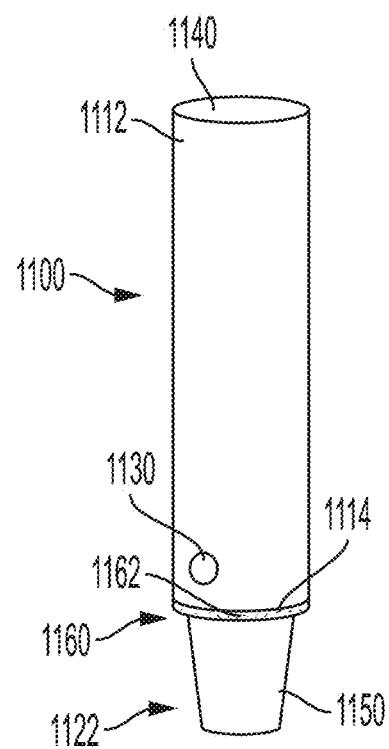

Some embodiments described herein relate to a cup dispenser 1100 for dispensing a cup to a consumer in a contactless manner, as shown in FIGS. 23A and 23B. Cup dispenser 1100 may be integrally formed with a beverage dispenser, such as beverage dispenser 900 or beverage dispenser 1300. In other embodiments, cup dispenser 1100 may be arranged separately from a beverage dispenser, and may be arranged adjacent to a beverage dispenser, or may be arranged in a self-service area.

Cup dispenser 1100 may include a housing 1110 having an interior volume for storing a plurality of cups 1150. Cups 1150 may be stored in a stacked orientation within interior volume of housing 1110. Housing 1110 may have a tubular shape and may have an upper end 1112 opposite a lower end 1114. In some embodiments, housing 1110 may have a cylindrical configuration. Cup dispenser 1100 may be arranged in a vertical orientation such that upper end 1112 is located above lower end 1114. Upper end 1112 may be closed and lower end 1114 may be open so that cups 1150 may be dispensed from lower end 1114 of housing 1110.

Upper end 1112 may include a removable cover 1140 so that an operator may fill cup dispenser 1100 with cups 1150 by inserting cups into housing 1110 via upper end 1112 of housing 1110 when cups are depleted.

Cups 1150 may be stored within interior volume of housing 1110 with a lower end of each cup 1150 projecting downward toward lower end 1114 of housing 1110, such that cups are dispensed in a right-side-up orientation. Cup dispenser 1100 may include a movable shell 1120 that is movable relative to housing 1110. Movable shell 1120 may have a tubular configuration so as to surround a cup dispensing area 1122. Movable shell 1120 may extend outwardly from lower end 1114 of housing 110 so as to cover a cup 1150 in cup dispensing area 1122. In this way, movable shell 1120 helps to ensure that cups 1150 are clean and sanitary. Movable shell 1120 may move from an extended configuration to a retracted configuration to reveal the cup 1150. Movable shell 1120 may move linearly and in a direction parallel to a longitudinal axis Z of cup dispenser 1100. In some embodiments, movable shell 1120 may have a diameter less than a diameter of housing 1110 so that movable shell 1120 may move telescopically into an interior volume of housing 1110 when a consumer wishes to dispense a cup in order to provide access to the cup. However, in some embodiments movable shell 1120 may have a diameter greater than a diameter of housing 1110 so that movable shell 1120 moves along an exterior surface of housing 1110.

Cup dispenser 1100 may further include a sensor 1130 configured to cause movable shell 1120 to move from the extended configuration to the retracted configuration so that a consumer may access a cup 1150 in cup dispensing area 1122. Sensor 1130 may be arranged on housing 1110 of cup dispenser 1100. In some embodiments, sensor 1130 may be a proximity sensor. In such embodiments, sensor 1130 may be configured to detect a consumer's hand or other object within a predetermined detection distance of sensor 1130. In this way, a consumer may position his or her hand within the predetermined detection distance of sensor 1130 in order to dispense a cup in a contactless manner.

In some embodiments, cup dispenser 1110 may include a sanitizer 1160. Sanitizer 1160 may include an ultraviolet light source 1162 configured to produce UV-C radiation to sanitize cup 1150 in cup dispensing area 1122. Light source 1162 may be arranged at lower end 1114 of housing 1110, and may extend around a perimeter of lower end 1114 of housing 1110. In this way, cup 1150 is sanitized prior to use by a consumer for holding and consuming a beverage.

Figure 24:
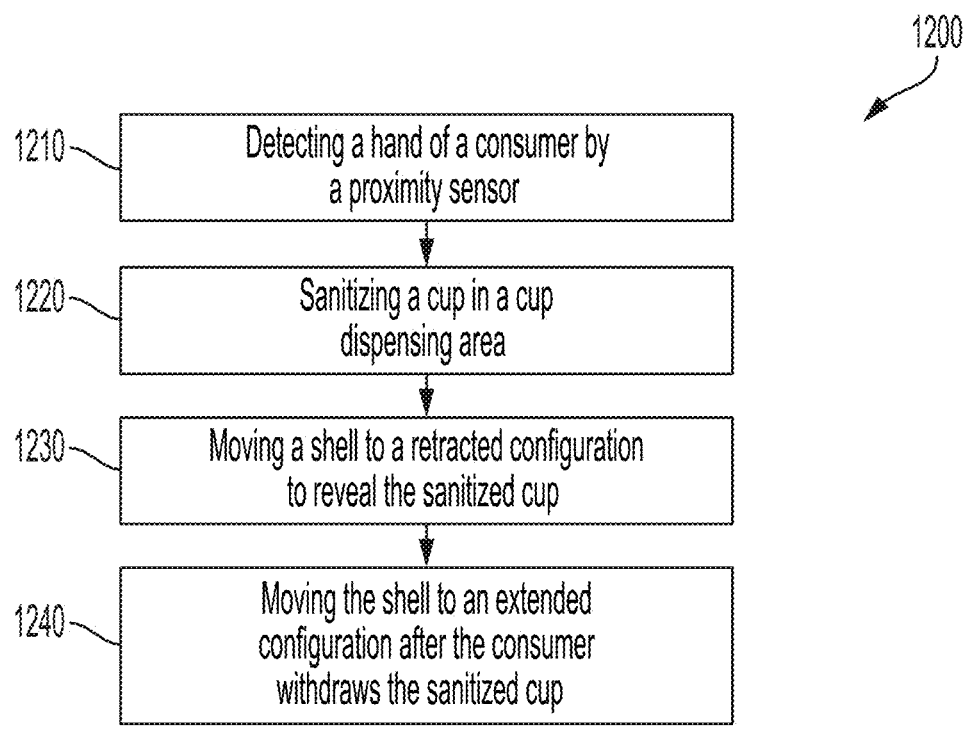
FIG. 24 shows an exemplary method of dispensing a cup from a cup dispenser according to an embodiment.

An exemplary method of dispensing a cup in a contactless manner 1200 is shown for example in FIG. 24. A proximity sensor of the cup dispenser detects a hand of a consumer 1210. Upon detecting a hand of the consumer, a sanitizer sanitizes a cup in a cup dispensing area 1220. For example, an ultraviolet light source may produce UV-C radiation to sanitize the cup. A movable shell of the cup dispenser may move from an extended position to a retracted position to reveal the sanitized cup 1230. The consumer may then retrieve the sanitized cup. The movable shell may return to the extended configuration to cover the cup dispensing area after the sanitized cup has been removed 1240.

Figure 27:
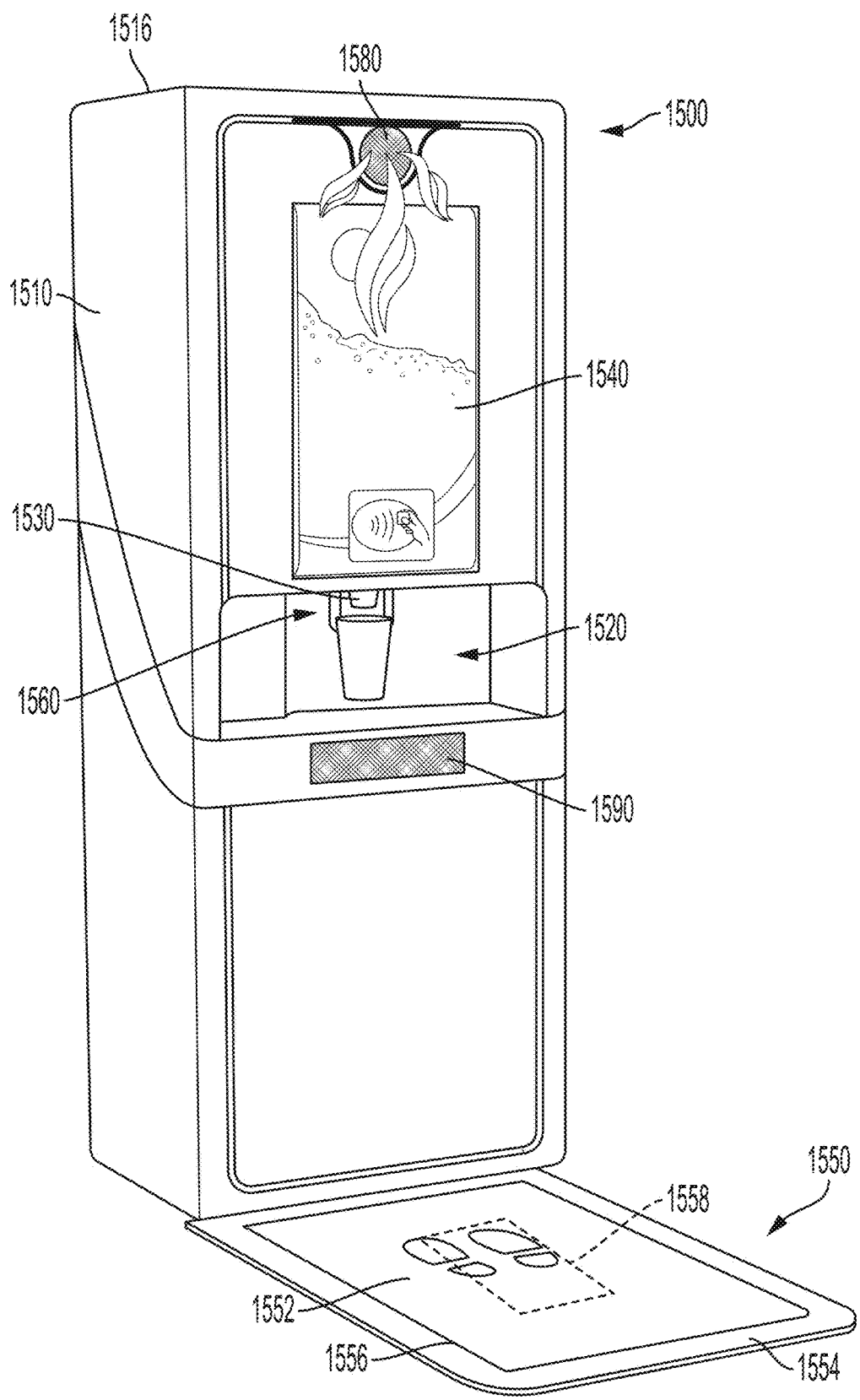
FIG. 27 shows a perspective view of a digital beverage dispenser for dispensing a beverage according to an embodiment.

In some embodiments, a beverage dispenser 1500 includes a rotatable display 1540 for receiving a beverage selection from a consumer, as shown in FIG. 27. Rotatable display 1540 may rotate to reveal a sanitized portion of display 1540 for use by each consumer. Thus, once a first consumer performs a transaction using first portion of rotatable display 1540, first portion is rotated into the housing for sanitization, and a second, sanitized portion of rotatable display 1540 is revealed to the second consumer. In this way, the consumer may use his or her hands and fingers to operate rotatable display 1540 as the display is automatically sanitized after each use.

Beverage dispenser 1500 may include a housing 1510 enclosing components of beverage dispenser 1500 and defining a beverage container receiving area 1520. Beverage dispenser 1500 may include one or more dispensing nozzles 1530 at an upper end of beverage container receiving area 1520 for dispensing a beverage into a beverage container.

Rotatable display 1540 of beverage dispenser 1500 may be a touch screen display that includes a flexible screen 1542 configured to receive user input, such as a beverage selection or selection of a command to pour a selected beverage. Rotatable display 1540 may display a graphical user interface that includes beverage selection options, such as types of beverages and flavorings, and an option to dispense the selected beverage. Display 1540 may further provide instructions for dispensing a beverage, nutrition information, among other information. Thus, from the consumer's perspective, rotatable display 1540 functions in the same manner as other non-rotating, touch screen displays.

Figure 28:
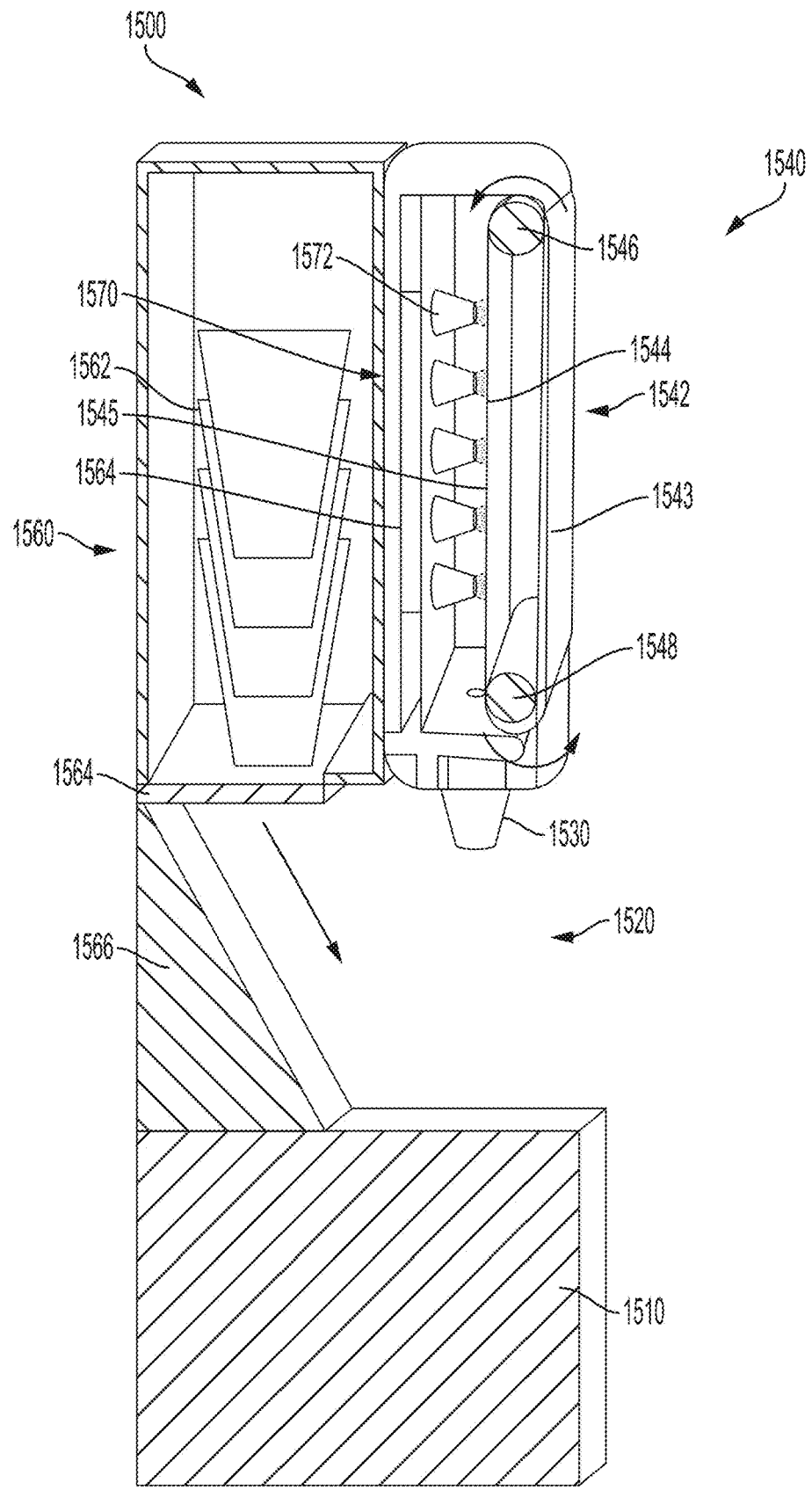
FIG. 28 shows a side perspective view of a rotatable display of the digital beverage dispenser of FIG. 27.

Flexible screen 1542 may form a continuous loop that rotates about two or more rollers, such as an upper roller 1546 and a lower roller 1548, as shown in FIG. 28. A first portion 1543 of flexible screen 1542 extending between rollers 1546, 1548 may be arranged at a front of housing 1510 so that first portion 1543 may be used by a consumer to receive user input, and a second portion 1545 of flexible screen 1542 may be arranged within housing 1510 for sanitizing. Upon completion of a transaction with a first consumer, beverage dispenser 1500 may actuate a motor to rotate a roller 1546, 1548 to cause flexible screen 1542 to rotate a predetermined distance to reveal second portion 1545 of screen 1542 at the front of housing 1510 for use by a second consumer. First portion 1543 is rotated into housing 1510 for sanitization.

Beverage dispenser 1500 may include a sanitizer 1570 within housing 1510 for sanitizing the used portion of flexible screen 1542. In some embodiments, sanitizer 1570 may include an ultraviolet light source configured to provide UV-C radiation, as described herein. In some embodiments, sanitizer 1570 may include one or more sprayers 1572. Each sprayer 1572 is configured to spray a quantity of a sanitizing solution, such as a disinfecting spray, onto the portion of screen 1542 arranged within housing 1510. Each sprayer 1572 may be in communication with a reservoir containing the sanitizing solution, and one or more pumps may be used to communicate the sanitizing solution to sprayers 1572. In some embodiments, however, each sprayer 1572 may have its own reservoir.

In some embodiments, beverage dispenser 1500 may include an integrated cup dispenser 1560, as shown in FIG. 28. Cup dispenser 1560 may be configured to dispense a cup into the beverage container receiving area 1520, and into a location below dispensing nozzle 1530. In this way, the cup may be automatically positioned below dispensing nozzle 1530 for filling with a beverage. Cup dispenser 1560 may include a storage compartment 1562 for storing a plurality of cups in a stacked configuration. Storage compartment 1562 may be arranged within housing 1510 of beverage dispenser 1500. Storage compartment 1562 may be arranged rearward of display screen 1542 and at an elevation above beverage container receiving area 1520. Cup dispenser 1560 may include a dispensing mechanism 1564 configured to allow a cup to move from storage compartment 1562 to beverage container receiving area 1520. Dispensing mechanism 1562 may include a movable gate, among others, as will be appreciated by one of ordinary skill in the art. Cup dispenser 1560 may include a ramp or chute 1566 configured to direct a dispensed cup to a location below dispensing nozzle 1530. As cup dispenser 1560 is located rearward of dispensing nozzle 1530, cup dispenser 1560 does not interfere with operation of dispensing nozzle 1530 and chute 1566 directs cup to a location beneath dispensing nozzle 1530 for filling by dispensing nozzle 1530.

Beverage dispenser 1500 may include a fragrance emitter 1580 configured to emit a fragrance. Fragrance emitter 1580 may be arranged on housing 1510, such as at an upper end 1516 of housing 1510 such that it is positioned in proximity to a consumer's face when the consumer is operating beverage dispenser 1500. In some embodiments, fragrance may correspond to a beverage selected by a consumer. For example, if the consumer selects a cherry flavored beverage, fragrance emitter 1580 may emit a cherry scent. In some embodiments, fragrance emitter 1850 may emit a clean scent, such as a citrus scent to increase consumer's confidence that beverage dispenser 1500 is clean and sanitary.

In some embodiments, beverage dispenser 1500 may include an audio unit 1590 configured to play audible messages. Audible messages may include instructions and information about operation of beverage dispenser 1500, promotional information or advertisements, or public safety information, such as information about handwashing, social distancing, and mask-wearing. Audible messages may entertain consumers while they wait to use beverage dispenser 1500 or while selecting and dispensing a beverage.

Figure 29:
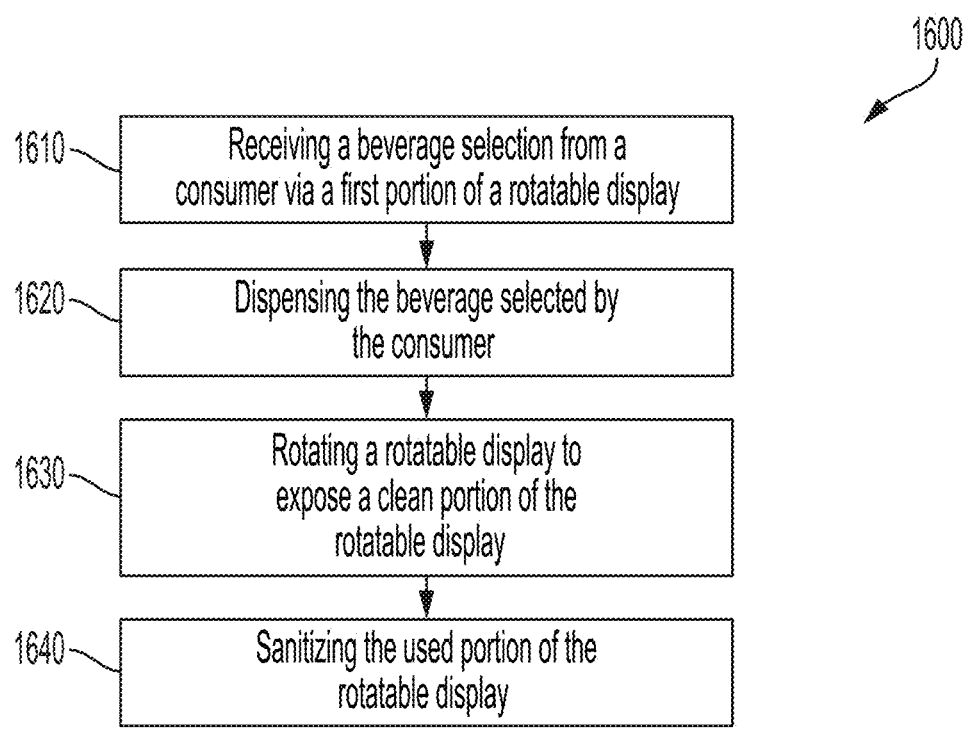
FIG. 29 shows an exemplary method of dispensing a beverage from a digital beverage dispenser according to an embodiment.

An exemplary method for operating a beverage dispenser having a rotatable display 1600 is shown in FIG. 29. consumer first portion of a rotatable display may receive a beverage selection from a consumer 1610. The beverage dispenser may dispense the beverage selected by the consumer 1620. Upon completion of dispensing the beverage, the beverage dispenser may automatically rotate the rotatable display to expose a clean, second portion of the rotatable display 1630. The used first portion of the display is rotated into the housing for sanitizing 1640.

In some embodiments, a beverage dispenser as described herein may include a pad 1550, as shown for example in FIG. 27 for use with beverage dispenser, such as beverage dispenser 1500. Pad 1550 may be configured to detect a presence of a consumer standing on pad 1550. Pad 1550 may include a planar substrate 1552 on which a consumer may stand. Planar substrate 1552 may include one or more lights 1554. Lights 1554 may be arranged around a perimeter 1556 of planar substrate 1552. Lights 1554 may be configured to change color. In some embodiments, lights 1554 may be illuminated in a first color when no consumer is detected, and may illuminate a second different color when a consumer is standing on pad 1550. If a second consumer is detected on pad 1550, pad 1550 may change color or may flash to indicate to the second consumer to move off of pad 1550. This may help to encourage consumers to maintain distance from one another while waiting to use beverage dispenser 1500. Pad 1550 may include a sensor 1558 to detect a presence of a consumer on pad 1550. Sensor 1558 may be embedded within planar substrate 1552. In some embodiments, sensor 1558 may be a weight sensor configured to detect a weight on pad 1550 or a change of weight on pad 1550. Sensor 1158 may detect a change of weight at or above a minimum weight change in order to avoid erroneous readings due to debris or the like resting on pad 1550.

Figure 30:
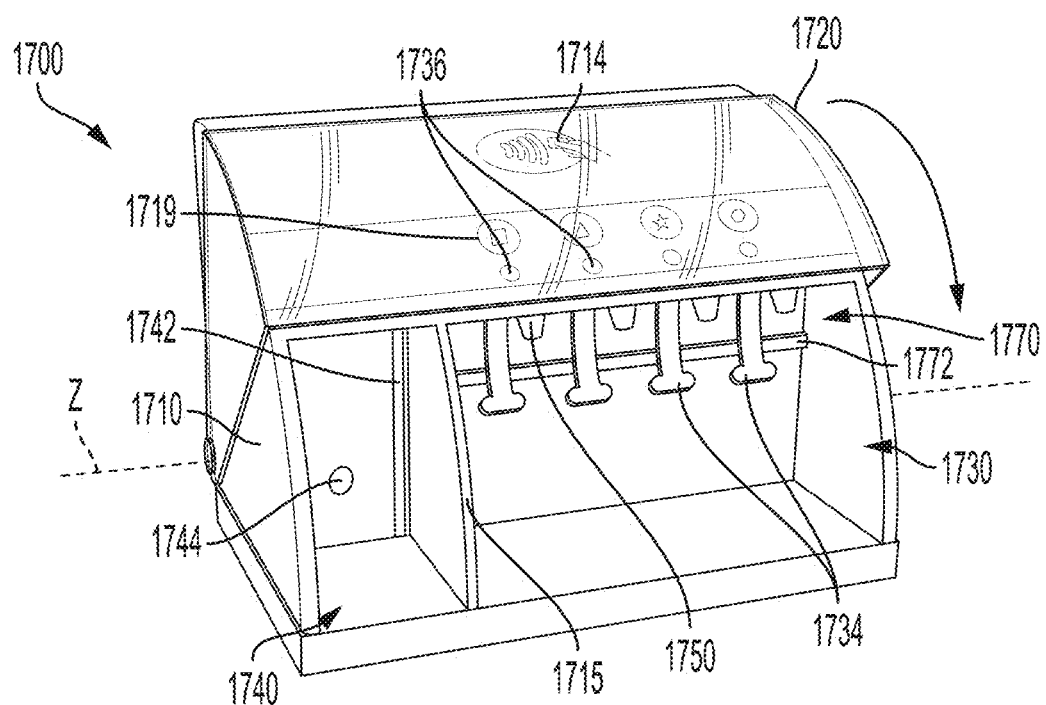
FIG. 30 shows a perspective view of a fountain beverage dispenser for dispensing beverages in a contactless manner according to an embodiment.

Some embodiments relate to a fountain beverage dispenser 1700 for dispensing beverages as shown in FIG. 30. Beverage dispenser 1700 may include a housing 1710 that defines a beverage container receiving area 1730 and a beverage container sanitizing area 1740. Beverage container receiving area 1730 may be separated from beverage container sanitizing area 1740 by a divider 1715.

Beverage dispenser 1700 may include a payment processing unit 1714 configured to receive a payment from a consumer, such as a contactless payment as described herein.

Beverage dispenser 1700 may include a movable cover 1720 movably connected to housing 1710 and configured to move from an open position to a closed position. Movable cover 1720 may be in the closed position when beverage dispenser 1700 is not in use, and upon receipt of a payment by payment processing unit 1714, beverage dispenser 1700 may automatically move cover 1720 to the open position so that a consumer may sanitize a beverage container, dispense a beverage, or both. Beverage dispenser 1700 may include a control unit configured to control operation of beverage dispenser 1700, such as to automatically move movable cover 1720 upon receipt of payment by payment processing unit 1714.

Movable cover 1720 may be connected to housing 1710 via a hinge such that movable cover 1720 may rotate about a Z-axis from the open position to the closed position. A motor may automatically move cover 1720 between the open and closed positions. However, in some embodiments, movable cover 1720 may be manually movable by a consumer. Movable cover 1720 may be connected to housing 1710 such as by hinges 1718 on opposing sides of housing 1710. Movable cover 1720 may include a transparent or translucent material so that beverage container within areas 1730, 1740 is visible when movable cover 1720 is in the closed position. In some embodiments, fountain beverage dispenser 1700 may include separate covers for beverage container receiving area 1730 and beverage container sanitizing area 1740.

Beverage dispenser 1700 may further include one or more dispensing nozzles 1750 for dispensing different beverages. Dispensing nozzles 1750 may be arranged on housing 1710 in beverage container receiving area 1730, such that when movable cover 1720 is in the closed position, dispensing nozzles 1750 are enclosed within beverage container receiving area 1730 by movable cover 1720. Each dispensing nozzle 1750 may include a label 1719 or indicia indicating the type of beverage the dispensing nozzle 1750 is configured to dispense. A consumer may activate a dispensing nozzle 1750 by operating a proximity sensor 1736 or by actuating a lever 1734 when movable cover 1720 is in the open position.

In some embodiments, beverage dispenser 1700 may include a proximity sensor 1736 corresponding to each dispensing nozzle 1750. As discussed herein, a consumer may activate proximity sensor 1736 may placing his or her hand within a predetermined detection distance of proximity sensor 1736 to activate that proximity sensor 1736. In some embodiments, beverage dispenser 1700 may automatically dispense the beverage when proximity sensor 1736 is activated. Beverage may continue to be dispensed as long as the consumer holds his or her hand within detection distance of proximity sensor 1736. However, in some embodiments, activation of a proximity sensor 1736 may cause a predetermined volume of a beverage to be dispensed. In some embodiments, dispensing nozzle 1750 may be actuated by a lever 1734. A consumer may use a beverage container to actuate the lever 1734 to cause a beverage to be dispensed as long as lever 1734 is depressed.

Beverage container receiving area 1730 may include a sanitizer 1770 for sanitizing beverage container receiving area 1730 and dispensing nozzles 1750. In some embodiments, sanitizer 1770 may include an ultraviolet light source 1772 configured to produce UV-C radiation. In some embodiments, sanitizer 1770 may alternatively or additionally include one or more sprayers configured to dispense a disinfectant solution in beverage container receiving area 1730. In such embodiments, movable cover 1720 may be automatically moved to the closed position and sprayers may disperse the disinfectant solution to sanitize beverage container receiving area 1730, such as upon completion of a beverage dispensing operation. In this way, beverage container receiving area 1730 may be sanitized after a consume dispenses a beverage and prior to use of beverage dispenser 1700 by a subsequent consumer.

Figure 31:
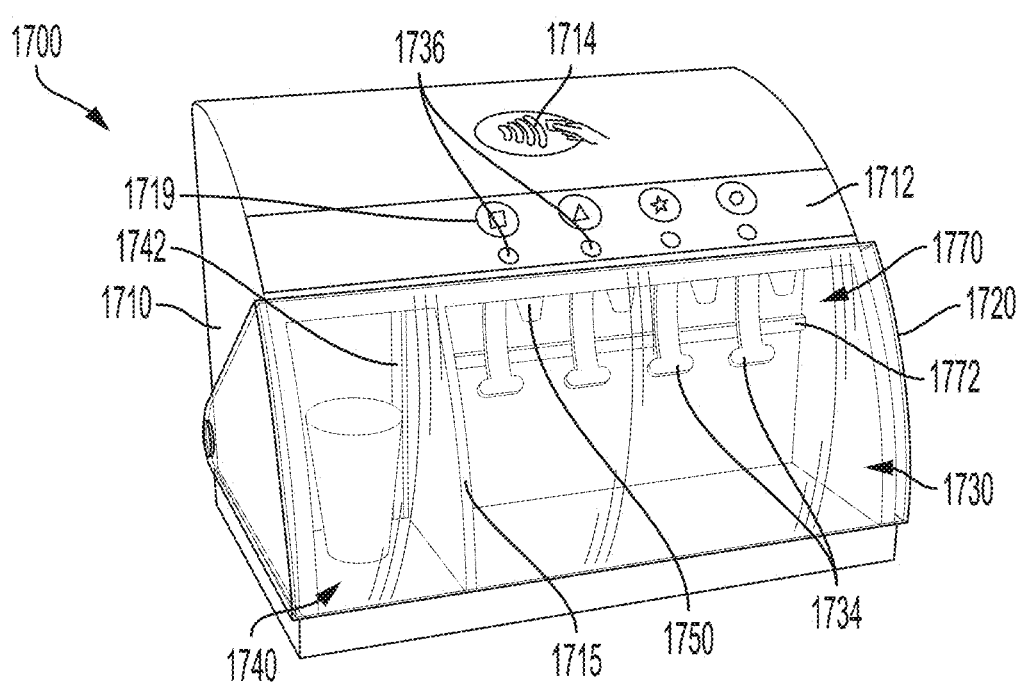
FIG. 31 shows a perspective view of the fountain beverage dispenser of FIG. 29 in use to sanitize a cup.

Beverage container sanitizing area 1740 of beverage dispenser 1700 may include an ultraviolet light source 1742 configured to produce UV-C radiation for sanitizing a beverage container, such as a reusable beverage container, as shown for example in FIG. 31. Beverage container sanitizing area 1740 may further include a sensor 1744 configured to detect a presence of a beverage container within beverage container sanitizing area 1740. Upon detecting a beverage container, movable cover 1720 may automatically move from the open position to the closed position, and ultraviolet light source 1742 may produce ultraviolet light to sanitize the beverage container within beverage container sanitizing area 1740. Ultraviolet light source 1742 may be configured to produce ultraviolet light for a predetermined period of time, such as 30 seconds. Movable cover 1720 may then return to the open position so that the consumer may retrieve a sanitized beverage container for use in receiving a beverage dispensed by beverage dispenser 1700.

In some embodiments, a control unit may control operation of beverage dispenser 1700. The control unit may be in communication with payment processing unit 1714 and actuate movable cover 1720 upon receipt of payment. Control unit may also communicate with sensor 1744 for detecting a beverage container, and sanitizers 1742, 1772. Control unit may also activate a dispensing nozzle upon activation of a proximity sensor.

In operation of beverage dispenser 1700, a consumer may provide payment at payment processing unit 1714 of beverage dispenser 1700. Upon receiving payment from consumer, beverage dispenser 1700 may move cover 1720 from closed position to the open position. Consumer may then select and dispense a beverage by activating proximity sensor 1736 or by actuating lever 1738 corresponding to a dispensing nozzle 1750. Once the consumer completes dispensing a beverage, the movable cover 1720 may automatically return to the closed configuration. A sanitizer 1770 may then sanitize the beverage container receiving area 1730, such as by dispensing a disinfectant solution via sprayers.

Figure 32:
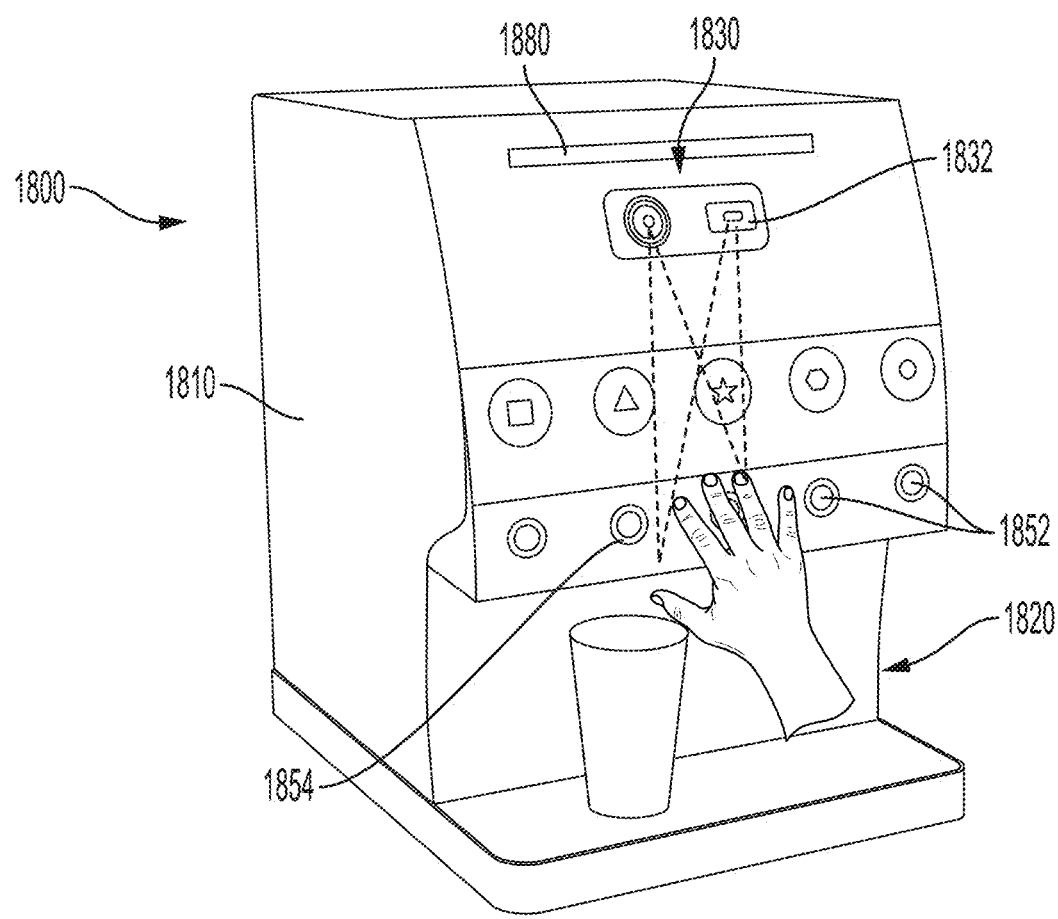
FIG. 32 shows a perspective view of a fountain beverage dispenser for dispensing beverages in a contactless manner according to an embodiment.

Some embodiments described herein relate to a fountain beverage dispenser 1800, as shown in FIG. 32. Beverage dispenser 1800 may be operated by gesture control, such that a consumer may select and dispense a beverage in a contactless manner. Beverage dispenser 1800 may include a plurality of indicators corresponding to a plurality of dispensing nozzles. A consumer may activate an indicator corresponding to a desired beverage using gestures which beverage dispenser 1800 detects via a camera module 1830.

Beverage dispenser 1800 may include a housing 1810 defining a beverage container receiving area 1820 for receiving a beverage container. Housing 1810 may enclose various components of beverage dispenser 1800, such as pumps, valves, heat exchangers, fluid conduits, or syrup or flavoring containers, among others. Beverage dispenser 1800 may be configured to be placed on a countertop or tabletop.

Figure 33:
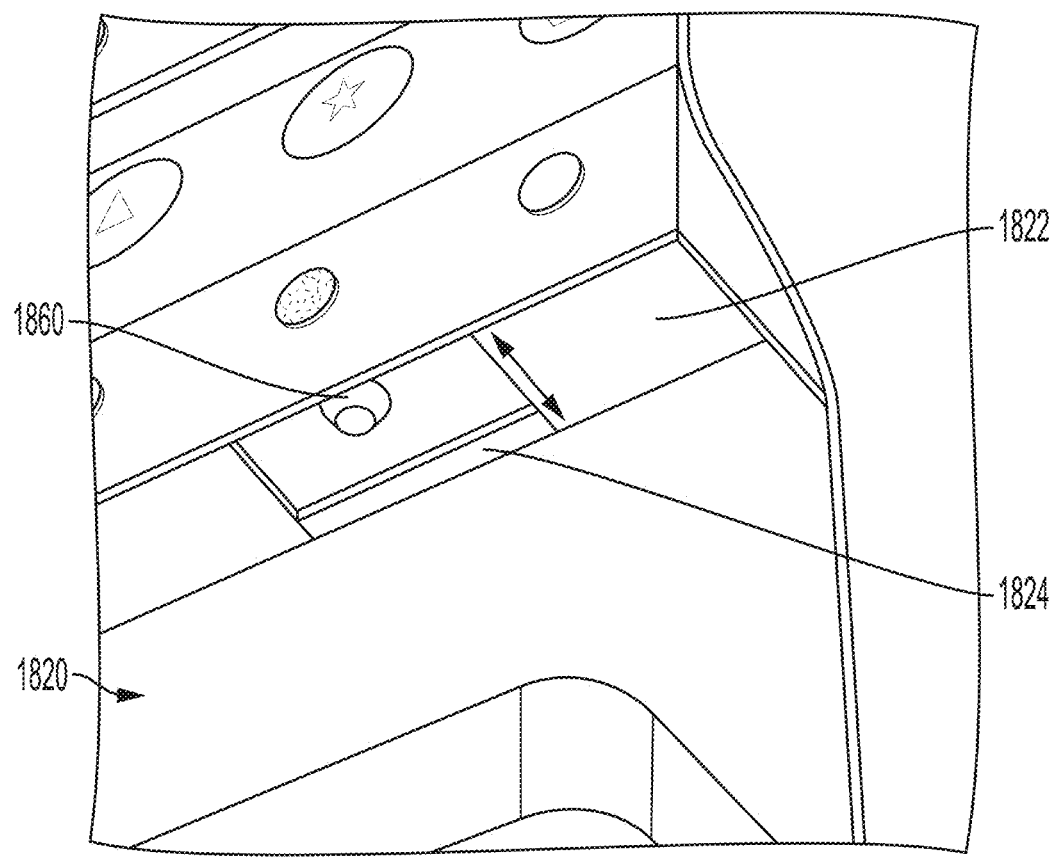
FIG. 33 shows a perspective view of a nozzle of the fountain beverage dispenser of FIG. 32.

A plurality of dispensing nozzles 1860 may be arranged at an upper end of beverage container receiving area 1820. A drip tray may be arranged at an opposing lower end of beverage container receiving area 1820. Each dispensing nozzle 1860 may correspond to a different beverage to be dispensed. In some embodiments, each dispensing nozzle 1860 may be covered by a movable panel 1824, as shown in FIG. 33. Dispensing nozzle 1860 may be arranged within housing 1810 so that only an opening of dispensing nozzle 1860 is exposed. Movable panel 1824 may cover dispensing nozzle 1860 when not in use and may move to uncover dispensing nozzle 1860 to allow a beverage to be dispensed. Movable panel 1824 may be arranged parallel to upper end 1822 of beverage container receiving area 1820 so as to provide a seamless appearance. Movable panel 1824 may slide to uncover dispensing nozzle 1860, and may slide rearwardly into an interior of housing 1810. In this way, dispensing nozzles 1860 are not accessible by consumers which may help to ensure that dispensing nozzles 1860 remain clean and sanitary.

Each dispensing nozzle 1860 includes a corresponding indicator light 1854 that may illuminate to indicate that a dispensing nozzle 1860 has been selected, as shown in FIG. 32. In some embodiments, a single indicator light 1854 may be illuminated at a time, such that illumination of a first indicator light may result in darkening of a second indicator light. Indicator lights 1854 may be arranged on a front surface of beverage dispenser 1800, such as in an area immediately above beverage container receiving area 1820 so as to be easily visible to the consumer.

In some embodiments, beverage dispenser 1800 may include a camera module 1830. Camera module 1830 may include one or more cameras 1832 configured to detect a hand of a consumer. Camera module 1830 may allow beverage dispenser 1800 to be controlled via gesture control. Camera module 1830 may be similar to camera module 1350 of beverage dispenser 1300. A consumer may place his or her hand adjacent an indicator light 1854 corresponding to a beverage to be dispensed, and cameras 1832 may detect the location of the consumer's hand. Beverage dispenser 1800 may illuminate an indicator light 1854 based on the location and movement of the consumer's hand. In order to dispense a beverage, a consumer may move his or her hand in a direction toward an indicator light 1854 of beverage dispenser 1800, e.g., in a pushing or pressing motion. Camera module 1830 may detect movement of consumer's hand toward a particular indicator light 1854 of beverage dispenser 1800 and may activate dispensing of the beverage. In order to stop dispensing the beverage, the consumer may move his or her hand away from the beverage dispenser 1800. Alternatively, a predetermined volume of a beverage may be dispensed upon selection of a beverage.

In some embodiments, beverage dispenser 1800 may be configured to receive a consumer selection of a beverage via activation of a proximity sensors 1852 corresponding to the desired beverage. Beverage dispenser 1800 may include a plurality of proximity sensors 1852 wherein each dispensing nozzle 1860 corresponds to a proximity sensor 1852. As discussed herein, proximity sensors 1852 may be activated by placing a hand of a consumer within a predetermined detection distance of proximity sensor 1852. When proximity sensor 1852 is activated, a corresponding indicator light 1854 may illuminate to indicate that the beverage corresponding to the proximity sensor 1852 and indicator light 1854 has been selected.

Similar to beverage dispenser 1500, beverage dispenser 1800 may include a fragrance emitter 1880. Fragrance emitter 1880 may be configured to emit a fragrance. Fragrance may correspond to a beverage selected by a consumer. For example, if the consumer selects to dispense lemonade, a lemon scent may be emitted. In some embodiments, fragrance emitter 1880 may emit a clean scent, such as a citrus scent to increase consumer's confidence that beverage dispenser 1800 is clean and sanitary.

Figure 34:
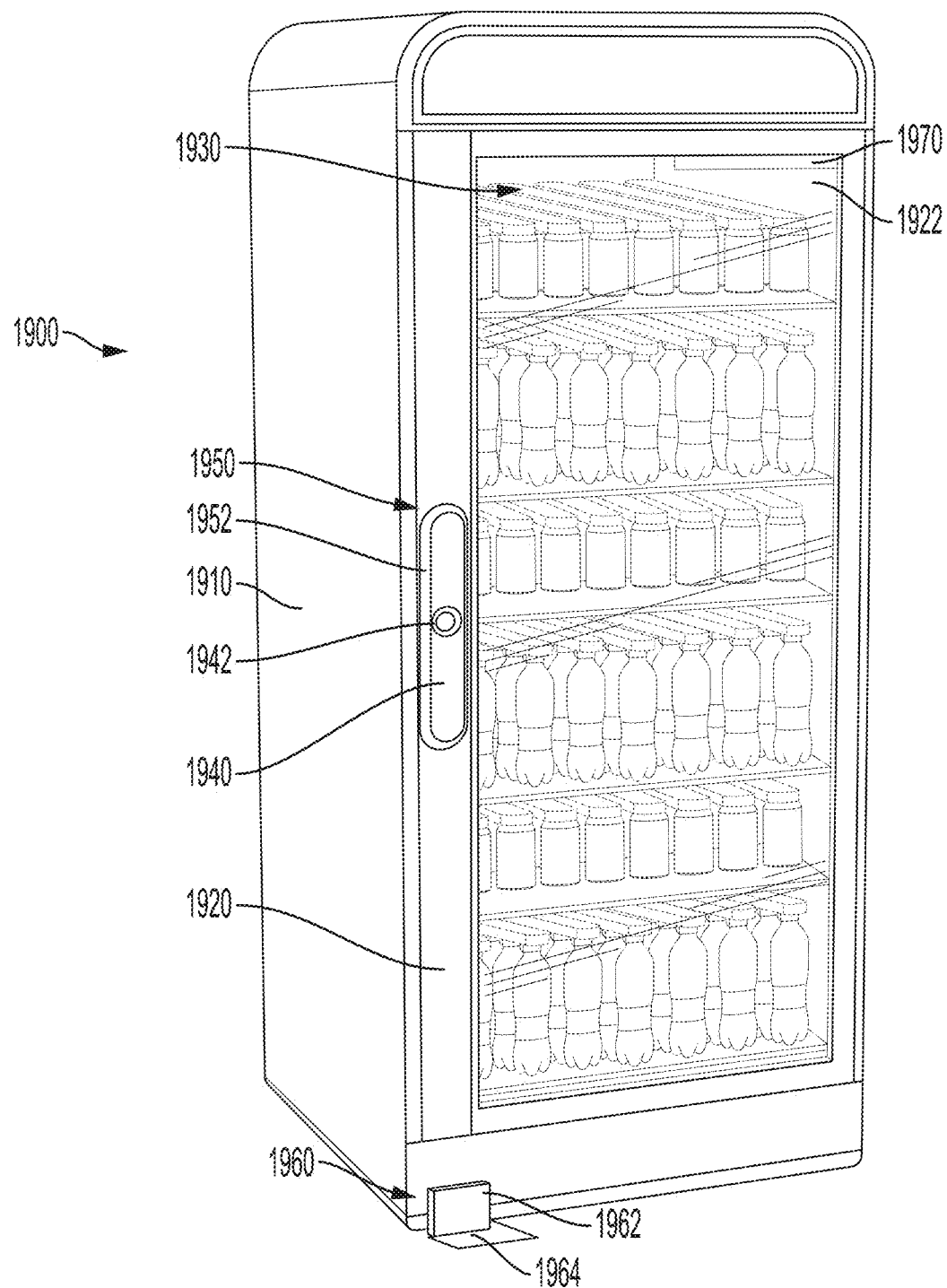
FIG. 34 shows a perspective view of a cooler configured to allow a consumer to retrieve a product in a contactless manner according to an embodiment.

Some embodiments described herein relate to a cooler 1900 for providing consumers with access to beverages in a contactless manner, as shown in FIG. 34. Cooler 1900 may include a housing 1910 defining a product storage area 1930. Cooler 1900 may further include a door 1920 movably connected to housing 1910 and movable from a closed position in which product storage area 1930 is enclosed and is not accessible to consumers to an open position in which product storage area 1930 is open and accessible to consumers. Door 1920 may include a transparent panel 1922 configured to allow consumers to view products within product storage area 1930 without having to move door 1920 to the open position. Door 1920 may include a transparent panel 1922 having a frame about its perimeter. Door 1920 may be movably connected to housing 1910 by a hinge, or may slide on tracks on housing 1910.

In some embodiments, door 1920 of cooler 1900 may be configured to open automatically so that a consumer need not physically contact door 1920. In such embodiments, cooler 1900 may include a proximity sensor 1942 configured to detect a presence of a consumer or a consumer's hand within a predetermined detection distance of proximity sensor 1942. In this way, consumer may open door 1920 of cooler 1900 in a contactless manner by placing his or her hand within the predetermined detection distance of proximity sensor 1942. Once proximity sensor 1942 detects a hand of a consumer, door 1920 may open automatically and consumer may retrieve the desired products.

In some embodiments, proximity sensor 1942 may be arranged on a handle unit 1940 of door 1920. Handle unit 1940 may include a sanitizer 1950 for sanitizing the proximity sensor 1942. Sanitizer 1950 may include an ultraviolet light source 1952 configured to produce UV-C radiation. Sanitizer 1950 may periodically sanitize proximity sensor 1942, and may activate when the door 1920 returns to closed position.

In some embodiments, cooler 1900 may alternatively or additionally include a foot pedal 1960. Foot pedal 1960 may be attached to door 1920. Foot pedal 1960 may be configured to receive a consumer's foot thereon, such that the consumer may open door 1920 by placing a foot on foot pedal 1960 and moving the foot and foot pedal 1960 towards the consumer. Foot pedal 1960 may include a base 1962 connected to door 1920, and a platform 1964 connected to base 1962 and extending outward from door 1920 so as to receive a consumer's foot thereon. In some embodiments, platform 1964 may be perpendicular to base 1962 such that foot pedal 1960 has an L-shaped configuration. Foot pedal 1960 may be arranged on a lower end of door 1920, and may be secured to frame 1924 of door 1920. Foot pedal 1960 may be arranged on a front surface of door 1920 and may be arranged on a free side of door 1920 opposite a side of door 1920 having a hinge.

In some embodiments, cooler 1900 may include a power-assist module 1970 to facilitate opening of door 1920 by lowering the amount of force required to be applied by the consumer via foot pedal 1960 to open door 1920. Power-assist module 1970 may include an actuator, such as a motor, connected to housing 1910 and a movable arm connected to door 1920, such that power-assist module 1970 may be activated to help open door 1920 when consumer begins opening door 1920 via foot pedal 1960.

Figure 35:
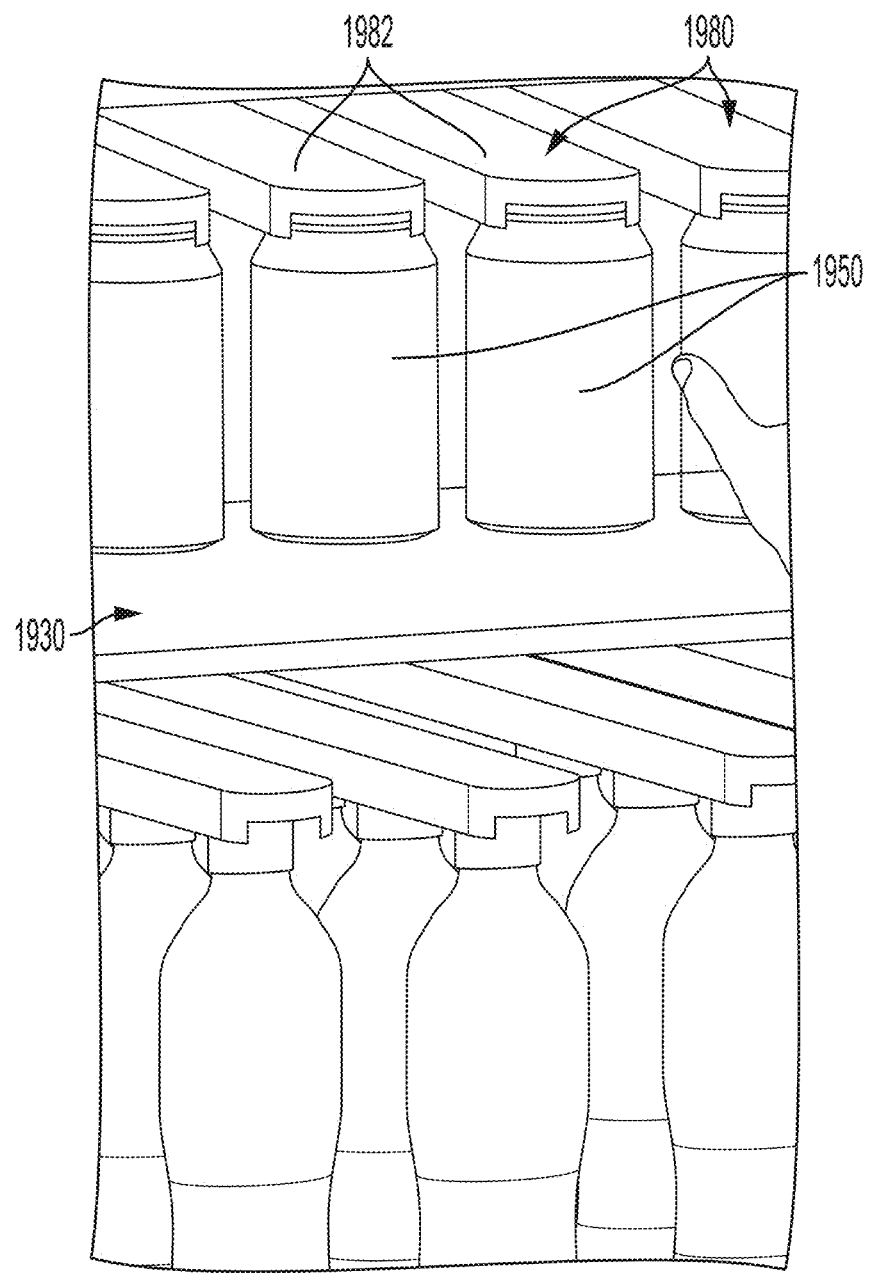
FIG. 35 shows a close-up perspective view of a product compartment of the cooler of FIG. 34.

In some embodiments, product storage area 1930 of cooler 1900 may include a plurality of rail assemblies 1980 for supporting products, as shown in FIG. 35. Each rail assembly 1980 may be sloped downwardly from a rear end of cooler 1900 to a front end of cooler 1900. In this way, products supported on rail assemblies 1980 may be gravitationally fed toward front end of cooler 1900 to promote easy access of products. Rail assembly 1980 may include an upper cover 1982 configured to cover an upper end of a product supported by rail assembly 1980, such as the upper end of a bottle or canned beverage. In this way, cover 1982 may help to ensure that products are clean and sanitary as consumers who access product storage area 1930 are unable to contact upper end of products arranged within cooler 1900 unless the product is removed from the rail assembly 1980. As consumers may contact the upper end of the beverage with their mouth it is important that upper end of packaged beverages remains clean and sanitary.

Figure 36:
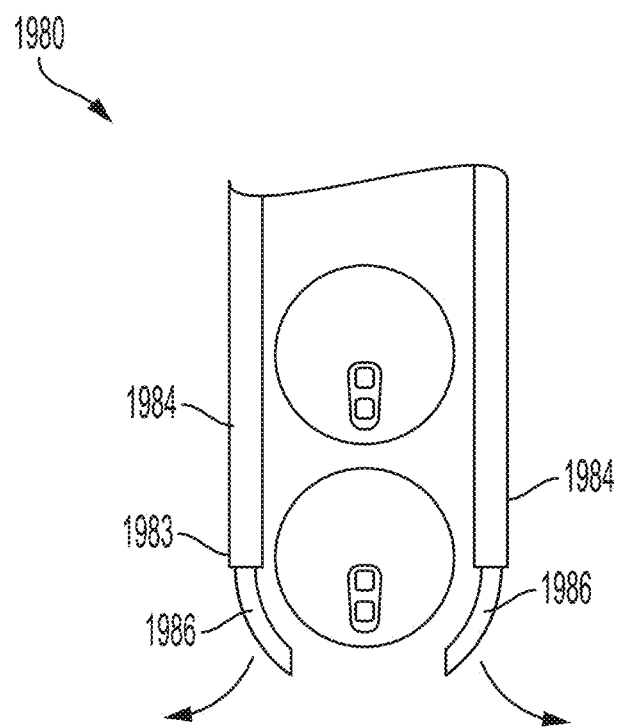
FIG. 36 shows a diagrammatic view of a row of products of the cooler of FIG. 34 according to an embodiment.

Each rail assembly 1980 may further include a pair of spaced and parallel rails 1984, as best shown in FIG. 36. Rails 1984 may be configured to support a product by its neck or by a lip of product, such as an area below an upper end or cap of the product. Thus, product is supported on rails 1984 and is suspended within product storage area 1930. A front end 1983 of rail assembly 1980 may include one or more gates 1986. A gate 1986 may be positioned on each rail 1984, and gates 1986 may be biased inwardly and towards one another to retain a product at a front of rail assembly 1980. A consumer may remove the product at the front of a rail assembly 1980 by grasping the product and pulling the product to overcome the biasing force of the gates 1986. When a sufficient force is applied by the consumer, the gates 1986 may bend or flex outwardly and away from one another to allow the product to be withdrawn. Once the product is withdrawn, the gates 1986 automatically return to the inwardly biased position to retain the next product at a front of the rail assembly 1980.

Figure 37:
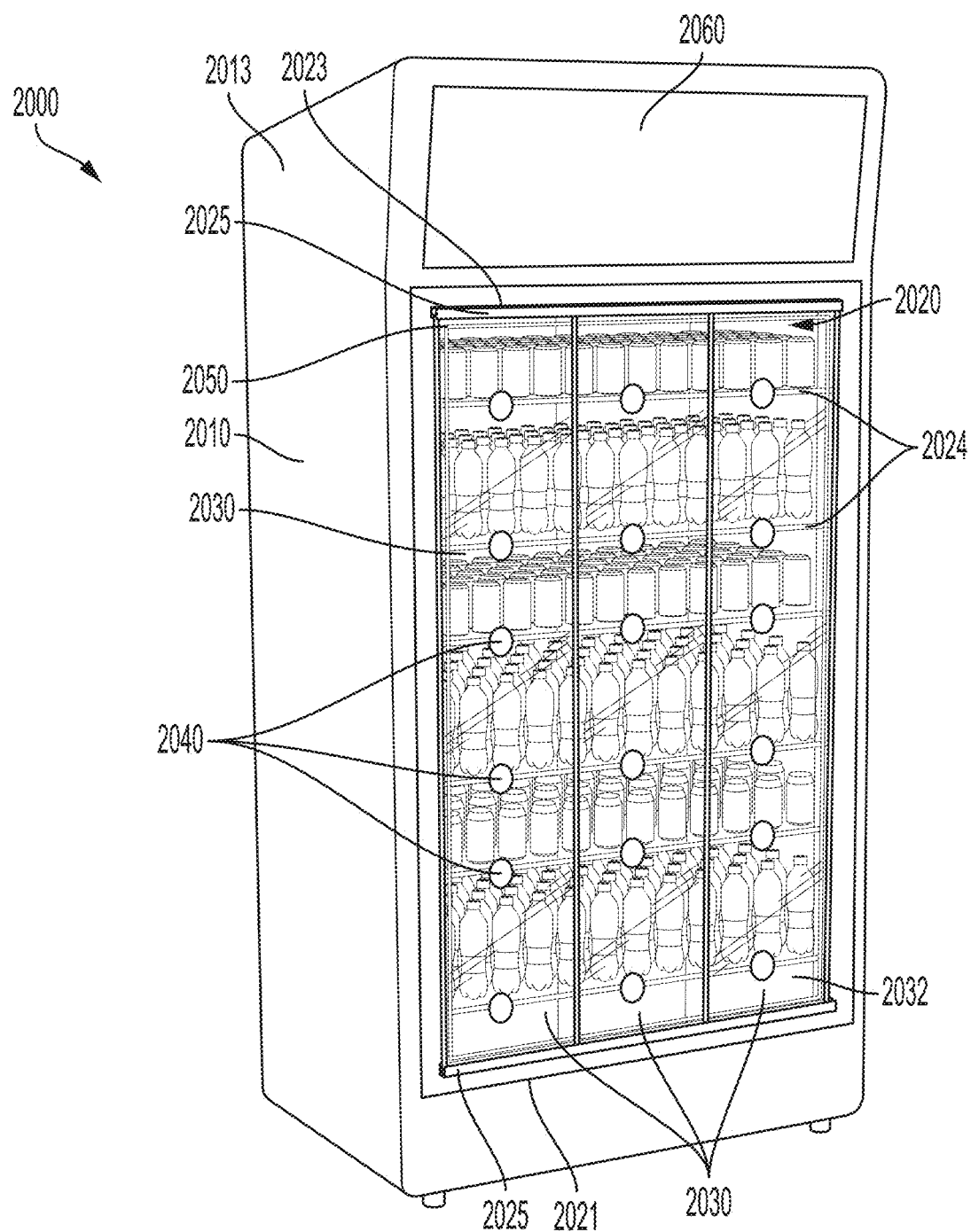
FIG. 37 shows a perspective view of a cooler configured to allow a consumer to retrieve a product in a contactless manner according to an embodiment.

Some embodiments described herein relate to a cooler 2000 as shown for example in FIG. 37. Cooler 2000 may allow for retrieval of a product in a contact free manner, such that the consumer need not contact a door of cooler 2000 to access products. Cooler 2000 may include a housing 2010 defining a product storage area 2020. Product storage area 2020 may include one or more shelves 2024 on which products are arranged. Shelves 2024 may be vertically spaced in product storage area 2020 from a lower end 2021 toward an upper end 2023 of product storage area 2020.

In some embodiments, cooler 2000 may include a digital display 2060. Digital display 2060 may be arranged on an upper end 2013 of housing 2010, and may be arranged on housing 2010 above product storage area 2020. Digital display 2060 may display instructions for operating cooler 2000. Digital display 2060 may also display information for consumers, such as product information, or information regarding public health guidelines, such as guidelines for social distancing, mask wearing, and hand-washing.

Cooler 2000 may further include a plurality of doors 2030 movably connected to housing 2010. In some embodiments, cooler 2000 may include three doors 2030. Each door 2030 may include a transparent panel 2032 that extends from a lower end 2021 to an upper end 2023 of product storage area 2020. Doors 2030 may be arranged in a side by side orientation, so that there is a left door, a middle door, and a right door. Each door 2030 may be individually movable from a closed position as shown in FIG. 37, to an open position in which door 2030 provides access to a portion of product storage area 2020. In some embodiments, each door 2030 may include a hinge so that doors 2030 may rotate between open and closed positions. In some embodiments, doors 2030 may be mounted on tracks arranged at lower end 2021 and upper end 2023 of product storage area 1930.

Each door 2030 may include one or more proximity sensors 2040 configured to detect a hand of a consumer within a predetermined detection distance of a proximity sensor 2040. As discussed herein, a consumer may activate a proximity sensor 2040 by placing his or her hand within the detection distance of the proximity sensor 2040. The door 2030 having the proximity sensor 2040 activated by the consumer may automatically open, such as by sliding on tracks or rotating about a hinge. In this way, the consumer may open a door 2030 of cooler 2000 in a contactless manner by activating a proximity sensor 2040 of a door 2030.

In some embodiments, each door 2030 may include a plurality of proximity sensors 2040. Each proximity sensor 2040 on a door 2030 may correspond to a particular shelf. For example, if product storage area 2020 has three shelves 2024, each door 2030 may have three proximity sensors 2040. Proximity sensors 2040 may be arranged on door 2030 adjacent each shelf 2042. A consumer may identify a product in product storage area 2020 that consumer wishes to purchase, and the consumer may activate the proximity sensor 2040 closest to that product. Door 2030 may automatically open to allow the consumer to retrieve the product, while the other doors 2030 of cooler 2000 remain closed. In this way, the consumer is limited to accessing a portion of a product storage area 2020 having the desired product.

In some embodiments, each door 2030 may further include an ultraviolet light source 2050 on an interior surface of door 2030 for sanitizing front products in product storage area 2020. In some embodiments, ultraviolet light source 2050 may be arranged on product storage area 2020 about a perimeter of front end of housing 2010. In this way, front products are sanitized prior to being retrieved by consumers.

Figure 38:
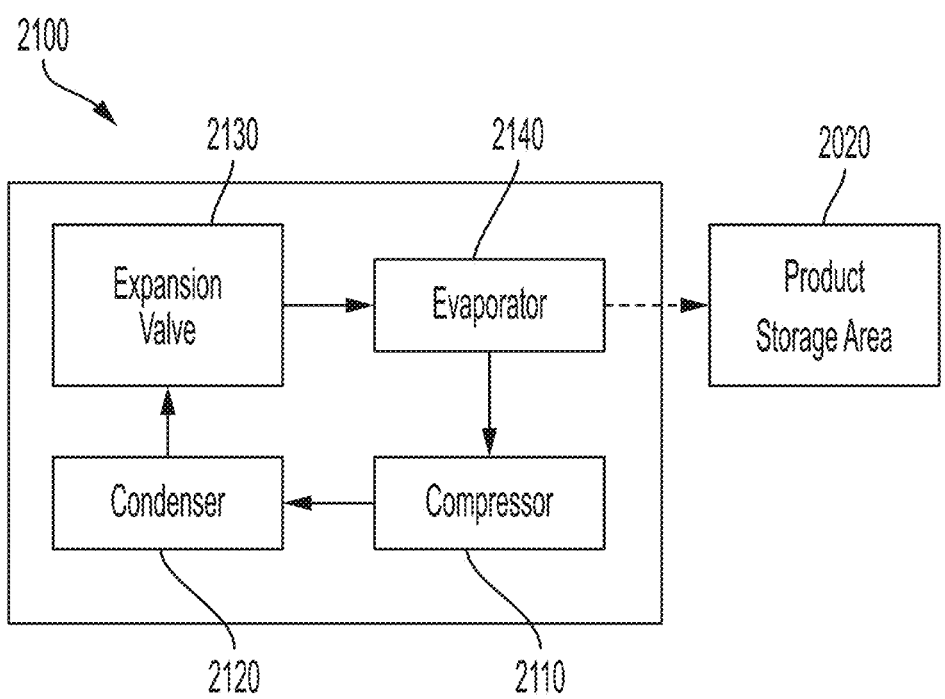
FIG. 38 shows a schematic diagram of components of a cooling unit according to an embodiment.

In any of the various embodiments described herein, a vending machine, product storage cabinet or cooler may include a cooling unit 2100 as shown in FIG. 38. Cooling unit 2100 may be a vapor-compression refrigeration unit. However, in some embodiments, other cooling units may be used, such as a cold plate, or a thermoelectric cooling unit. Cooling unit 2100 may include a compressor 2110, condenser 2120, expansion valve 2130 and evaporator coil 2140 for circulating a refrigerant. Evaporator 2140 may be in communication with product storage area 2150 to provide cooled air to product storage area 2150 for cooling products therein. One or more fans may also be provided for circulating the cooled air.

Figure 39:
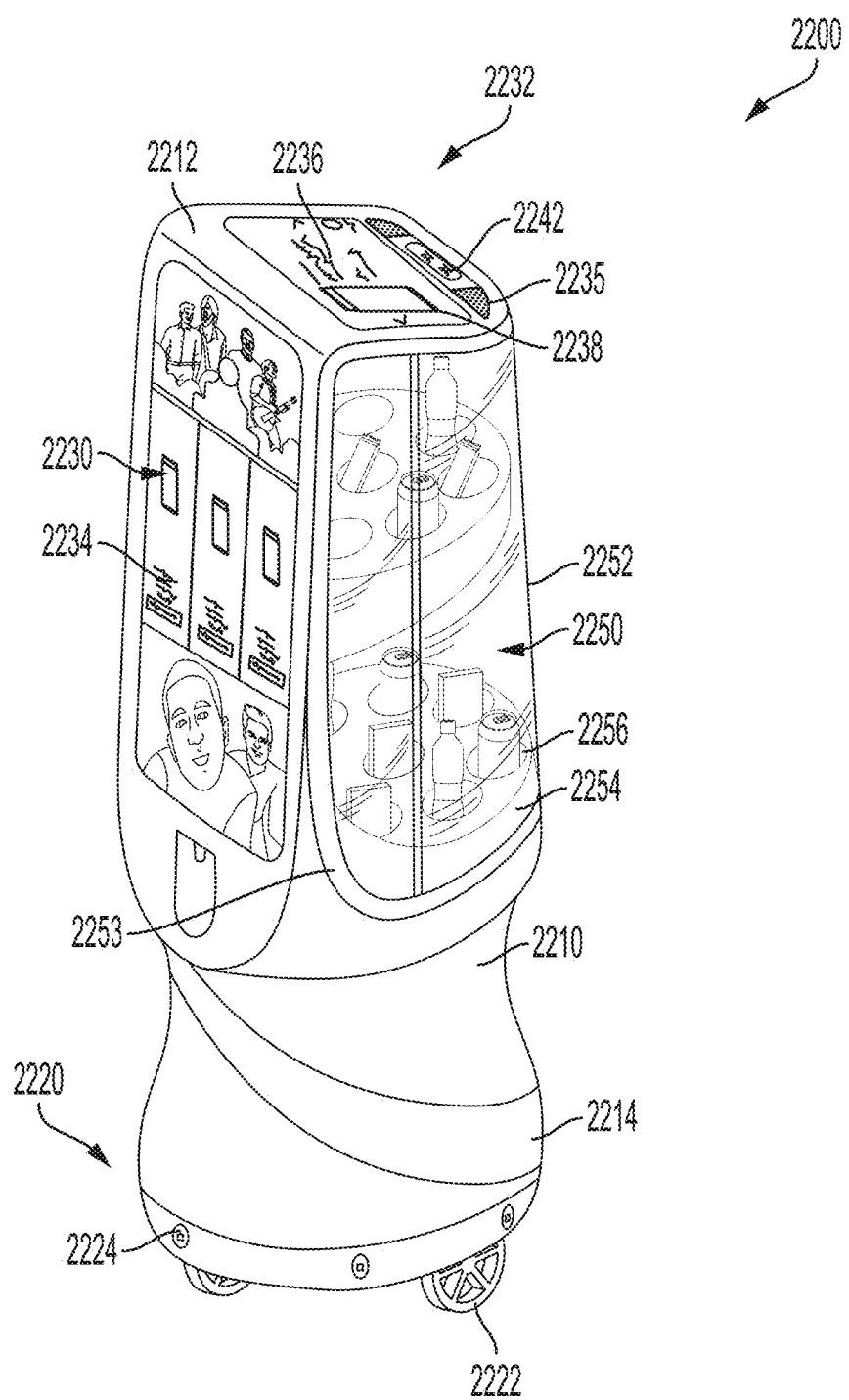
FIG. 39 shows a perspective view of a mobile vending machine according to an embodiment.

Some embodiments described herein relate to a mobile vending machine 2200, as shown for example in FIG. 39. Mobile vending machine 2200 may be suitable for use in any of various settings, such as a school, office building, hospital, nursing home, rehabilitation center, hotel, or sporting venue, among other locations. Mobile vending machine 2200 may travel to a location of a consumer so that the consumer can purchase and receive a product without locating a vending machine. This may be beneficial as a worker in an office building or the like may prefer to stay in his or her office or cubicle rather than traveling throughout the building to purchase a product. Similarly, mobility impaired consumers may have difficulty traveling to a vending machine to make a purchase and would benefit from the ability to have a vending machine travel to the consumer's location.

Mobile vending machine 2200 may also be operable in a contactless manner so that a consumer may select and receive a product without physically contacting mobile vending machine 2200. In some embodiments, a consumer may select and pay for a product via a mobile electronic device, and may summon mobile vending machine 2200 to the consumer's location. In some embodiments, vending machine 2200 may be operable by gesture control.

Mobile vending machine 2200 may include a body 2210 having an upper end 2212 and a lower end 2214 with a propulsion system 2220 at lower end 2214. Propulsion system 2220 may include one or more wheels 2222 for moving vending machine 2200 on a surface. In some embodiments, propulsion system 2220 may include a continuous track to allow mobile vending machine 2200 to better traverse uneven surfaces. Propulsion system 2220 may further include one or more navigation sensors 2224 configured to detect objects to help vending machine 2200 navigate around objects. Vending machine 2200 may be configured to move to a desired location for performing a transaction with a consumer.

Body 2210 of mobile vending machine 2200 may define a product storage compartment 2250. Product storage compartment 2250 may include one or more trays 2254 for storing products. In some embodiments, each tray 2254 may include a plurality of pockets 2256 in which products are stored. Each pocket 2256 may include a sensor configured to determine the presence or absence of a product in the pocket 2256 as discussed in further detail herein. In some embodiments, each tray 2254 of product storage compartment 2250 may be rotatable. Trays 2254 may rotate about a longitudinal axis of mobile vending machine 2200 in a counterclockwise or clockwise direction. In this way, tray 2254 may be rotated to bring a pocket 2256 having a selected product to a desired location, such as a location close to consumer to facilitate retrieval of the product.

Product storage compartment 2250 may be enclosed by one or more doors 2252 movable from a closed position to an open position. Doors 2252 may be movably connected to body 2210, such as by a hinge or by sliding on tracks mounted on body 2210. Doors 2252 may be at least partially transparent so that a consumer may view products within product storage compartment 2250.

In some embodiments, mobile vending machine 2200 may include an entertainment system 2230 that may include an audio unit 2232 and a digital display 2234. Digital display 2234 may display images or videos and may display advertisements, promotional material, music videos, and animations, among others. Audio unit 2232 may play music, sound effects, or recorded messages, such as greetings. In some embodiments, digital display 2234 may display information such as the news and headlines, information about sporting events, the current weather and forecast, and local points of interest. In this way, entertainment system 2230 may entertain the consumer while he or she performs a transaction. This may encourage consumers to spend more time interacting with mobile vending machine 2200 and may entice consumers to purchase additional products or to use mobile vending machine 2200 in the future.

A user interface 2232 may be arranged on body 2210 of mobile vending machine 2200. User interface 2232 may be arranged at upper end 2212 of body 2210 of mobile vending machine 2200. User interface 2232 may include a display 2236 to display product information. User interface 2232 may include a camera module 2242 configured to detect gestures made by a hand of a consumer. In some embodiments, user interface 2232 may display a series of screens showing products available for purchase. Consumer may make swiping motions with his or her hands, and camera module 2242 may detect the gesture and cause the display 2236 to show the next screen or a previous screen based on the consumer's gesture. Consumer may also make a pressing gesture to select a product for purchase. Once the consumer has selected products for purchase, the consumer may provide payment for the product.

Mobile vending machine 2200 may include a payment processing unit 2238 configured to receive a payment, such as by a contactless payment method. Payment processing unit 2238 may be part of user interface 2232. In some embodiments, payment processing unit may include a NFC antenna to communicate with a mobile electronic device or a payment card having an NFC antenna. In some embodiments, payment processing unit may include a QR code reader configured to receive a QR code payment from a consumer. In some embodiments, mobile vending machine 2200 may include a biometric unit configured to authenticate a consumer's identity based on a biometric characteristic, such as via near-infrared vein scanning, among others. In some embodiments, camera module 2242 of mobile vending machine 2200 may be used to perform facial recognition to identify a consumer.

In some embodiments, mobile vending machine 2200 may be in communication with a mobile electronic device. Consumer may use a mobile electronic device to summon vending machine 2200 to the consumer's location. Mobile electronic device may be used to send a signal to mobile vending machine 2200, and may include software for communicating with mobile vending machine 2200. Mobile electronic device may communicate information regarding the consumer's location to mobile vending machine 2200, such as GPS information, and vending machine 2200 may automatically navigate to a location of a consumer based on the location information received from the mobile electronic device. Alternatively, the consumer may select a location to which the mobile vending machine 2200 will travel.

In some embodiments, a consumer may select and purchase a product via the mobile electronic device. The mobile vending machine 2200 may then navigate to the consumer's location or to a selected location. The mobile vending machine 2200 may authenticate the identity of the consumer at the location, such as by biometric recognition or facial recognition. Alternatively, a consumer may provide a payment source to confirm the consumer's identity. Once the identity of the consumer has been confirmed, the doors 2252 may automatically unlock to allow the consumer to retrieve the selected products. Sensors within product storage area may detect removal of products.

In some embodiments, mobile vending machine 2200 may be configured to detect and respond to a voice of a consumer. If the consumer is in proximity to the mobile vending machine 2200, consumer may summon mobile vending machine 2200 to the consumer's location by speaking a command phrase. In some embodiments, mobile vending machine 2200 may have a name and may be programmed to recognize the name. A consumer may speak a phrase that includes the name of the mobile vending machine 2200 and mobile vending machine 2200 may detect that its name has been spoken and may move to the location of the consumer.

Vending machine 2200 may include an audio unit 2235 that includes a directional microphone or a series of microphones placed around body 2210 to detect the direction from which the command phrase was spoken. Vending machine 2200 may move to the perceived location of the consumer. In some embodiments, a camera or other sensors may be used to detect the consumer to aid in navigating to the consumer's location. For example, mobile vending machine 2200 may move in the direction from which the command phrase was detected, and may detect a consumer via a camera and use the information from the camera regarding the consumer's location to adjust the navigation.

When consumer provides payment or authenticates his or her identity, doors 2252 of product storage compartment 2250 may automatically open to provide consumer with access to product storage compartment 2250. Product storage compartment 2250 may include one or more sensors 2258 configured to detect the products removed from product storage compartment 2250. In some embodiments, each pocket 2256 may include a weight sensor configured to detect product within pocket 2256. Product within each pocket may be known and thus products may be identified based on detection of removal of a product from a particular pocket. In some embodiments, sensor 2258 may include one or more cameras configured to capture images or video for use in image recognition to determine the identity of the products removed. Further, sensors 2258 may include RFID or barcode scanners configured to scan a barcode or RFID tag of a product removed from product storage compartment 2250. User interface 2232 may display product information regarding the products removed, such as the name and type of product, nutrition information, and the price of the product. This may help the consumer determine whether to purchase the product.

The consumer may return a removed product to product storage compartment 2250, and specifically to a pocket 2256 of product storage compartment 2250. The returned product will be removed from the consumer's shopping cart so that the consumer is not charged for products that are removed and subsequently returned. In some embodiments, the product sensors 2258 may be configured to detect tampering with products. For example, if sensor 2258 is a weight sensor, sensor 2258 may determine if the weight of the product returned is the same as the weight of the product removed in order to determine if the consumer has consumed a portion of the product or has otherwise tampered with the product. If the weight of the product returned does not correspond to the weight of the product removed, the consumer may be charged for the removed product and the return will not be accepted.

When consumer is completed removing products, doors 2252 may close and the transaction may be automatically completed. User interface 2232 may display a confirmation that the transaction is complete and may display a receipt, such as the name of products removed, the number of products removed, and the total cost charged to the consumer. In embodiments in which the consumer used a mobile electronic device to summon the mobile vending machine 2200 or to select or pay for a product, the receipt may be communicated to the mobile electronic device.

Further, once doors 2252 of mobile vending machine 2200 are closed and the transaction is complete, a sanitizer 2253 arranged on body 2210 may activate so as to sanitize product storage compartment 2250. Sanitizer 2253 may include an ultraviolet light source configured to produce UV-C radiation to sanitize product storage compartment 2250 and products therein.

Figure 40:
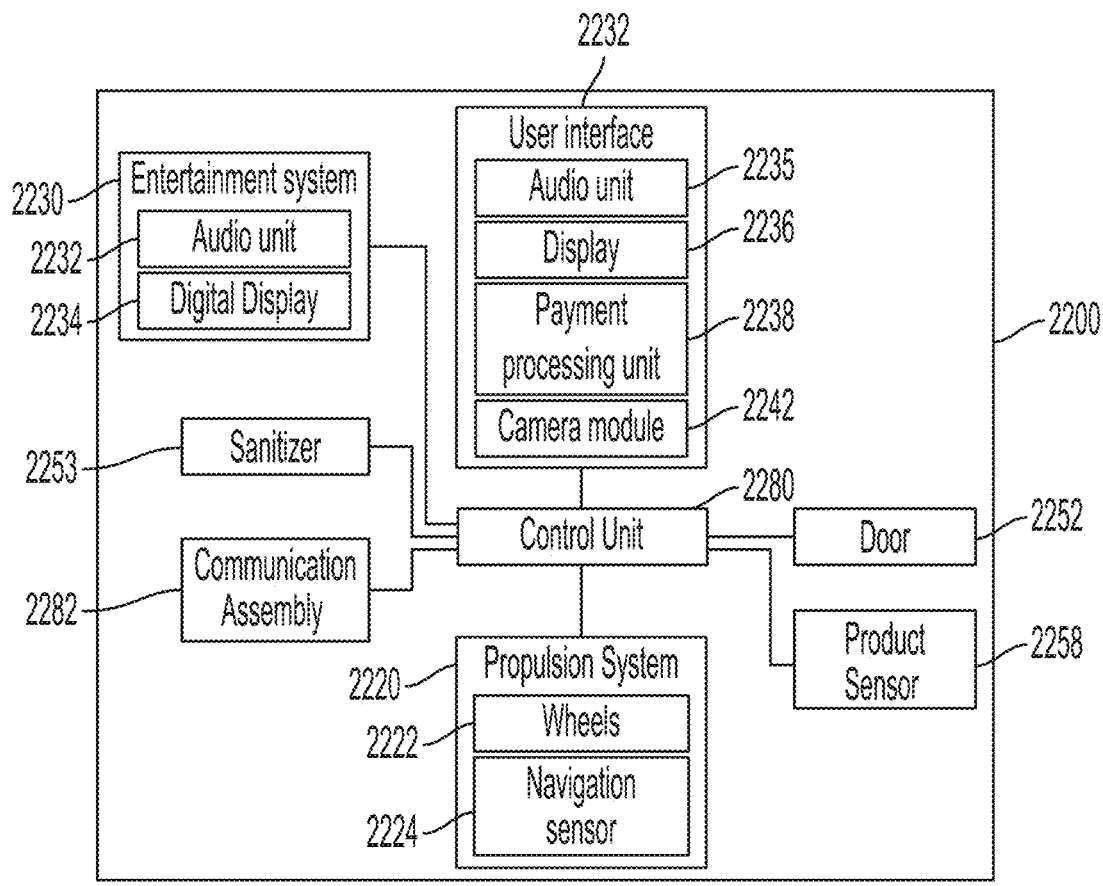
FIG. 40 shows a schematic view of components of the mobile vending machine of FIG. 39 according to an embodiment.

Mobile vending machine 2200 may include a control unit 2280 for controlling operation of mobile vending machine 2200, as shown in FIG. 40. Control unit 2280 may be in communication with a communication assembly 2282 and user interface 2232 to receive a product selection and with a payment processing unit 2238 for receiving a payment. Control unit 2280 may control propulsion system 2220 and may navigate to a consumer's location based on received location information and based on information from navigation sensors 2224. Control unit 2280 may receive information from camera module 2242 and user interface to authenticate a consumer, and may automatically open doors 2252 of product storage compartment 2250 and may receive information about removed products via product sensors 2258. Control unit 2280 may control user interface 2232 to display information about removed products.

Figure 41:
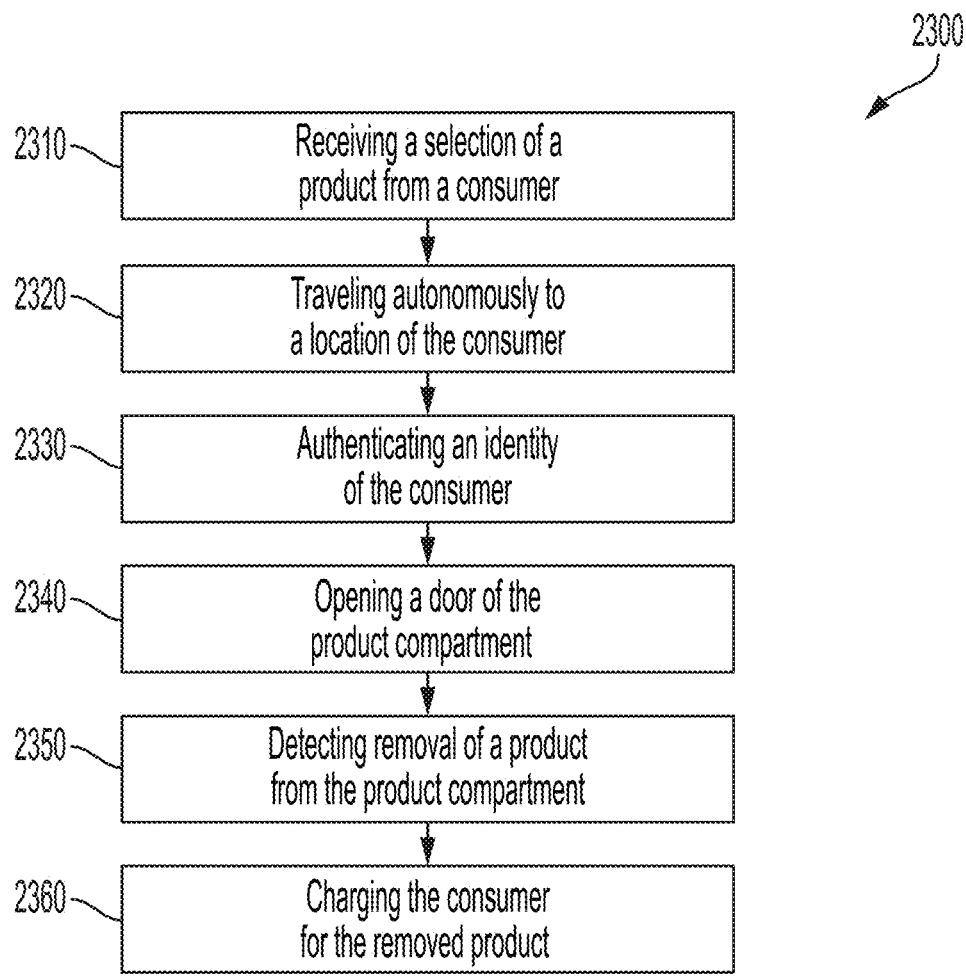
FIG. 41 shows an exemplary method of dispensing a product from a mobile vending machine according to an embodiment.
Figure 42:
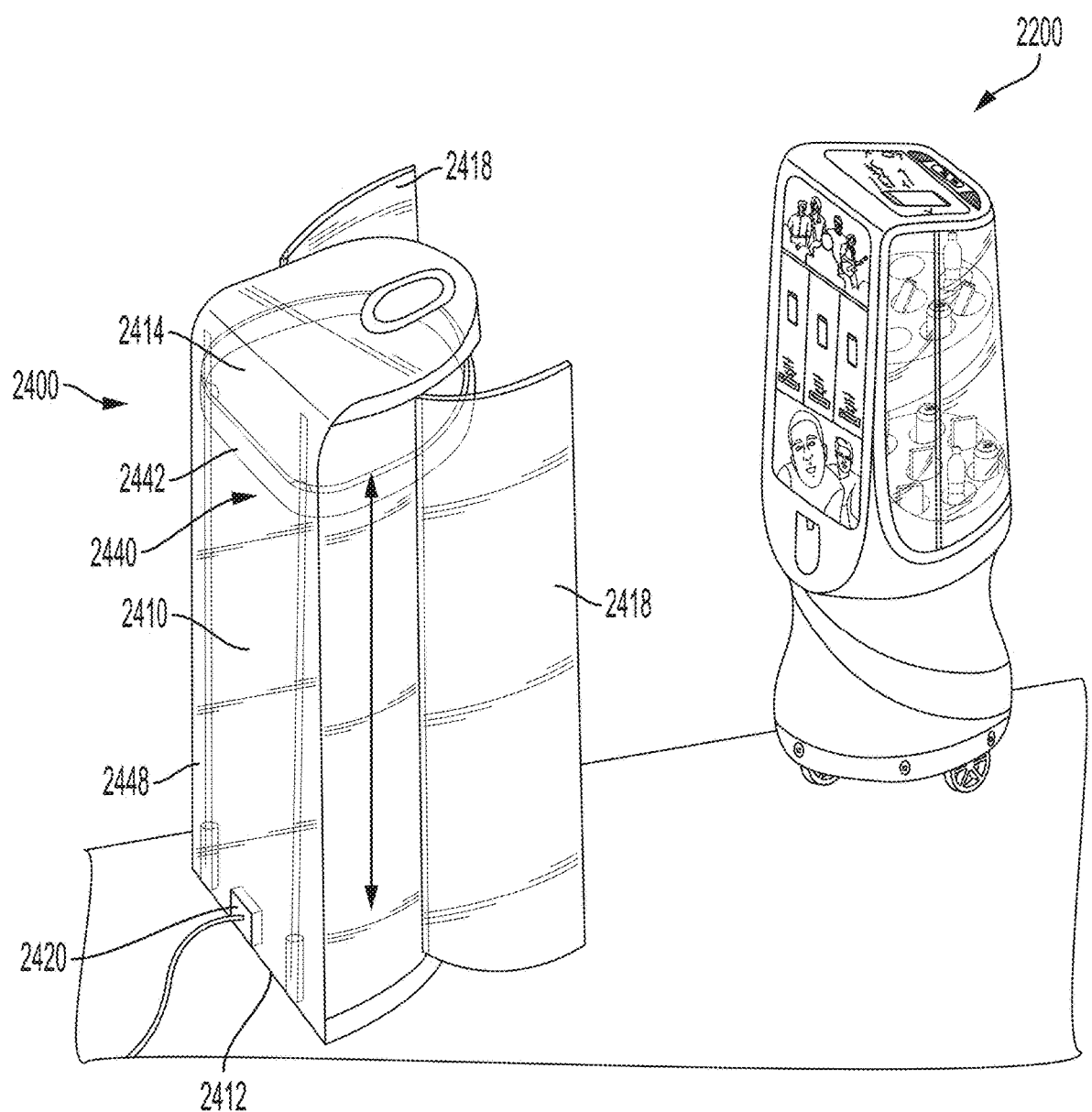
FIG. 42 shows a perspective view of a docking station for the mobile vending machine of FIG. 39 according to an embodiment.
Figure 43:
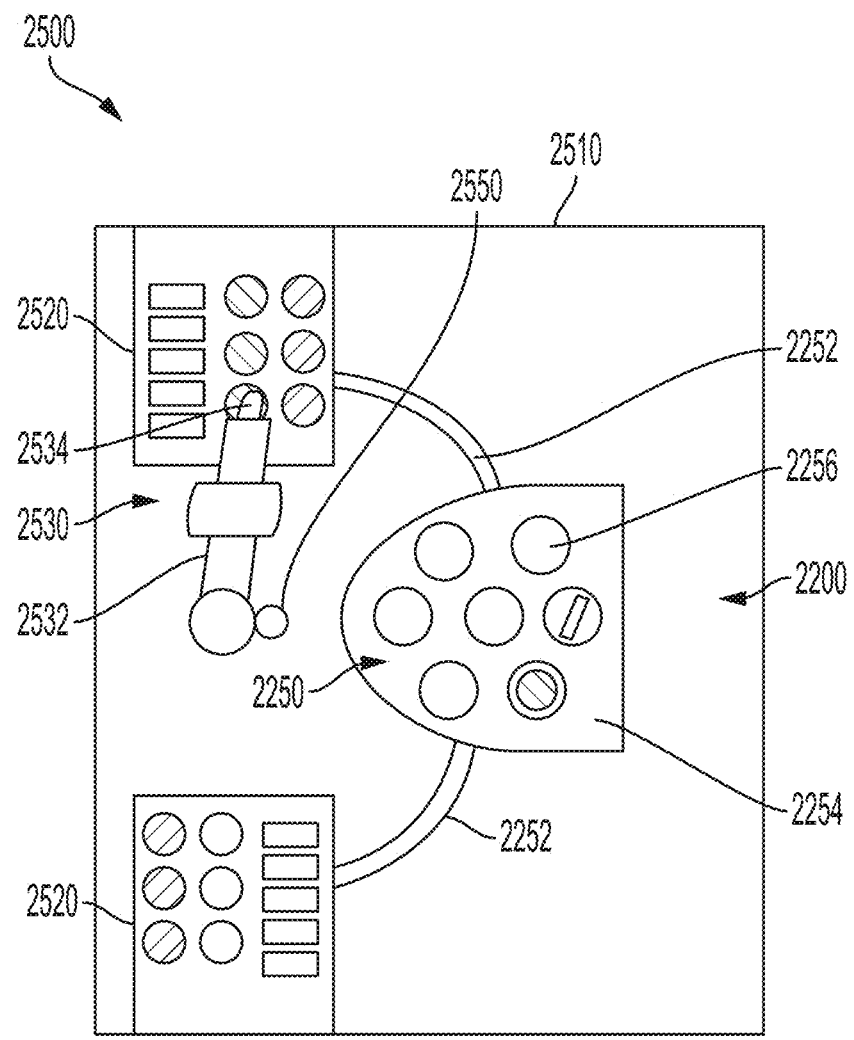
FIG. 43 shows a diagrammatic view of the mobile vending machine of FIG. 39 in use with a restocking station for refilling the product compartment of the mobile vending machine.

An exemplary method of performing a transaction by a mobile vending machine 2300 is shown in FIG. 41. Mobile vending machine may receive a selection of a product from a consumer 2310. Product selection may be received from a mobile electronic device of the consumer. However, in some embodiments, product selection may be received by a user interface of mobile vending machine. Mobile vending machine may travel autonomously to the location of the consumer 2320. At the location, the mobile vending machine may authenticate the consumer's identity 2330. Once the consumer has been identified, mobile vending machine may automatically open a door of the product storage compartment 2340. A consumer may retrieve products and mobile vending machine may detect removal of products from product storage compartment 2350. Mobile vending machine may then charge a payment source or a user account for the removed products 2360.

In some embodiments, a base station 2400 may be configured to receive a mobile vending machine, such as mobile vending machine 2200. Base station 2400 may include a housing 2410 defining an interior volume for receiving a mobile vending machine 2200 therein and having an upper end 2414 opposite a lower end 2412. Base station 2400 may include one or more doors 2418 movably connected to housing 2410. Doors 2418 may move from a closed position to an open position for receiving a mobile vending machine 2200. Doors 2418 may be connected to housing 2410 via a hinge or by sliding on tracks mounted on housing 2410.

Base station 2400 may include a charger 2420 configured to charge a battery of mobile vending machine 2200. Charger 2420 may be an inductive charger configured to charge a battery of vending machine 2200. However, in some embodiments, charger 2420 may include a plug configured to engage with a socket of vending machine 2200. When mobile vending machine 2200 is received within base station 2400, doors 2418 may automatically close to enclose mobile vending machine 2200 within base station 2400. In this way, base station 2400 may also protect mobile vending machine 2200 from tampering or unauthorized use when mobile vending machine 2200 is not in use.

In some embodiments, base station 2400 may include a sanitizer 2440. Sanitizer 2440 may include a continuous loop or ring 2442 configured to encircle mobile vending machine 2200 and move along a longitudinal axis of base station 2400 from upper end 2414 to lower end 2412. In some embodiments, ring 2442 may include an ultraviolet light source configured to produce UV-C radiation to sanitize mobile vending machine 2200. In some embodiments, ring 2442 may include a plurality of sprayers configured to dispense a disinfectant spray. In this way, as ring 2442 moves along longitudinal axis of base station 2400, ring 2442 may sanitize an exterior of mobile vending machine 2200.

Ring 2442 may have a shape that corresponds to a transverse cross sectional shape of body 2210 of mobile vending machine 2200. Ring 2442 may have a diameter greater than a maximum diameter of vending machine 2200 so that ring 2442 may fit around an exterior of vending machine 2200. Ring 2442 may be movable along one or more rails 2448 and may be driven by a motor.

A restocking station 2500 for a mobile vending machine 2200 is shown in FIG. 41. Restocking station 2500 may include a housing 2510 defining an interior volume configured to receive a mobile vending machine 2200. Restocking station 2500 may include shelves 2520 storing products, and a transfer mechanism 2530 for moving a product from a shelf 2520 to product storage compartment 2250 of mobile vending machine 2200. Transfer mechanism 2530 may include an articulating arm 2532 having a claw 2534, which may be referred to as a pick-and-place mechanism.

Transfer mechanism 2530 may be used to move products from shelf 2520 to product storage compartment 2250 or from product storage compartment 2250 to shelf 2520. When mobile vending machine 2200 enters restocking station 2500, vending machine 2200 may automatically open doors 2252 so that product storage compartment 2250 is open. In some embodiments, mobile vending machine 2200 and restocking station 2500 may be in communication with a central server that manages inventory of mobile vending machine 2200 and restocking station 2500 and that provides instructions for products to stock in mobile vending machine 2200. However, in some embodiments, mobile vending machine 2200 may communicate the products to be placed within product storage compartment 2250, or conversely restocking station 2500 may determine what products to provide in product storage compartment 2250 of mobile vending machine 2200.

In some embodiments, transfer mechanism 2530 may be configured to move individual products into and out of product storage compartment 2250 of mobile vending machine 2200. For example, transfer mechanism 2530 may take a product from shelf 2520 of restocking station 2500 and move the product into product storage compartment 2250. In another example, transfer mechanism 2530 may remove a product from product storage compartment 2250 and place the product on a shelf 2520 of restocking station 2500. In such embodiments, restocking station 2500 may include a sensor 2550 configured to detect empty pockets 2256 within product storage compartment 2250. In some embodiments, pockets may be addressed so that transfer mechanism 2530 may fill pockets of a tray 2254 according to a predetermined product planogram. In some embodiments, trays 2254 may rotate during restocking to facilitate placement of products within pockets.

In some embodiments, transfer mechanism 2530 may be configured to remove a tray 2254 from product storage compartment 2250 of mobile vending machine 2200 and replace the entire tray 2254 with a second tray 2254. For example, transfer mechanism 2530 may replace an empty or partially empty tray with a second tray filled with products. This may help to increase the efficiency and decrease the time required to restock mobile vending machine 2200. However, tray 2254 may be replaced at any time and not only when tray 2254 is empty or partially empty. For example, it may be desired to replace a tray 2254 having a first type of product with a tray 2254 having a second type of products in order to provide different food and beverage offerings to consumers, such as at different times of day.

In some embodiments, mobile vending machine 2200 may automatically return to restocking station 2500 when a product inventory falls below a predetermined number of products or type of products. Mobile vending machine 2200 may be programmed to return to restocking station 2500 at different times of day and vending machine 2200 may be stocked with foods and beverages appropriate for the time of day. For example, in the morning, mobile vending machine 2200 may be stocked at restocking station 2500 with breakfast foods, such as muffins and fruit, and beverages, such as juices or coffee- or tea-based beverages.

Figure 44:
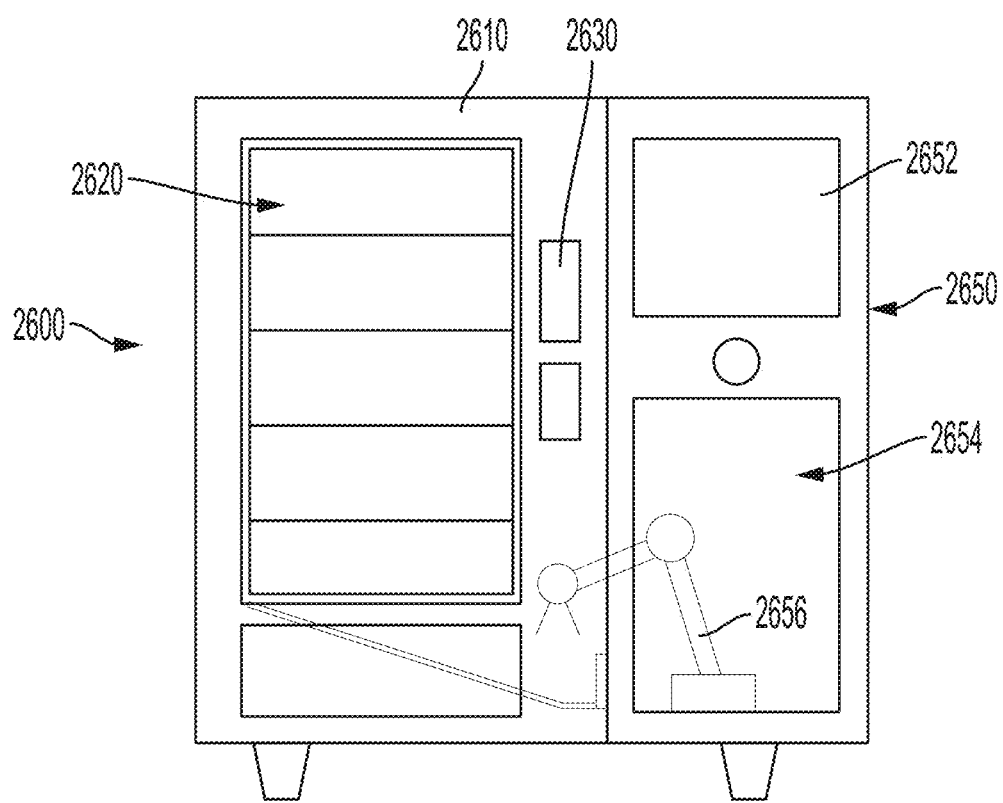
FIG. 44 shows a diagrammatic view a restocking station for the mobile vending machine of FIG. 39 that includes a stand-alone vending machine.

In some embodiments, mobile vending machine 2200 may be restocked at a stationary vending machine 2600 having a restocking module 2650, as shown in FIG. 44. Stationary vending machine 2600 may include a product storage area 2620 configured to store products. Stationary vending machine 2600 may include a user interface 2630 for receiving product selection and payments from a consumer. Stationary vending machine 2600 may include a dispensing mechanism configured to convey a selected product to a delivery portal. Thus, vending machine 2600 may operate independently of mobile vending machine 2200 to allow consumers to purchase and dispense products.

Stationary vending machine 2600 may additionally include a restocking module 2650 for restocking a mobile vending machine 2200. Restocking module 2650 may include a vending machine receiving area 2654 for engaging a mobile vending machine 2200. Restocking module 2650 may include a camera or reader 2652 configured to read a QR code or other barcode on mobile vending machine 2200 to identify mobile vending machine 2200.

QR code of mobile vending machine 2200 may indicate information about mobile vending machine 2200 such as product inventory, battery status, and movement map or route, among other information. Stationary vending machine 2600 may restock mobile vending machine 2200 based on the information received. For example, mobile vending machines 2200 that have different routes and that are thus used in different locations may be stocked with products based on the locations to be served. In another example, a first mobile vending machine may carry a first set of products while a second mobile vending machine may carry a second different set of products.

In some embodiments, a central serve may be in communication with stationary vending machine 2600 and mobile vending machine 2200 and may communicate products to be stocked in mobile vending machine 2200 from stationary vending machine 2600. In some embodiments, however, mobile vending machine 2200 may communicate products to be restocked or stationary vending machine 2600 may determine products to be restocked. Restocking module 2650 may include a transfer mechanism 2656 configured to move products from product storage area 2620 of stationary vending machine 2600 to a product storage compartment of mobile vending machine 2200. Transfer mechanism 2656 may include an articulating arm having a claw, as discussed above. Restocking module 2650 may include a sensor to detect empty pockets of mobile vending machine 2200 in which to place the products. Transfer mechanism 2656 may place products into the pockets of the trays of mobile vending machine 2200.

Figure 45:
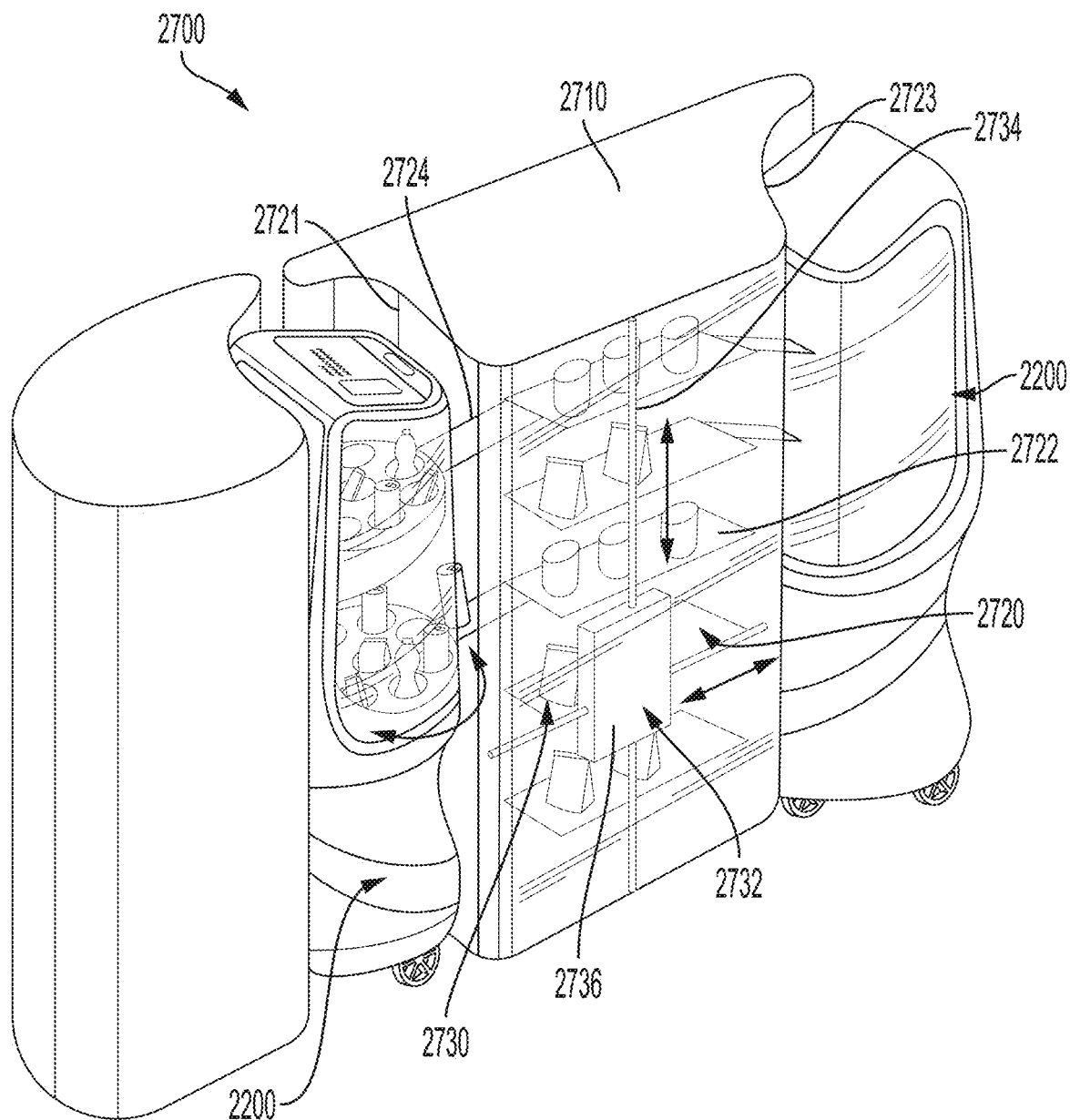
FIG. 45 shows a perspective view of a restocking station for the mobile vending machine of FIG. 39 according to an embodiment.

Some embodiments described herein relate to a restocking station 2700, as shown in FIG. 45. Restocking station 2700 may include a housing 2710 defining a product storage area 2720. Product storage area 2720 may include a first side 2721 opposite a second side 2723 (e.g., a left side and a right side). One or both sides 2721, 2723 may be configured to receive a mobile vending machine 2200 for restocking the mobile vending machine 2200. First side 2721 or second side 2723 may be contoured to a shape of an exterior of mobile vending machine 2200 in order to allow mobile vending machine 2200 to fit closely against restocking station 2700.

One or more shelves 2722 may be arranged within product storage area 2720 of restocking station 2700 and may extend between first side 2721 and second side 2723 of product storage area 2720. One or both sides 2721, 2723 of each shelf 2722 may include a declined ramp 2724 for gravitationally conveying a product into product storage compartment of mobile vending machine 2200.

Restocking station 2700 includes a transfer mechanism 2732 for moving products from product storage area 2720 onto declined ramps 2724. In some embodiments, transfer mechanism 2730 may include an X-Y mechanism 2732. X-Y mechanism 2732 may include a retrieval module 2736 movable along one or more rails 2734, such as a longitudinal rail and a transverse rail. X-Y mechanism 2732 may be configured to retrieve a product from any location within product storage area 2720 and move the product to a ramp 2724 at an end of a shelf 2722 so that the product slides along the ramp 2724 and into product storage compartment of mobile vending machine 2200. However, in some embodiments, other transfer mechanisms may be used.

In some embodiments, each tray 2254 of mobile vending machine 2200 may rotate so as to position a pocket 2256 to be filled with a product adjacent to a ramp 2724 of restocking station 2700 so that the product may slide down ramp 2724 and into the pocket 2256.

In any of the various embodiments, a central server may communicate with mobile vending machine 2200 and restocking stations or stationary vending machines. Central server may determine which products to be restocked into or removed from mobile vending machine 2200. The determination of which products to stock in mobile vending machine 2200 may be based on a combination of factors including the remaining number of products of a particular type of product, the amount of sales of a product by the mobile vending machine, e.g., the popularity of the product, the time, date, or season, and the amount of product available at the restocking station or stationary vending machine 2600.

Figure 46:
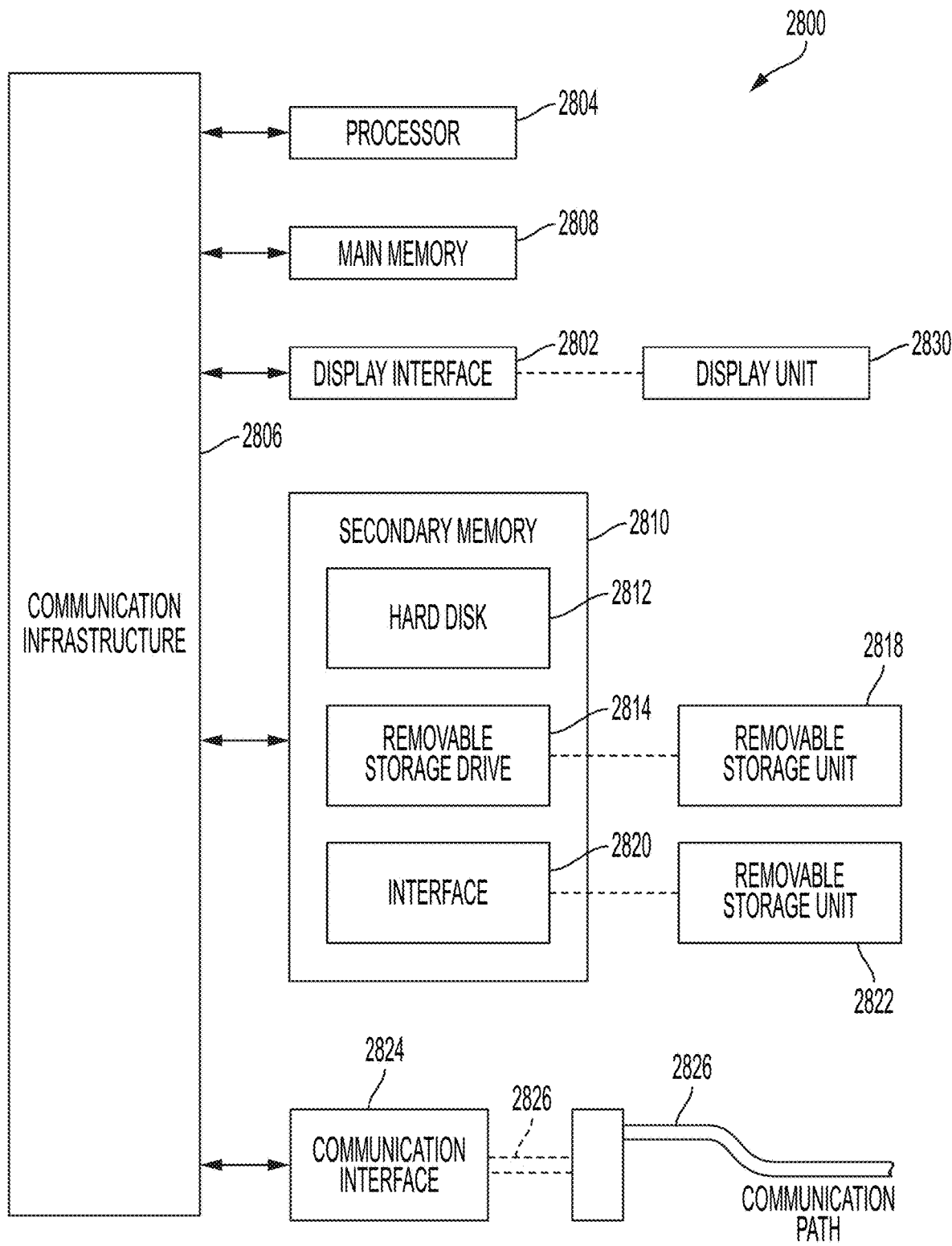
FIG. 46 shows a schematic block diagram of an exemplary computer system in which embodiments may be implemented.

FIG. 46 illustrates an exemplary computer system 2800 in which embodiments, or portions thereof, may be implemented as computer-readable code. A control unit as discussed herein may be a computer system(s) having all or some of the components of computer system 2800 for implementing processes discussed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention(s) may be implemented in terms of this example computer system 2800. After reading this description, it will become apparent to a person skilled in the relevant art how to implement one or more of the invention(s) using other computer systems and/or computer architectures. Although operations may be described as a sequential process, some of the operations may in fact be performed in parallel, concurrently, and/or in a distributed environment, and with program code stored locally or remotely for access by single or multi-processor machines. In some embodiments, edge computing, cloud computing, or a combination thereof may be used. In addition, in some embodiments the order of operations may be rearranged without departing from the spirit of the disclosed subject matter.

Processor device 2804 may be a special purpose or a general purpose processor device. As will be appreciated by persons skilled in the relevant art, processor device 2804 may also be a single processor in a multi-core/multiprocessor system, such system operating alone, or in a cluster of computing devices operating in a cluster or server farm. Processor device 2804 is connected to a communication infrastructure 2806, for example, a bus, message queue, network, or multi-core message-passing scheme.

Computer system 2800 also includes a main memory 2808, for example, random access memory (RAM), and may also include a secondary memory 2810. Secondary memory 2810 may include, for example, a hard disk drive 2812, or removable storage drive 2814. Removable storage drive 2814 may include a floppy disk drive, a magnetic tape drive, an optical disk drive, a flash memory, or the like. The removable storage drive 2814 reads from and/or writes to a removable storage unit 2818 in a well-known manner. Removable storage unit 2818 may include a floppy disk, magnetic tape, optical disk, a universal serial bus (USB) drive, etc. which is read by and written to by removable storage drive 2814. As will be appreciated by persons skilled in the relevant art, removable storage unit 2818 includes a computer usable storage medium having stored therein computer software and/or data.

Computer system 2800 (optionally) includes a display interface 2802 (which can include input and output devices such as keyboards, mice, etc.) that forwards graphics, text, and other data from communication infrastructure 2806 (or from a frame buffer not shown) for display on display unit 2830.

In alternative implementations, secondary memory 2810 may include other similar means for allowing computer programs or other instructions to be loaded into computer system 2800. Such means may include, for example, a removable storage unit 2822 and an interface 2820. Examples of such means may include a program cartridge and cartridge interface (such as that found in video game devices), a removable memory chip (such as an EPROM, or PROM) and associated socket, and other removable storage units 2822 and interfaces 2820 which allow software and data to be transferred from the removable storage unit 2822 to computer system 2800.

Computer system 2800 may also include a communication interface 2824. Communication interface 2824 allows software and data to be transferred between computer system 2800 and external devices. Communication interface 2824 may include a modem, a network interface (such as an Ethernet card), a communication port, a PCMCIA slot and card, or the like. Software and data transferred via communication interface 2824 may be in the form of signals, which may be electronic, electromagnetic, optical, or other signals capable of being received by communication interface 2824. These signals may be provided to communication interface 2824 via a communication path 2826. Communication path 2826 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 2818, removable storage unit 2822, and a hard disk installed in hard disk drive 2812. Computer program medium and computer usable medium may also refer to memories, such as main memory 2808 and secondary memory 2810, which may be memory semiconductors (e.g. DRAMs, etc.).

Computer programs (also called computer control logic) are stored in main memory 2808 and/or secondary memory 2810. Computer programs may also be received via communication interface 2824. Such computer programs, when executed, enable computer system 2800 to implement the embodiments as discussed herein. In particular, the computer programs, when executed, enable processor device 2804 to implement the processes of the embodiments discussed here. Accordingly, such computer programs represent controllers of the computer system 2800. Where the embodiments are implemented using software, the software may be stored in a computer program product and loaded into computer system 2800 using removable storage drive 2814, interface 2820, and hard disk drive 2812, or communication interface 2824.

Embodiments of the invention(s) also may be directed to computer program products comprising software stored on any computer useable medium. Such software, when executed in one or more data processing device, causes a data processing device(s) to operate as described herein. Embodiments of the invention(s) may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary embodiments, but should be defined only in accordance with the following claims and their equivalents.

What is claimed is:

1. A vending machine, comprising:
   a housing defining a product storage area;
   a control unit configured to receive a product selection and an identity of a consumer from a mobile electronic device of the consumer;
   a dispensing mechanism configured to convey the selected product to a product dispensing area; and
   a bag dispenser configured to dispense a bag into the product dispensing area such that the selected product is dispensed into the bag,
   wherein the control unit confirms the identity of the consumer based on the consumer identity from the mobile electronic device.

2. The vending machine of claim 1, wherein the product storage area comprises a plurality of product compartments each containing a product.

3. The vending machine of claim 2, further comprising an indicator light configured to illuminate the product storage area, wherein the indicator light is arranged along a perimeter of a product compartment of the plurality of product compartments.

4. The vending machine of claim 1, further comprising a microphone configured to detect audible information from the consumer, wherein the identity of the consumer is confirmed based on the audible information.

5. The vending machine of claim 1, wherein the control unit is further configured to receive a payment from the consumer via the mobile electronic device.

6. The vending machine of claim 1, wherein the dispensing mechanism comprises an articulating arm.

7. The vending machine of claim 1, further comprising a digital display configured to display the selected product.

8. A vending machine, comprising:
   a housing defining a product storage area;
   a control unit configured to receive a product selection and an identity of a consumer via a mobile electronic device of the consumer;
   a camera module arranged on the housing and configured to confirm the identity of the consumer;
   an indicator light arranged within the product storage area configured to indicate the selected product;
   a dispensing mechanism configured to convey the selected product to a product dispensing area; and
   a bag dispenser configured to dispense a bag into the product dispensing area such that the selected product is dispensed into the bag.

9. The vending machine of claim 8, further comprising a second camera configured to detect a presence of the bag in the product dispensing area, wherein information from the second camera guides the dispensing mechanism to dispense the product into the bag.

10. The vending machine of claim 8, wherein the bag dispenser comprises a bag storage area configured to store a plurality of bags in a collapsed configuration, and a bag extending arm configured to engage an upper end of a bag and move the bag into an expanded configuration and into the product dispensing area.

11. The vending machine of claim 8, wherein the dispensing mechanism comprises an articulating arm configured to retrieve the selected product from the product storage area and place the selected product in the bag.

12. The vending machine of claim 8, wherein the vending machine further comprises a payment processing unit configured to receive a contactless payment.

13. The vending machine of claim 8, comprising a digital display arranged on the housing, wherein the digital display is configured to display product information.

14. A method of vending a product from a vending machine, comprising:
    displaying a list of products available on a mobile electronic device of a consumer;
    receiving, at a control unit, a product selection and an identity of a consumer from the mobile electronic device;
    confirming the identity of the consumer by the control unit based on the consumer identity from the mobile electronic device;
    conveying the selected product from the product storage area to a product dispensing area for retrieval by the consumer; and
    dispensing a bag into the product dispensing area using a bag dispenser such that the selected product is dispensed into the bag.

15. The method of claim 14, wherein confirming the identity of the consumer comprises performing facial recognition by a camera module of the vending machine.

16. The method of claim 14, wherein confirming the identity of the consumer comprises performing voice recognition by an audio unit of the vending machine.

17. The method of claim 14, further comprising receiving a payment from the mobile electronic device of the consumer.

18. The method of claim 14, further comprising indicating the selected product by illuminating an indicator light that surrounds a product compartment in the product storage area that contains the selected product.

19. The method of claim 14, further comprising storing a plurality of bags in the bag dispenser such that the bag dispensed is taken from the plurality of bags.

* * * * *